US012416394B2

(12) United States Patent
Wickham et al.

(10) Patent No.: US 12,416,394 B2
(45) **Date of Patent: *Sep. 16, 2025**

(54) RECESSED LIGHT FIXTURE WITH HOUSING WITH INTERNAL HEAT SINK AND AN LED MODULE WITH CONDUCTIVE BASE REMOVABLY MOUNTED THEREIN AND COUPLED TO THE HEAT SINK

(71) Applicant: USAI, LLC, New Windsor, NY (US)

(72) Inventors: Timothy Wickham, Tappan, NY (US); Oriana J. Starr, New Paltz, NY (US); Frank Cogliano, Pomona, NY (US); Howard D. Delano, Kingston, NY (US)

(73) Assignee: USAI, New Windsor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,981

(22) Filed: Feb. 28, 2024

(65) Prior Publication Data

US 2024/0230066 A1 Jul. 11, 2024

Related U.S. Application Data

(63) Continuation of application No. 18/313,996, filed on May 8, 2023, now Pat. No. 12,031,702, which is a (Continued)

(51) Int. Cl.
*F21S 8/02* (2006.01)
*F21V 19/04* (2006.01)
(Continued)

(52) U.S. Cl.
CPC .............. *F21V 19/04* (2013.01); *F21S 8/026* (2013.01); *F21V 29/713* (2015.01); *F21Y 2115/10* (2016.08)

(58) Field of Classification Search
CPC .......... F21S 8/026; F21V 19/04; F21V 29/70; F21V 29/71; F21V 29/713; F21V 29/717;
(Continued)

(56) References Cited

U.S. PATENT DOCUMENTS 8,092,035 B2 * 1/2012 Mandy .................... F21S 8/026
362/147
8,262,255 B1 9/2012 Rashidi
(Continued)

*Primary Examiner* — Robert J May
(74) *Attorney, Agent, or Firm* — Farber LLC; Fritz L. Schweitzer, III

(57) ABSTRACT

A recessed light fixture has a heat sink and a removable light engine assembly. A thermally conductive base of the light engine assembly has an LED and has a thermal interface adapted for thermal coupling to a thermal interface of the heat sink. A mechanical connector in the enclosure can connect the base of the light engine assembly to the heat sink and couple the thermal interfaces of the light engine assembly and heat sink. The base of the light engine assembly is insertable through an opening in the ceiling aligned and can be urged into connected and disconnected states, from within the room, with a minimal clearance between the opening in the ceiling and the base, whereby the light engine assembly can be replaced or serviced from within the room without disturbing the ceiling and without the use of a large diameter trim.

38 Claims, 72 Drawing Sheets

Related U.S. Application Data continuation of application No. 17/841,015, filed on Jun. 15, 2022, now Pat. No. 11,644,184, which is a continuation of application No. 17/577,839, filed on Jan. 18, 2022, now abandoned, which is a continuation of application No. 17/201,863, filed on Mar. 15, 2021, now Pat. No. 11,226,087.

(60) Provisional application No. 63/319,703, filed on Mar. 14, 2022, provisional application No. 63/210,818, filed on Jun. 15, 2021, provisional application No. 62/989,148, filed on Mar. 13, 2020.

(51) Int. Cl.
*F21V 29/71* (2015.01)
*F21Y 115/10* (2016.01)

(58) Field of Classification Search
CPC ........ F21V 29/73; F21V 29/74; F21V 29/745; F21V 29/75; F21V 29/76; F21V 29/763; F21V 29/767; F21V 29/77; F21V 29/773; F21V 29/777; F21V 29/78; F21Y 2115/10
See application file for complete search history.

(56) References Cited

U.S. PATENT DOCUMENTS

| | | | |
|---|---|---|---|
| 8,454,204 | B1 | 6/2013 | Chang et al. |
| 9,964,266 | B2 | 5/2018 | Danesh |
| 10,247,390 | B1 | 4/2019 | Kopitzke, IV |
| 10,488,000 | B2 | 11/2019 | Danesh et al. |
| 2008/0165535 | A1 | 7/2008 | Mazzochette |
| 2012/0162994 | A1 | 6/2012 | Wasniewski et al. |
| 2016/0084489 | A1 | 3/2016 | Yamaguchi et al. |

* cited by examiner

RECESSED LIGHT FIXTURE WITH HOUSING WITH INTERNAL HEAT SINK AND AN LED MODULE WITH CONDUCTIVE BASE REMOVABLY MOUNTED THEREIN AND COUPLED TO THE HEAT SINK

FIELD OF THE INVENTION

The invention pertains to the field of recessed lighting, and in particular, to small aperture format recessed lighting with high light output.

BACKGROUND OF THE INVENTION

For high output light assemblies and luminaries, a way must be provided to dissipate heat generated in creating the light. For small aperture format light fixtures, due to the ultra-small opening through which the light is emitted into the room, the fixture requires that the heat dissipater be much larger than the opening hole in the ceiling.

Prior manufacturers have addressed this problem by creating a one-piece light fixture which must be cut out of the ceiling to repair or replace the fixture.

Therefore, what is desired is a recessed lighting fixture with an extremely small intrusion opening in the ceiling which provides a substantial amount of illumination and which allows for the LED light engine to be replaced and serviced after installation and ceiling finishing, without altering the ceiling and without the use of a large diameter trim.

SUMMARY OF THE INVENTION

In the present design a serviceable light fixture and method are provided to allow for removal and replacement of active components of the light fixture through a small opening in the ceiling having a minimal clearance with such components, without altering or damaging the ceiling and without the use of a large diameter trim.

The recessed light fixture is adapted for illuminating a room through a small opening in a ceiling. The light fixture can have an enclosure with a bottom, and an aperture in the bottom. A heat sink is connected to the enclosure and has a thermal interface, and the heat sink can be non-removable through the aperture. A light engine assembly is insertable and removable through the aperture, along an insertion axis.

The light engine assembly can have a base with a first end with an LED mounted thereto, and the base can a thermal interface adapted for thermal coupling to the thermal interface of the heat sink. The base is preferably solid or substantially solid and comprises material having high thermal conductivity suitable for effective conduction of heat from the LED to the heat sink.

A mechanical connector which is disposed within the enclosure and is connected to the heat sink, and is adapted to removably connect the base of the light engine assembly to the heat sink. In a connected state, the mechanical connector mechanically connects the base of the light engine assembly to the heat sink, and couples the thermal interface of the light engine assembly with the thermal interface of the heat sink, wherein the thermal interfaces of the base and heat sink are pressed together. The thermal interfaces of the base and the heat sink can be planar and, in the connected state, can be perpendicular to the insertion axis.

In a disconnected state, the base of the light engine assembly is mechanically dis-connected from the heat sink, and the thermal interface of the light engine assembly is de-coupled with the thermal interface of the heat sink.

The base of the light engine assembly is insertable through the opening in the ceiling aligned with the aperture and is operable to be selectively urged into the connected and disconnected states, from within the room, where a maximal clearance between the opening in the ceiling and the base is not substantially greater than required for the base to fit through the opening, for example where such clearance is no more than about 0.05-0.25 inches (e.g., no more than about 0.08 inch) for a 1 inch diameter opening (or 5%-25% of the diameter or corresponding dimension of the opening), and the base of the light engine assembly is removable through the opening in the ceiling, from within the room.

Therefore, the light engine assembly can be replaced or serviced from within the room without disturbing the ceiling, and without the use of large diameter trims.

The base of the light engine assembly can have a second end opposite the first end, and the thermal interface of the base can be disposed on the second end. In the connected state, the insertion axis can passes through the thermal interfaces of the base and heat sink.

The light engine assembly can be operable to be urged from the disconnected state into the connected state by rotation of the base relative to the heat sink in a first direction about the insertion axis, and from the connected state into the disconnected state by rotation of the base relative to the heat sink in a second direction opposite the first direction about the insertion axis.

The mechanical connector comprises a bayonet connector mounted to the heat sink, and the bayonet can engage the base of the light engine assembly in the connected state.

The recessed light fixture can include a light engine lock within the enclosure which has locked and unlocked states. In the locked state, the light engine lock is operable to prevent rotation of the base of the light engine assembly in the connected state, relative to the heat sink. In the unlock state, the light engine lock being operable to allow rotation of the base of the light engine in the connected state, relative to the heat sink, and the light engine lock is biased in the locked state.

The base of the light engine assembly can have upper and lower portions, with the first end of the base being on the lower portion and the second end of the base being on the upper portion. A plurality of mounting pins can extend radially outwardly from the lower portion of the base.

A service tool is adapted to releasably connect to the base for insertion and removal of the base through the opening in the ceiling. The service tool has a first end with a plurality of slots adapted to engage the mounting pins of the base, and the tool is adapted to rotate the base to urge the base between the connected and disconnected states.

The light engine lock has a cam surface, and during connection and disconnection of the base from the heat sink, the service tool is adapted to engage the cam surface of the light engine lock and to urge the light engine lock into the unlocked state.

The light engine assembly has a reflector module which can be in a mounted state wherein the reflector module is mounted to the lower portion of the base of the light engine assembly, and can be in a dismounted state wherein the reflector module is disconnected from the base. The reflector module is adapted to be urged from the dismounted state to the mounted state and vice versa by rotating the reflector module relative to the base about the insertion axis in a mounting direction and an opposite dismounting direction, respectively. In the mounted state, the reflector module is mounted to the base by the mounting pins of the base.

The reflector module can have a plurality of mounting pins extending radially outwardly, and the service tool can be adapted to releasably connect to the reflector module for insertion and removal of the reflector module through the opening in the ceiling. The first end of the tool can be adapted to engage the mounting pins of the reflector module, and to rotate the reflector module relative to the base, to urge the reflector module between the mounted and dismounted states.

DETAILED DESCRIPTION OF PREFERRED EMBODIMENTS OF THE INVENTION

Figure 2:
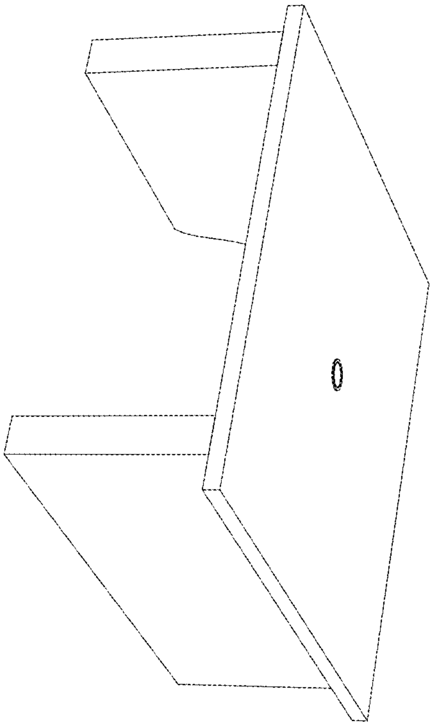
FIG. 2 is a perspective view from below the ceiling of a recessed lighting fixture of FIG. 1.
Figure 1:
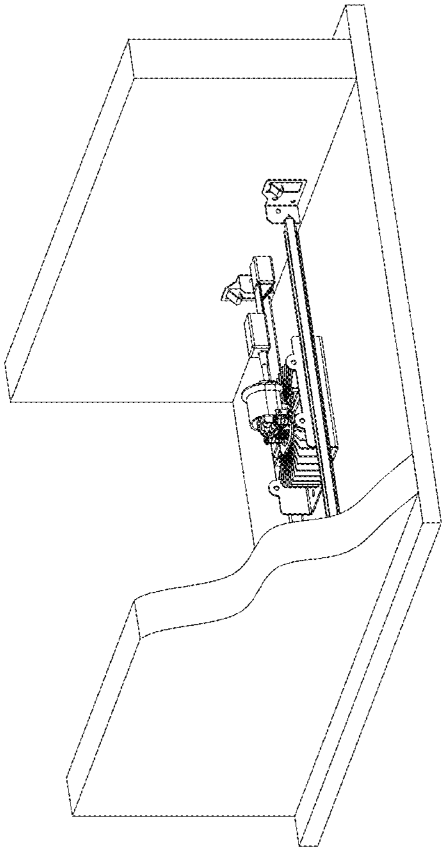
FIG. 1 is a perspective view from above the ceiling of a recessed lighting fixture constructed according to a first preferred embodiment of the inventive light fixture.

Referring to FIGS. 1-5, the recessed light fixture is adapted to be installed above a ceiling or other surface and to project light into a room below, through an opening in the ceiling, which is typically, but not necessarily, a circular opening.

The light fixture can include a trim/diffuser assembly 1 and a light engine assembly 2. The light engine assembly 2 can be substantially cylindrical with a generally circular cross section and include a thermal gap filling pad 3, a light engine power connector 4, a light engine housing 5, a reflector 6, a LED support 7, a LED module 8, and an electrical connection 9 to connect the LED module to the light engine power connector 4.

Figure 7:
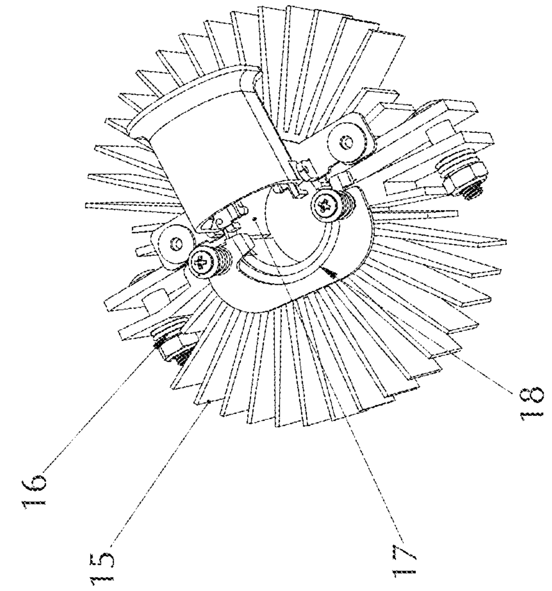
FIG. 7 is a perspective view of the heat dissipation assembly.
Figure 6:
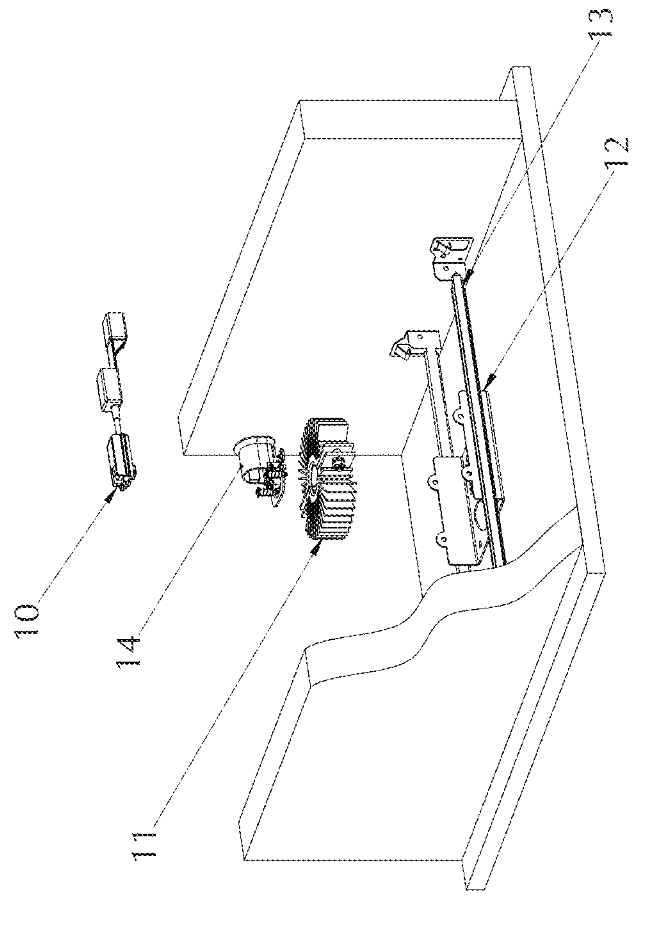
FIG. 6 is an exploded view of the mechanical support and thermal components of the light fixture.
Figure 8:
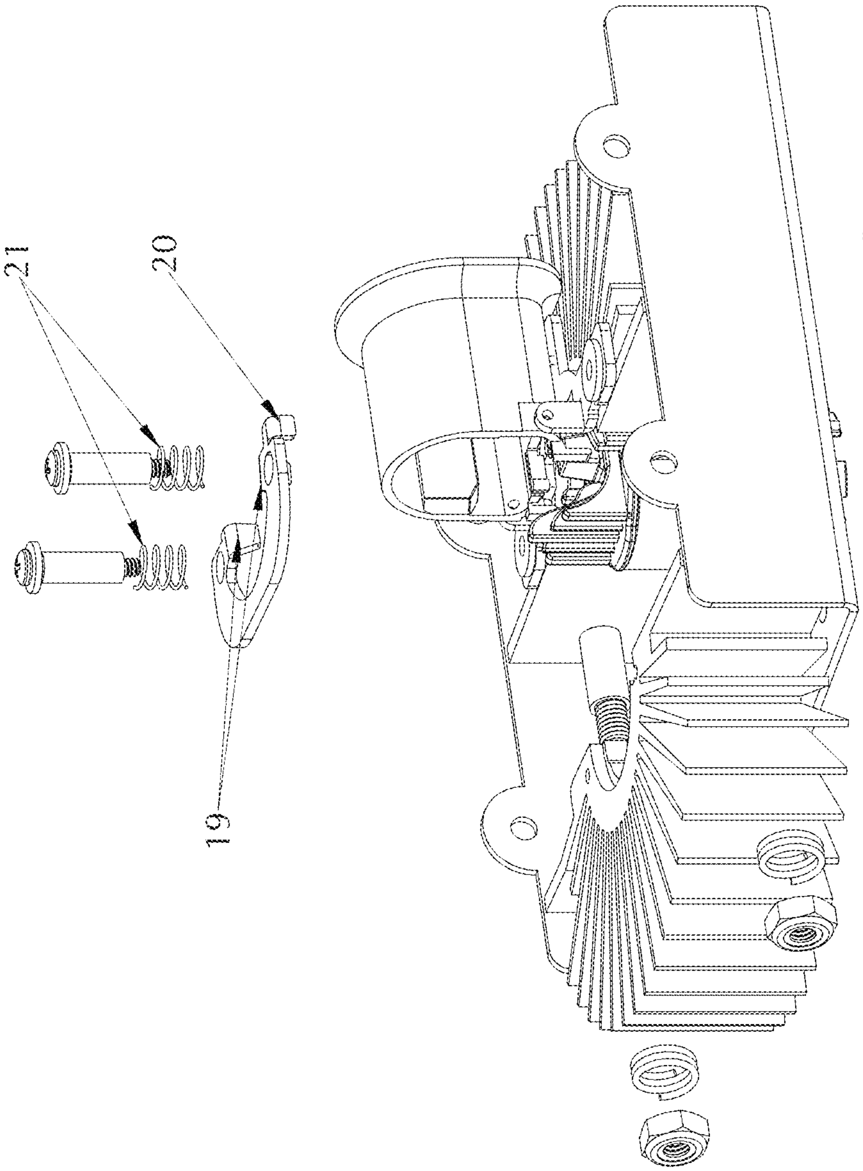
FIG. 8 is an exploded view showing the Ejector assembly.
Figure 9:
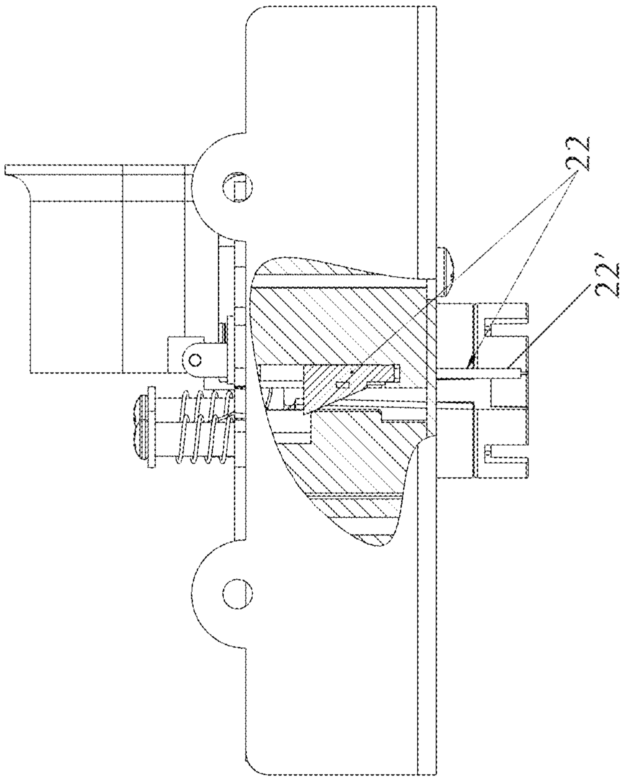
FIG. 9 is a partial sectional view showing a version of the Wedge with integral cable.
Figure 10:
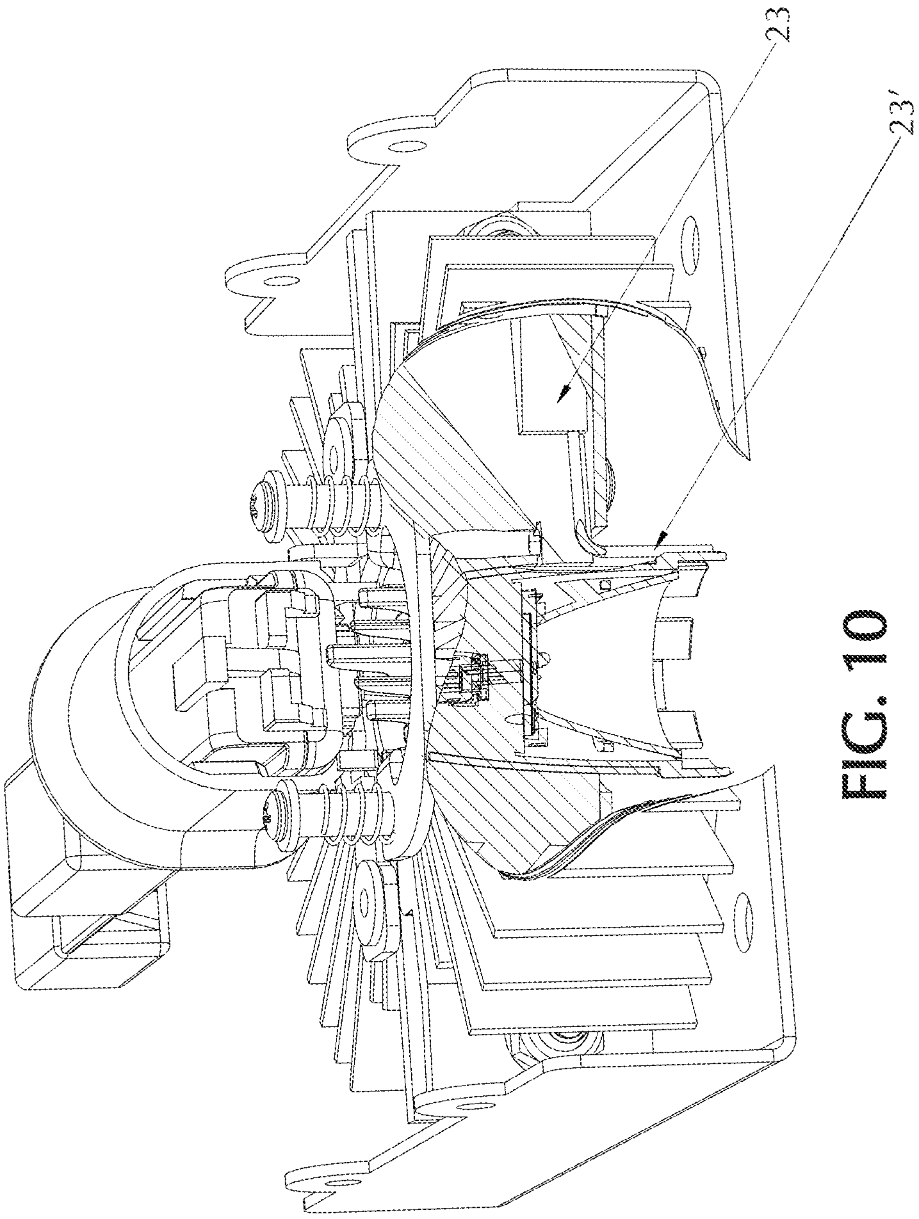
FIG. 10 is a partial section view of the light fixture showing an alternate Wedge with integral cable.
Figure 11:
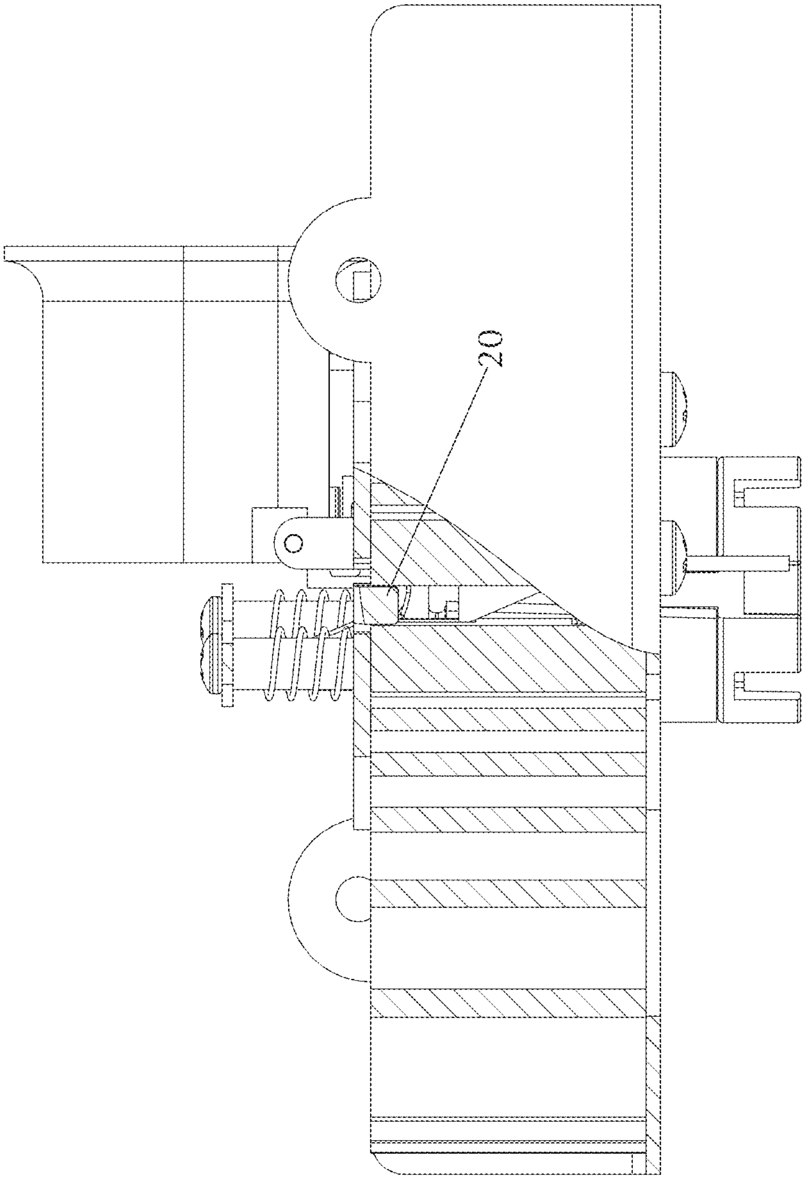
FIG. 11 is a partial sectional view showing the Light Engine Assembly being expelled from the heat dissipation assembly and the keeper leg engaged between the two halves of the finned extrusion.
Figure 12:
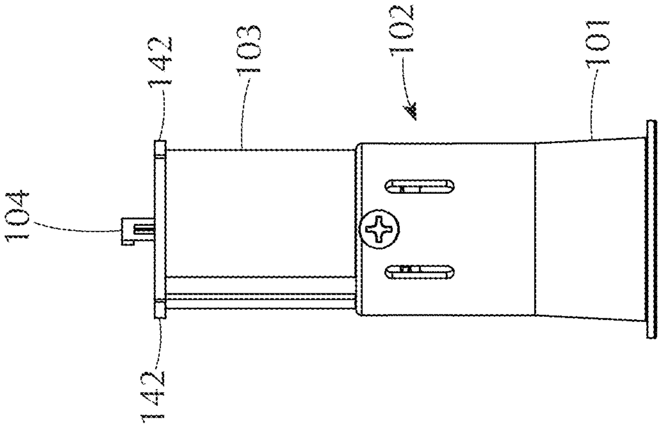
FIG. 12 is a side elevation view of a light engine assembly according to a second preferred embodiment of the inventive light fixture.
Figure 13:
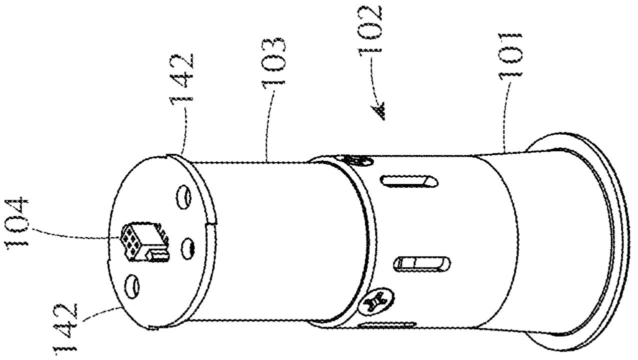
FIG. 13 is a perspective view of the light engine assembly of FIG. 12, from the top.
Figure 14:
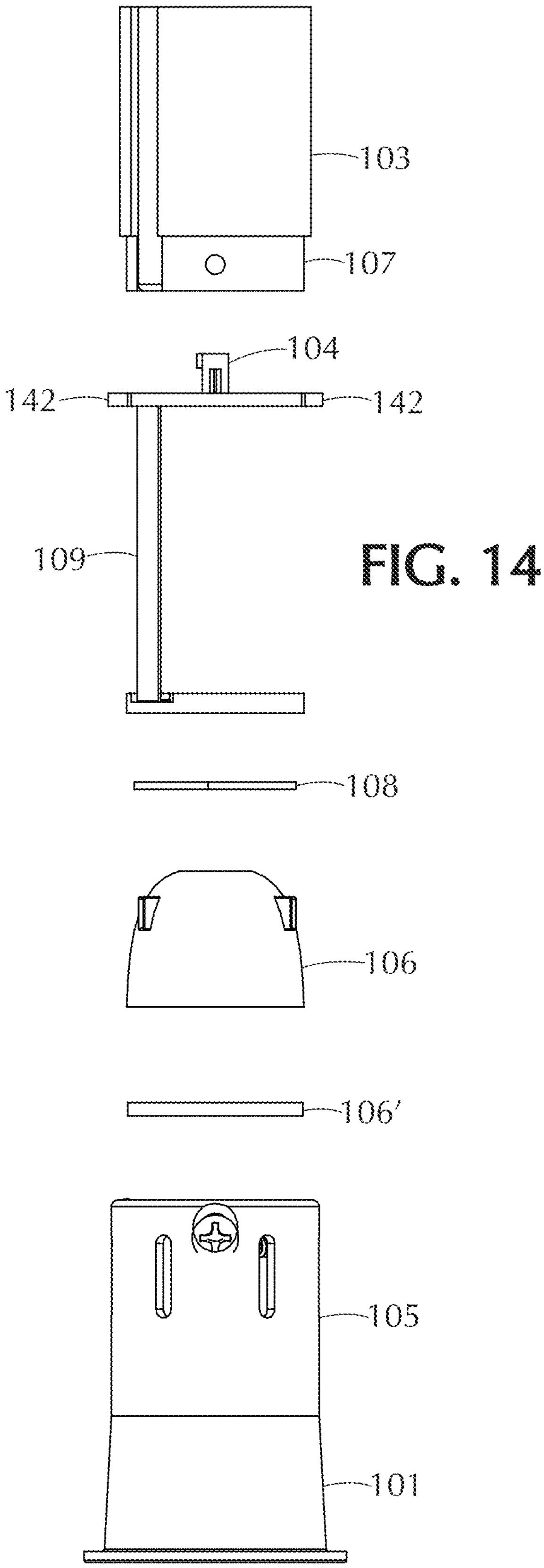
FIG. 14 is an exploded view of the light engine assembly of FIG. 12.
Figure 15:
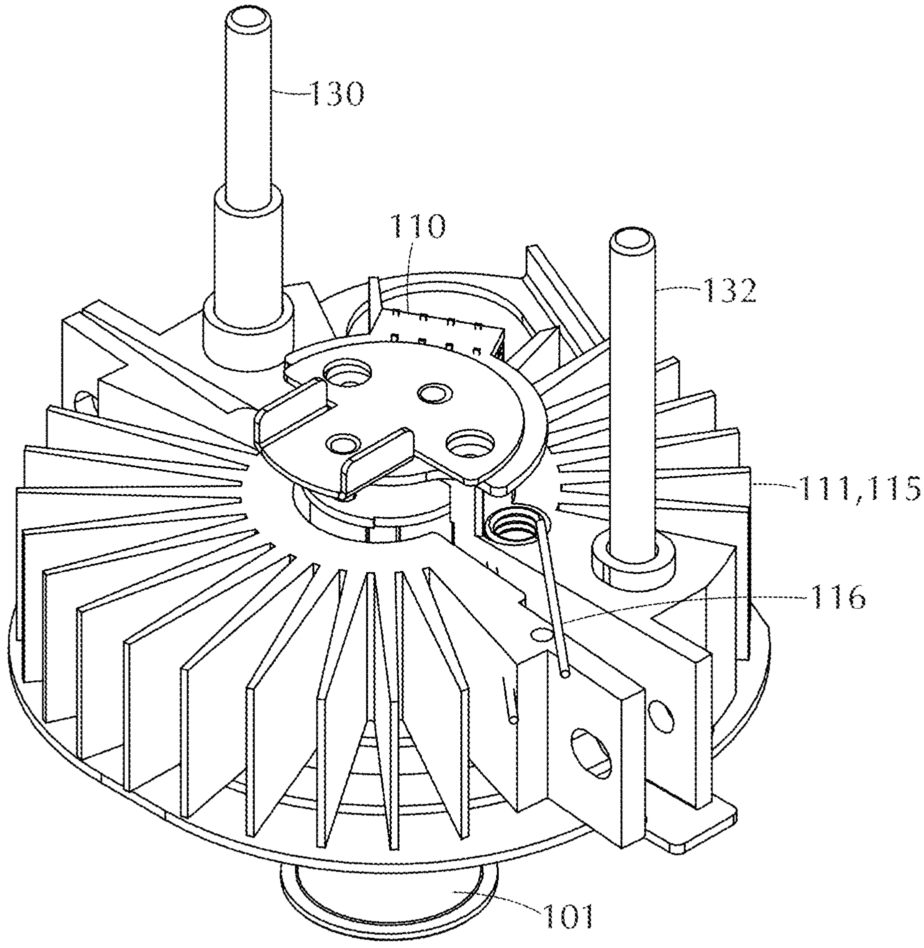
FIG. 15 is a perspective view of the second embodiment of the light fixture, from the top.
Figure 16:
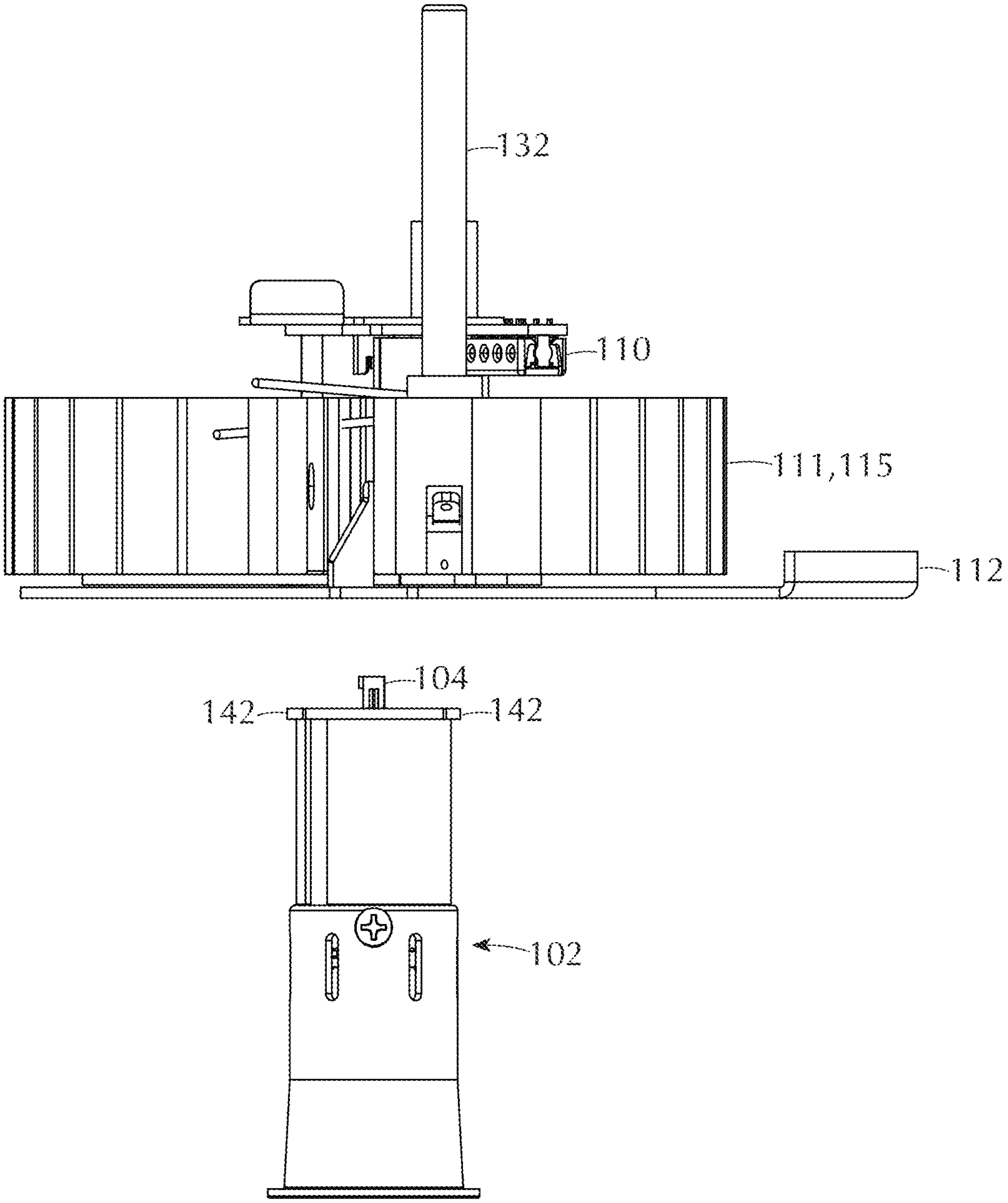
FIG. 16 is a side elevation view of the light fixture of FIG. 15.
Figure 17:
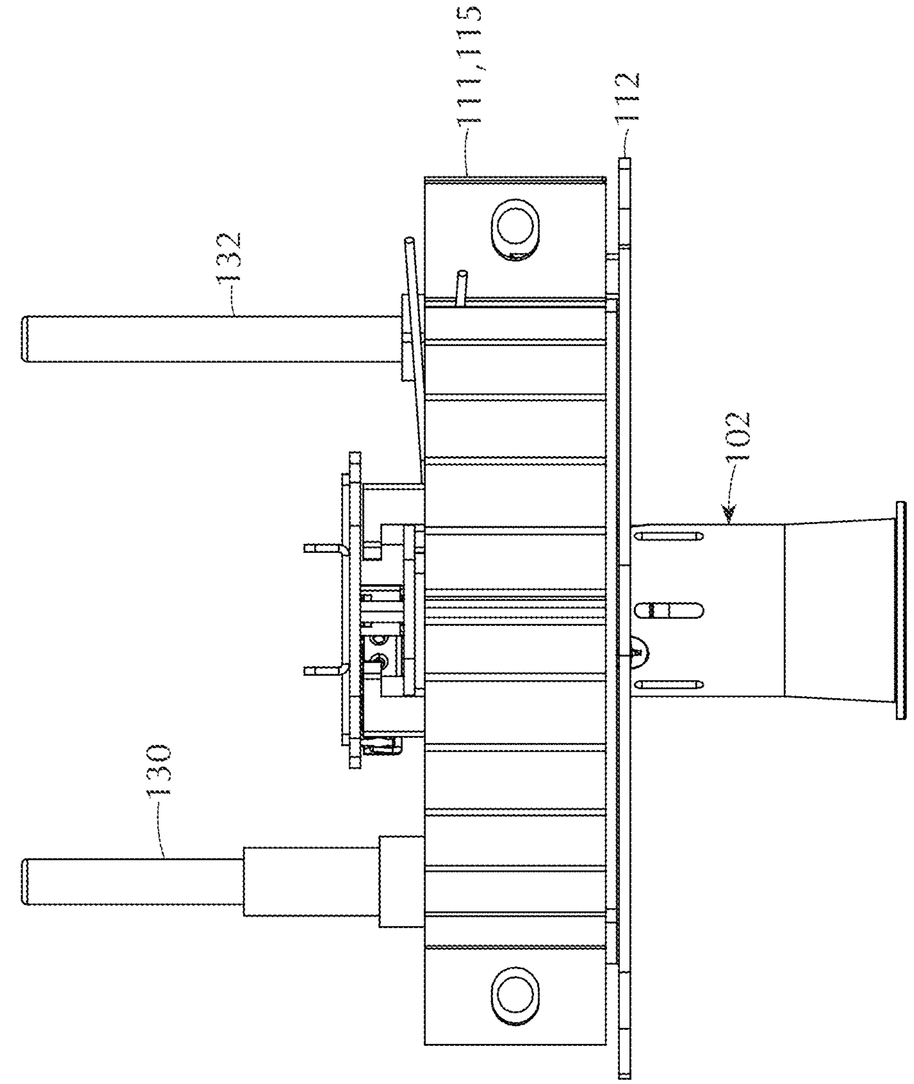
FIG. 17 is a side elevation view of the light fixture of FIG. 15, showing the heat dissipation assembly in a lower limit position and the light engine assembly inserted.

Referring to FIGS. 6-7, the light fixture can also include a power input module 10, a heat dissipation assembly 11, a chassis 12, a pair of hanger bars 13, and a docking module and power input 14.

The heat dissipation assembly 11 can include a finned heat exchanger 15 with an opening in a center sized and shaped to closely receive the light engine assembly 2 therein and the opening can expand to receive the light engine assembly. Preferably, the finned heat exchanger 15 includes a compression spring 16 which biases the opening in a contracted position but which allows the opening to expand to receive the light engine assembly 2 into the opening. The finned heat exchanger 15 can include two halves connected by the compression spring 16 such that the two halves can separate slightly against the bias of the spring to enlarge the opening to receive the light engine assembly 2. The two halves of finned heat exchanger 15 can separate in a horizontal direction perpendicular to a vertical axis of insertion of the light engine assembly into the opening of the heat dissipation assembly.

A thermal interface area 17 surrounds the opening in the finned heat exchanger 15 and is adapted to thermally couple with the thermal gap filling pad 3 of the light engine assembly 2.

The bias of the compression spring 16 maintains a thermal couple and mechanical/friction couple between the heat dissipation assembly 11 and the light engine assembly 2 to provide both a thermal connection with and a mechanical support of the light engine assembly 2.

The heat dissipation assembly 11 can also include a light engine assembly ejector 18 which is operable to eject the light engine assembly 2. The ejector assembly 18 is spring biased 21 downwardly and, when the light engine assembly 2 is installed, the ejector assembly 18 is urged upwardly by the light engine assembly 2 and exerts a downward force on upwardly extending legs 24 of the Light Engine Assembly 2 to help expel the sub-assembly from the ceiling. Specifically, downwardly extending ejector legs 19 of the ejector assembly 18 contact and exert force on the upwardly extending legs 24 of the light engine assembly 2.

To remove the light engine assembly 2, the two halves of the Heat Dissipation Assembly 11, are separated via a wedge 22 (and/or 23) that is urged between the two halves of the heat dissipation assembly by pulling down on a cable 22'/23' connected to the wedge, which cable is accessible from below the ceiling (e.g., from within the room). This causes the wedge to slide between and separate the two finned heat exchanger halves. As the wedge separates the two halves of the finned heat exchanger 15, the light engine assembly 2 is at least partially ejected downwardly from the assembly by the ejector assembly 18 which moves downwardly, and a keeper leg 20 of the light engine ejector assembly 18 is thereby positioned between the two halves of the finned heat exchanger 18, The keeper leg 20 is operable to hold the heat dissipation assembly open until the light engine assembly is fully re-inserted into the heat dissipation assembly. When the light engine assembly 2 is inserted back into the heat dissipation assembly, the light engine assembly 2 pushes the wedge back into a relaxed position wherein it is not separating the halves of the heat dissipation assembly. The light engine assembly also urges the ejector assembly 18 upwardly which displaces the keeper leg 20 from between the halves of the heat dissipation assembly, which allows the compression spring 16 to close the heat dissipation assembly onto the light engine assembly 2 as discussed above.

The light engine assembly 2 can include one or more fins 25 extending upwardly from a top portion. The fin(s) 25 are operable to dissipate heat and are also operable to properly align the power input module 10 so that the light engine power connector 4 makes a proper connection to a complementary socket on the bottom of the power input module 10. As shown, the fins 25 can be angled generally upwardly and radially outward away from the docking module 14 so that they are operable to urge the power input module 10 toward the docking module 14 if required.

Figure 3:
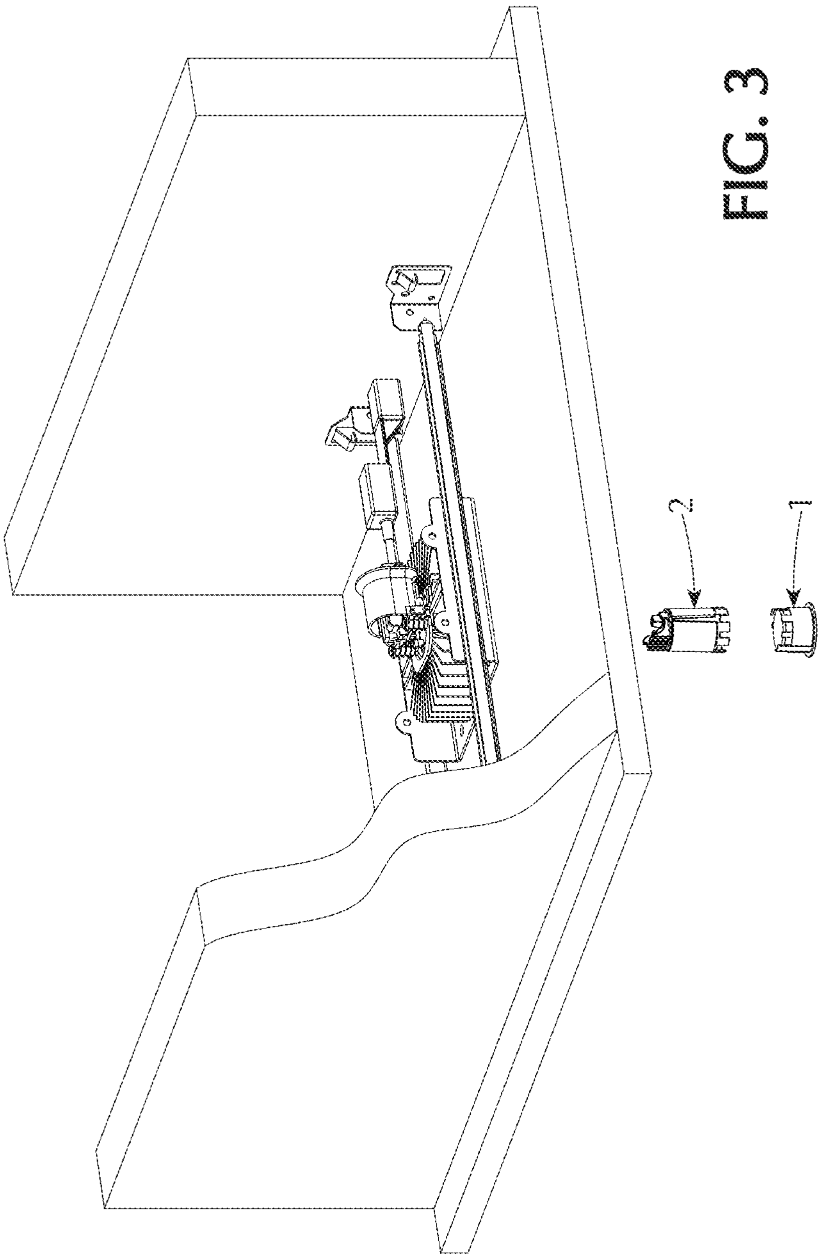
FIG. 3 is an exploded view of the light fixture of FIG. 1 showing the trim/diffuser assembly and the light engine assembly removed from the light fixture from below the ceiling.
Figure 5:
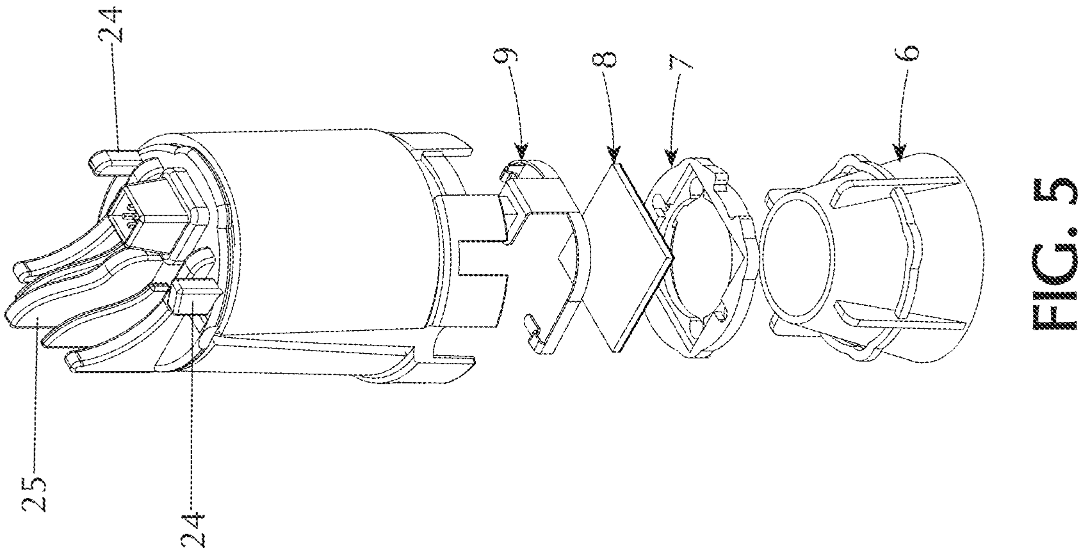
FIG. 5 is an exploded view of the light engine assembly.
Figure 4:
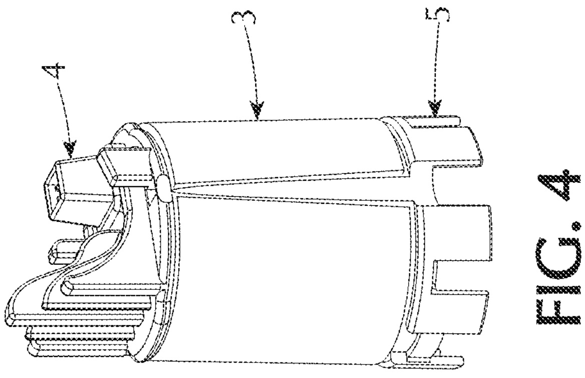
FIG. 4 is a perspective view of the light engine assembly.

Referring to FIG. 3, the trim/diffuser assembly 1 and the light engine assembly 2 are removed through the opening in the ceiling material. The light engine assembly 2 provides the electrical connection to power the LED's, the thermal gap filling pad 3 to provide an interface to the heat dissipation assembly 11 and a thermally conductive (e.g. aluminum) light engine housing 5 that conducts the heat from the LED's and transfers it to the heat dissipation assembly 11 through the thermal pad 3.

The light engine assembly 2 also includes the high-performance reflector 6, the LED light engine module 8, the light engine support/holder 7 and the electrical interconnect 9. The light engine assembly 2 is responsible for providing the highest output light level and light quality based on the input power being supplied to the assembly. Therefore, the reflector, diffuser and trim are specifically designed to provide the optimum light for each LED Light Engine.

The heat dissipation assembly 11 and chassis 12 are installed prior to ceiling installation and remain above the ceiling, fastened to the joists that support the ceiling. The light engine assembly 2 is captured by the two halves of the fined heat exchanger 15 which are spring loaded to close around the outer diameter of the light engine assembly 2, when the light engine assembly 2 is fully inserted into the finned heat exchanger 15. This spring-loaded assembly provides pressure on the thermal pad 3 to insure optimal heat transfer. The electrical connection for the light engine assembly 2 is completed during the insertion process of the light engine assembly 2 insuring a proper electrical connection after assembly.

The power input module 10 can also be removed through the same hole in the ceiling by rotating the pivoting power module dock 14 90 degrees vertically so that the power input module 10 can be removed vertically downwardly out of the hole in the ceiling.

The light engine assembly 2 is insertable through the opening in the ceiling aligned with the aperture and is operable to be selectively urged into connected and disconnected states, from within the room, where a maximal clearance between the opening in the ceiling and the light engine assembly is not substantially greater than required for the light engine assembly to fit through the opening, for example where such clearance is no more than about 0.05-0.25 inches (e.g., no more than about 0.08 inch) for a 1 inch diameter opening (or 5%-25% of the diameter or corresponding dimension of the opening), and the light engine assembly 2 is removable through the opening in the ceiling, from within the room. In this manner, the light engine assembly can be replaced or serviced from within the room without disturbing the ceiling.

Referring to FIGS. 12-23, in second preferred embodiment of the recessed light fixture, the light fixture can include a light engine assembly 102 with a trim/diffuser assembly 101, a light engine lower housing 105, a light engine upper housing 107, a thermal gap filling pad 103, a light engine power connector 104, an LED module 108, an electrical connection 109 to connect the LED module to the light engine power connector 104, a reflector 106, and a diffuser 106'.

The light fixture can also include a power input module 110, a heat dissipation assembly 111, a chassis 112, a pair of hanger bars (not shown).

The heat dissipation assembly 111 can include a finned heat exchanger 115 with a preferably circular opening in a center, which is sized and shaped to closely receive the (e.g., tubular) light engine assembly 102 therein and which can expand to receive the light engine assembly. Preferably, the finned heat exchanger 115 includes a spring 116 which biases the opening in a contracted state but which allows the opening to expand to selectively receive the light engine assembly 102 into the opening. The finned heat exchanger 115 can include two halves connected by the spring 116 such that the two halves can separate slightly against the bias of the spring to enlarge the opening to receive the light engine assembly 102. The two halves of finned heat exchanger 115 can separate in a horizontal direction perpendicular to a vertical axis of insertion of the light engine assembly into the opening of the heat dissipation assembly. For example, one half of the finned heat exchanger 115 can pivot in a horizontal plane relative to the other half to allow expansion and contraction of the opening.

The heat dissipation assembly 111 includes a thermal interface area 117 that surrounds the opening in the finned heat exchanger 115 and is adapted to thermally couple with the thermal gap filling pad 103 of the light engine assembly 102.

The bias of the spring 116 maintains a thermal couple and mechanical/friction couple between the heat dissipation assembly 111 and the light engine assembly 102 to provide both a thermal connection and a mechanical support of the light engine assembly 102.

The light engine assembly 102 is inserted into and removed from the light fixture from within the room, through the opening in the ceiling material. The light engine assembly 102 provides the electrical connection to power the LED's, the thermal gap filling pad 103 provides an interface to the heat dissipation assembly 111 and a thermally conductive (e.g. aluminum) upper light engine housing 107 conducts the heat from the LED's and transfers it to the heat dissipation assembly 111 through the thermal pad 103.

The heat dissipation assembly 111 and chassis 112 are installed prior to ceiling installation and remain above the ceiling, fastened to the joists that support the ceiling, or other support structure. The light engine assembly 102 is captured by the two halves of the fined heat exchanger 115 which are spring loaded to close around the outer diameter of the light engine assembly 102, when the light engine assembly 102 is inserted into the finned heat exchanger 115. This spring-loaded assembly provides pressure on the thermal pad 103 to insure optimal heat transfer. The electrical connection for the light engine assembly 102 is completed during the insertion process of the light engine assembly 102 insuring a proper electrical connection after assembly.

Figure 18:
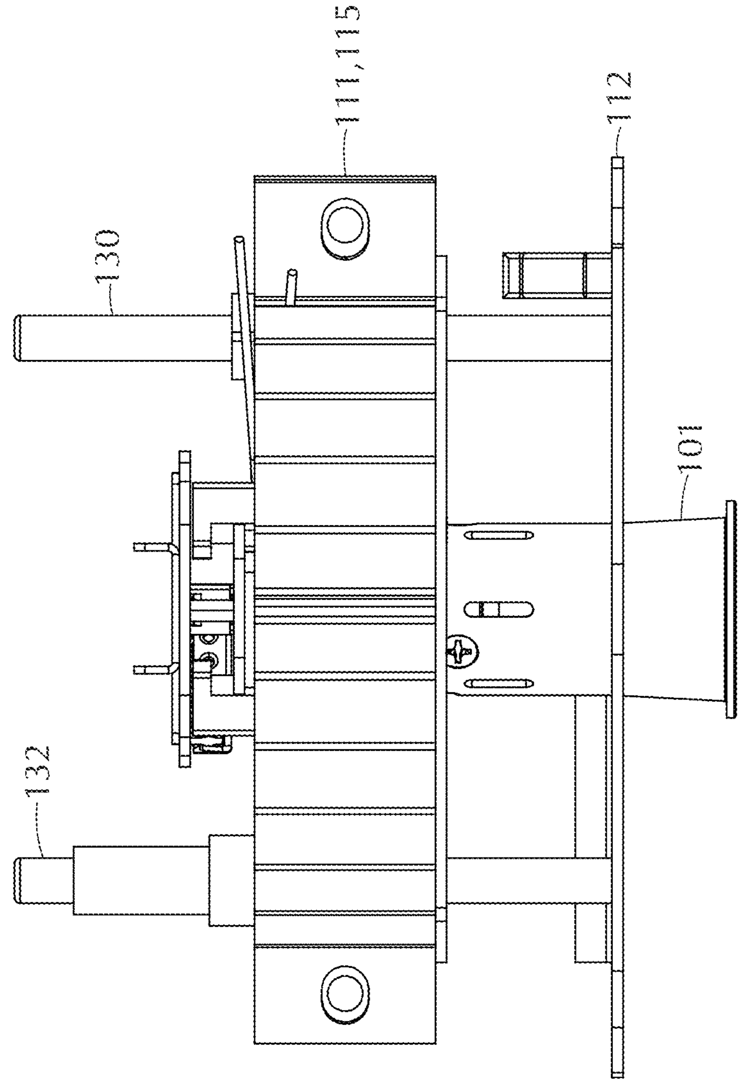
FIG. 18 is a side elevation view of the light fixture of FIG. 15, showing the heat dissipation assembly in an elevated position.
Figure 19:
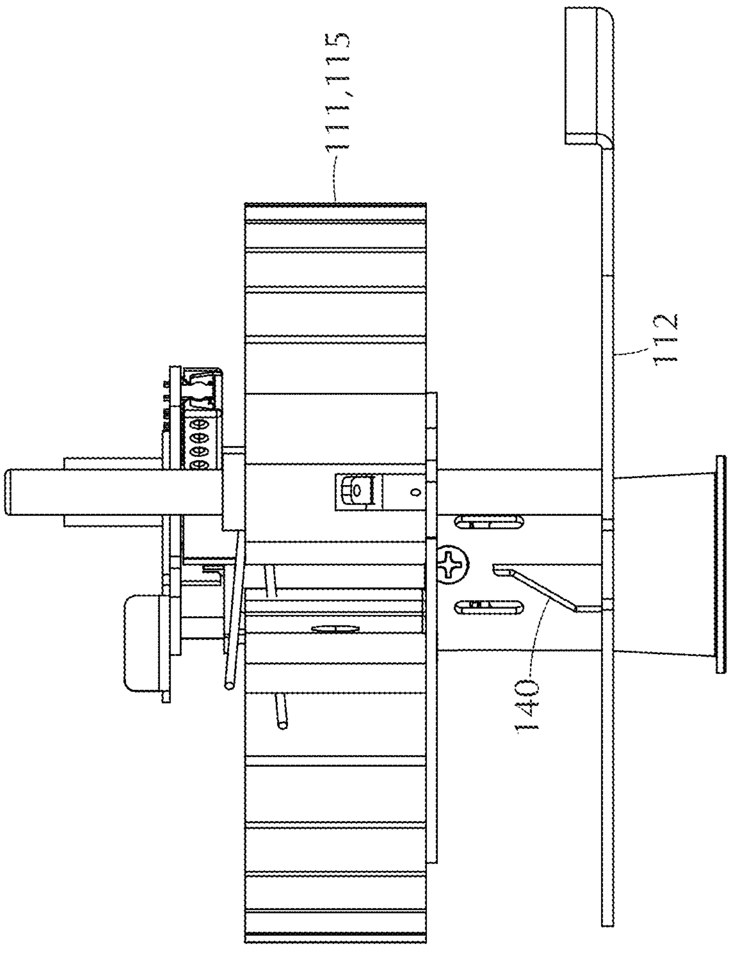
FIG. 19 is a front elevation view of the light fixture of FIG. 15, showing the heat dissipation assembly in an elevated position.
Figure 20:
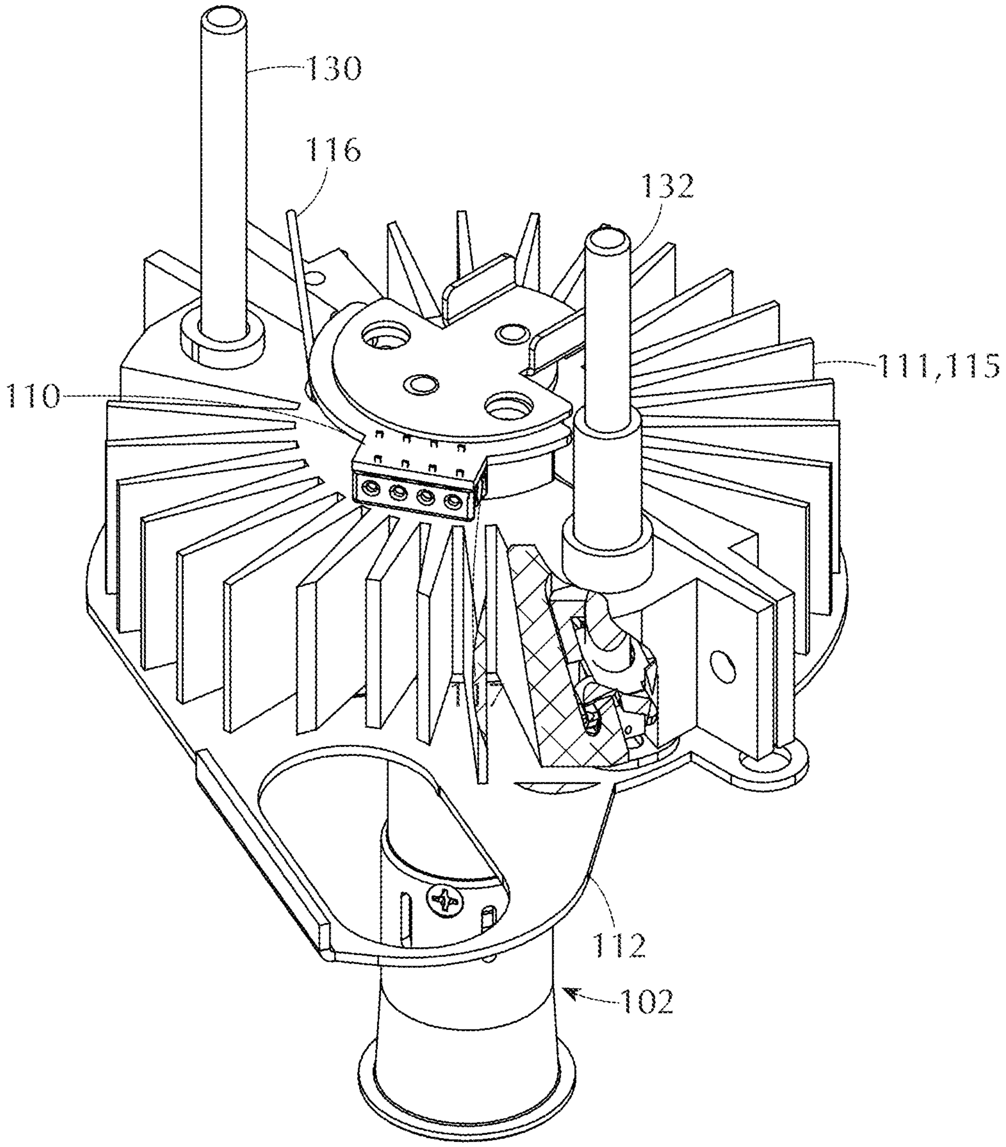
FIG. 20 is a perspective view of the light fixture of FIG. 15, from the top, showing the heat dissipation assembly in a lower limit position.
Figure 21:
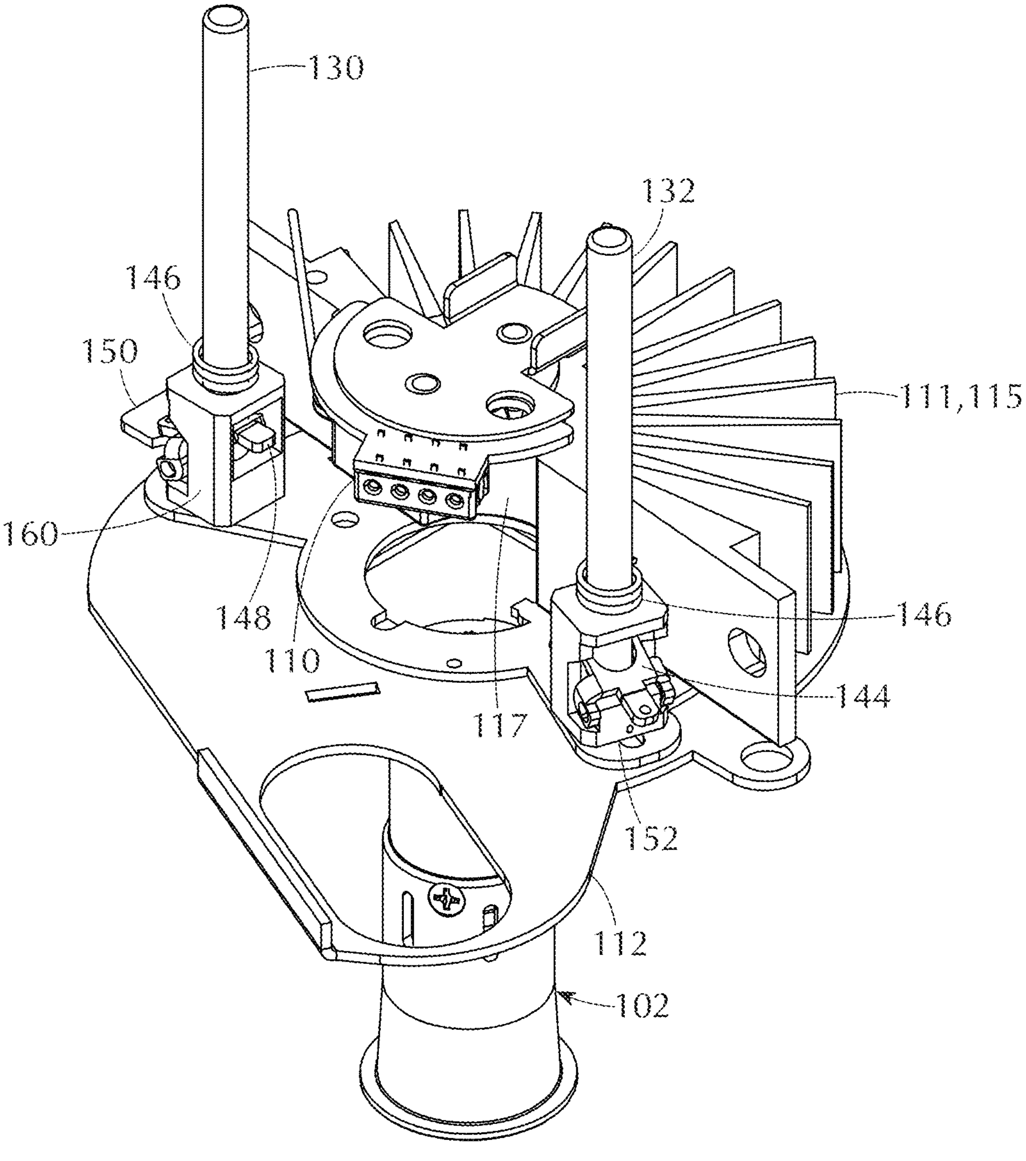
FIG. 21 is a perspective view of the light fixture of FIG. 15, from the top, showing one half of the heat dissipation assembly in a lower limit position, with the other half removed.
Figure 22:
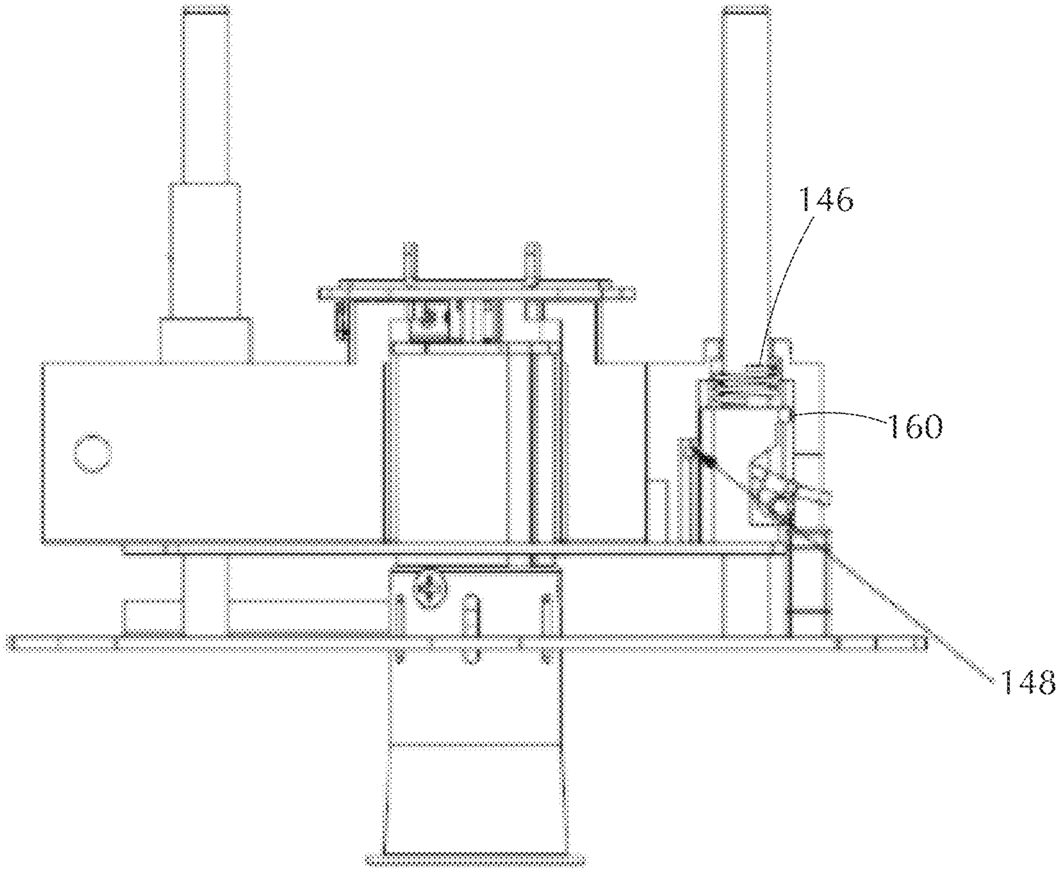
FIG. 22 is a side elevation view of the light fixture of FIG. 15, showing the slide lock.
Figure 23:
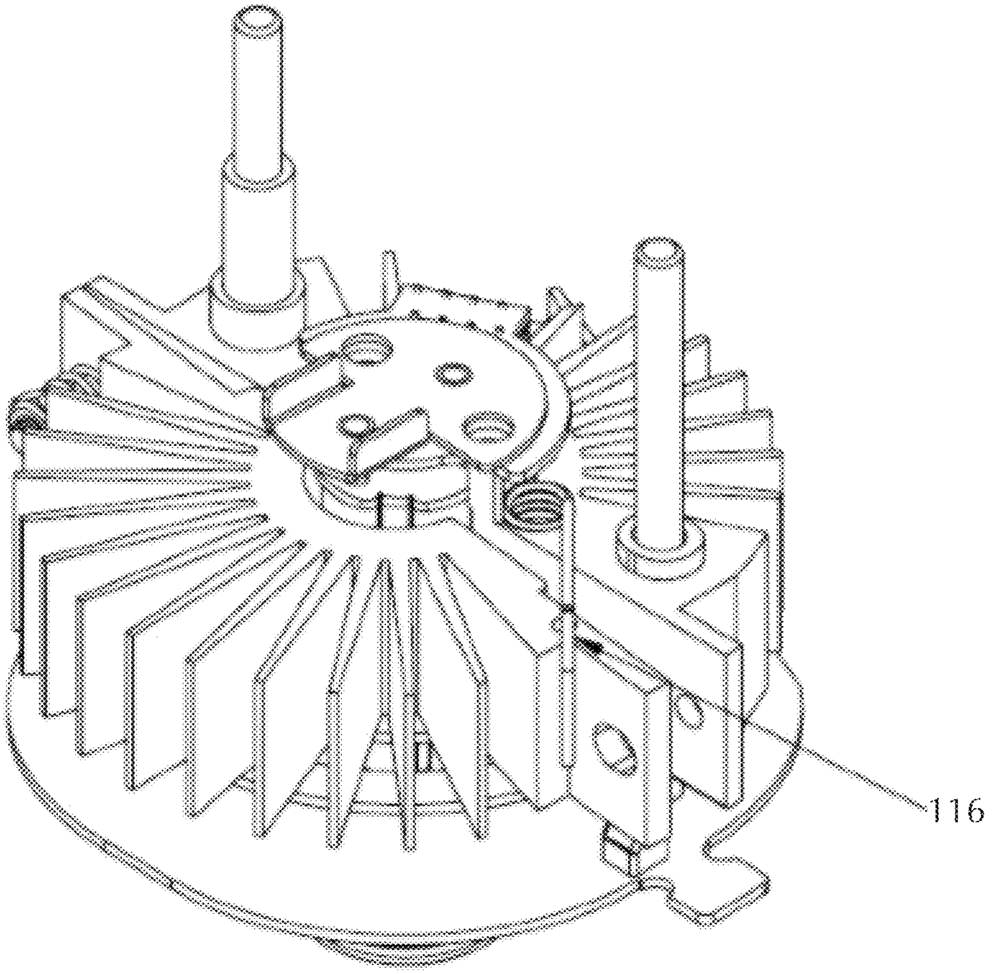
FIG. 23 is a perspective view of the light fixture, from the top.
Figure 24:
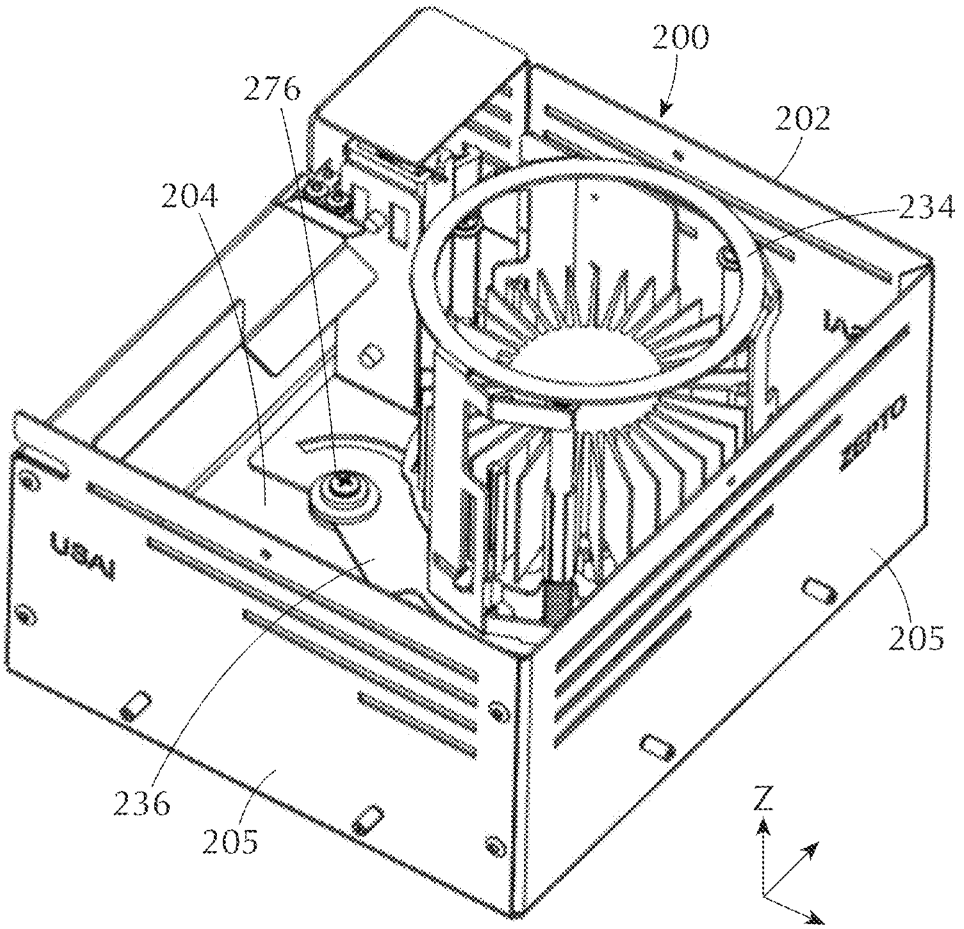
FIG. 24 is a top view of a third preferred embodiment of the inventive light fixture with the top cover removed, and showing the heat sink assembly in the light engine access position.

The heat dissipation assembly 111 is slidably mounted to a pair of guide post 130, 132 connected to and projecting vertically upwardly from the chassis 112 such that the heat dissipation assembly 111 can move vertically relative to the chassis (and ceiling)—guided by the guide posts—from a lower limit position (See FIG. 17) to a number of elevated positions (See FIGS. 18-19). A first half of the heat dissipation assembly 111 has a pair of holes 134, 136 and each one of the guide posts 130, 132 extends through an associated one of the holes. Thus, the heat dissipation assembly 111 is confined to move only vertically relative to the chassis 112, except that the second half can also move laterally (e.g., horizontally pivoting) away from the first half to allow insertion and removal of the light engine assembly.

The light engine assembly 102 is insertable into the heat dissipation assembly 111 when the heat dissipation assembly 111 is in the lower limit position. In this position, the opening in the heat dissipation assembly 111 is in the expanded state and is operable to receive the light engine assembly 102 therein. When the light engine assembly 102 is fully inserted into heat dissipation assembly 111, the power connector 104 makes electrical connection to the power input module 110 to provide a power path to the light engine assembly 102.

Pushing further upwardly on the light engine assembly 102 causes the light engine assembly 102 and heat dissipation assembly 111 to move upwardly from the lower limit position. As the heat dissipation assembly 111 moves upwardly from the lower limit position, the opening contracts around the light engine assembly 102 to make a thermal and mechanical coupling with the engine assembly 102. The light engine assembly 102 can be pushed further upward until the trim element 101 (or a lower flange thereof) is flush with the ceiling lower surface. Preferably, the range of movement of the light engine assembly 102 and heat dissipation assembly 111 relative to the chassis 112 from the lower limit position to a maximal elevated position is preferably at least about 1 inch, and is preferably at least sufficient to accommodate a range of ceiling thicknesses, for example ⅜ inch to 1 inch thick.

To remove or replace the light engine assembly 102 from the light fixture, a downward pulling force is applied to the light engine assembly 102 from within the room, to pull the light engine assembly 102 and heat dissipation assembly 111 downward from the elevated position to the lower limit position. Downward movement of the heat dissipation assembly 111 into the lower limit position causes the heat dissipation assembly 111 to contact a wedge 140 fixed to the chassis 112 which causes the two halves of the heat dissipation assembly 111 to separate against the bias of the spring 116, thereby expanding the opening and releasing the light engine assembly 102.

To assist in the downward movement, the light engine assembly 102 can include a pair of opposed wings 142 which extend laterally (radially) outwardly from the body which abut horizontal surfaces of the opposed halves of the heat dissipation assembly 111 such that a downward force can be exerted on the heat dissipation assembly 111 as the heat dissipation assembly 111 opens up while approaching the lower limit position as described above. The wings 142 can be formed as part of a printed circuit board interconnecting the power connector 104 and electrical connection 109, or another component of the light engine assembly.

To maintain the light engine assembly 102 in a desired elevated position (i.e., flush with the ceiling), the heat dissipation assembly 111 can include a pair of automatic slide locks 150, 152 which engage the guide posts 103, 132 to maintain the heat dissipation assembly 111 in the desired elevated position. Preferably the slide locks allow manual vertical movement of the heat dissipation assembly 111 and light engine assembly 102 but are sufficient to resist the force of gravity such that the heat dissipation assembly 111 and light engine assembly 102 maintain a desired, fixed elevated position when at rest.

Each slide lock can include a base portion 160 which is slidably mounted to one of the guide posts 130, 132. The heat dissipation assembly 111 is supported by the base of the slide lock via a coil spring 146 disposed around the associated guide post such that the heat dissipation assembly 111 can move a certain distance downwardly relative to the slide lock. The slide lock can include a lever 144 which is pivotally connected to the base portion and includes an opening through which the associated guide post extends. The lever 144 is adapted to allow upward movement of the heat dissipation assembly 111 relative to the associated guide post and is adapted to prevent downward movement of the heat dissipation assembly 111 when in a locked state, by engaging the guide post. The lever 144 is biased in an upwardly pivoted (locked) state by a lever spring (not shown). The lever 144 includes a release tab 148 extending therefrom which is engaged by the heat dissipation assembly 111 during lowering to disengage the slide lock.

In operation, when the heat dissipation assembly 111 is moved upwardly into an elevated position as described above, the heat dissipation assembly 111 pushes each slide lock upwardly (e.g., via the base) and when a desired position is reached, the biased lever 144 engages the guide post to prevent downward movement of the heat dissipation assembly 111. To lower the heat dissipation assembly 111, a downward force is applied to the heat dissipation assembly 111 which moves downward relative to each slide lock by compressing the coil spring 146 until the heat dissipation assembly 111 contacts the release tab 148 which causes the lever 144 to pivot downward against the bias of the lever spring resulting in disengagement (unlocking) of the slide lock to allow the heat dissipation assembly 111 to move further downward to the lower limit position. Preferably, the slide lock, when unlocked, provides little to no resistance to downward movement of the heat dissipation assembly 111; and provides little to no resistance to upward movement at all times.

As above, the light engine assembly 102 is insertable through the opening in the ceiling aligned with the aperture and is operable to be selectively urged into connected and disconnected states, from within the room, where a maximal clearance between the opening in the ceiling and the light engine assembly 102 is not substantially greater than required for the light engine assembly to fit through the opening, for example where such clearance is no more than about 0.05-00.25 inches (e.g., no more than about 0.08 inch) for a 1 inch diameter opening (or 5%-25% of the diameter or corresponding dimension of the opening), and the light engine assembly 102 is removable through the opening in the ceiling, from within the room. In this manner, the light engine assembly 201 can be replaced or serviced from within the room without disturbing the ceiling.

Figure 37:
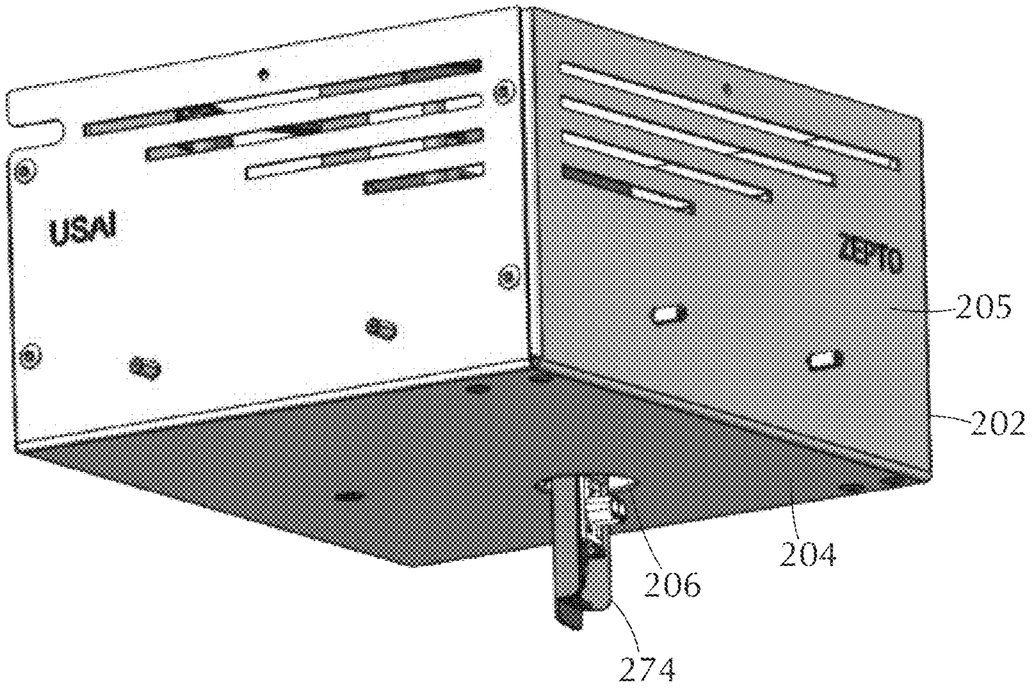
FIG. 37 is a bottom view of the light fixture, showing the lighting driver being removed through the aperture.
Figure 38:
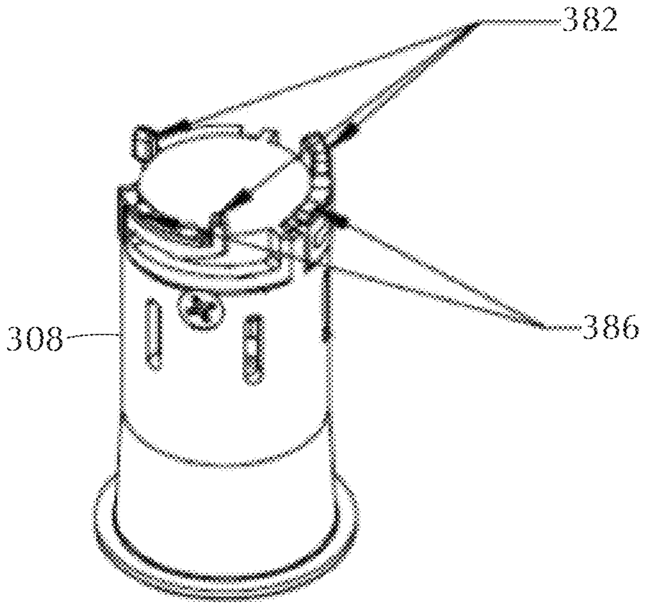
FIG. 38 is a perspective view, from the top, of an embodiment of the light engine.
Figure 39:
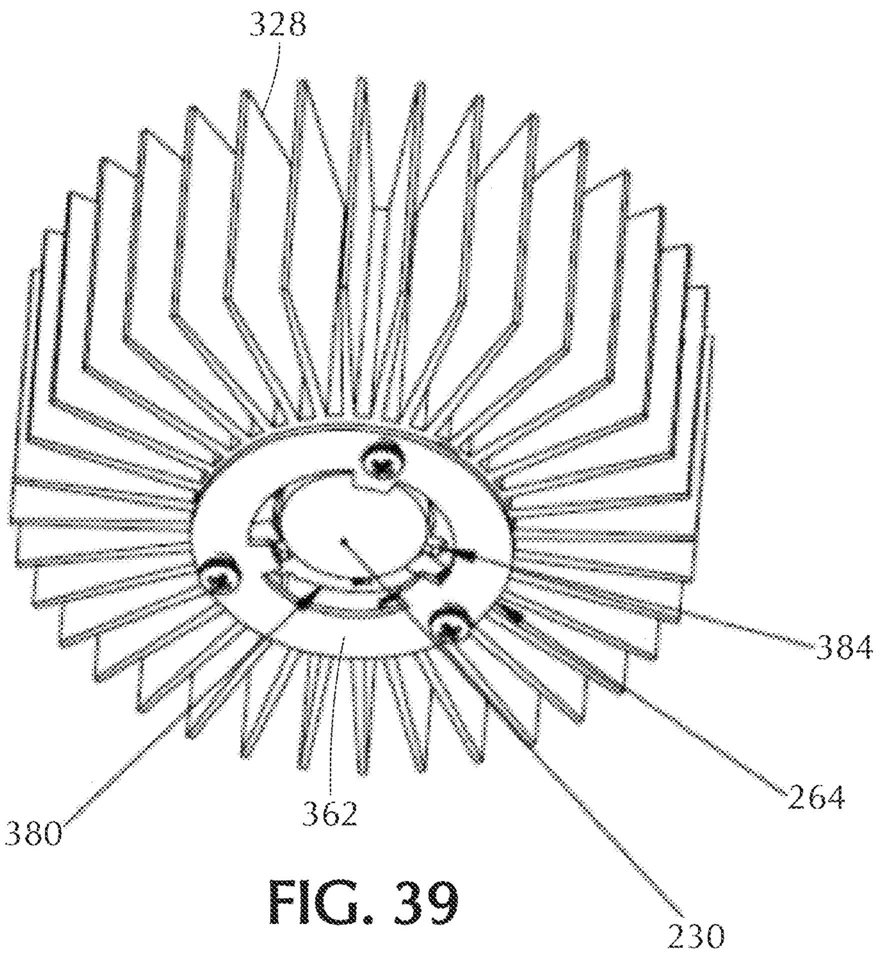
FIGS. 39, 40A and 40B are bottom views of an embodiment of the heat sink adapted for the light engine assembly of FIG. 38.
Figure 40A:
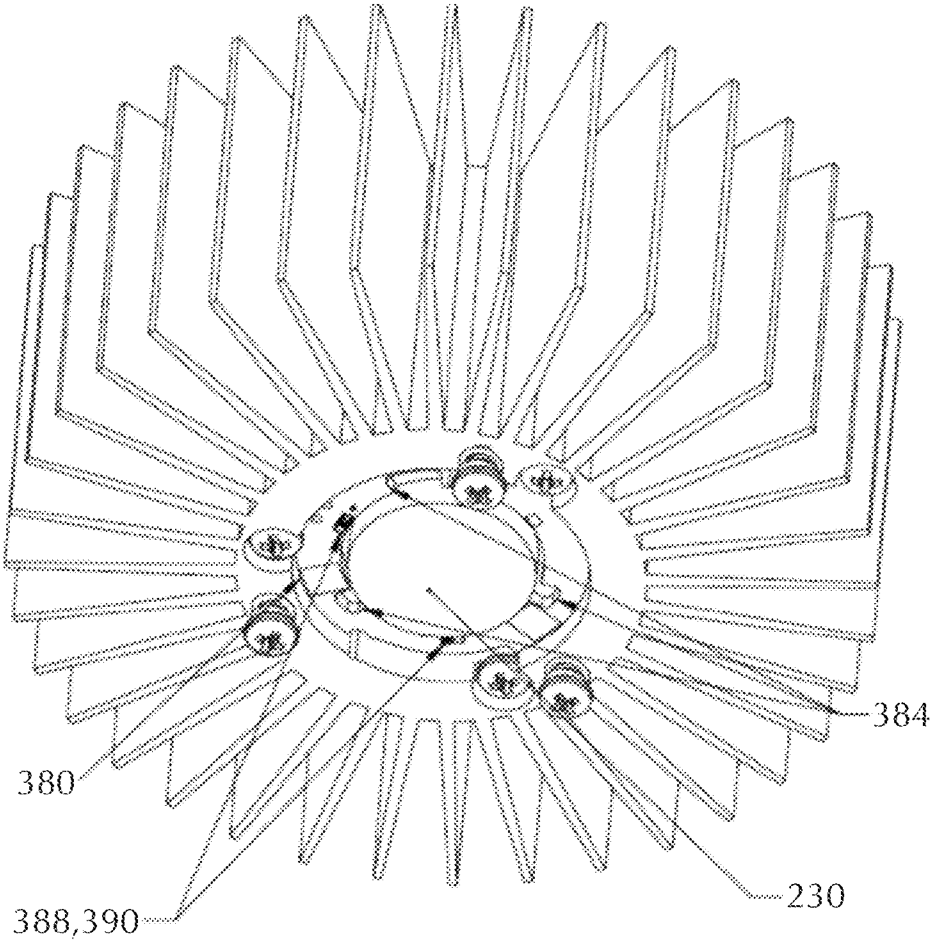
Figure 40B:
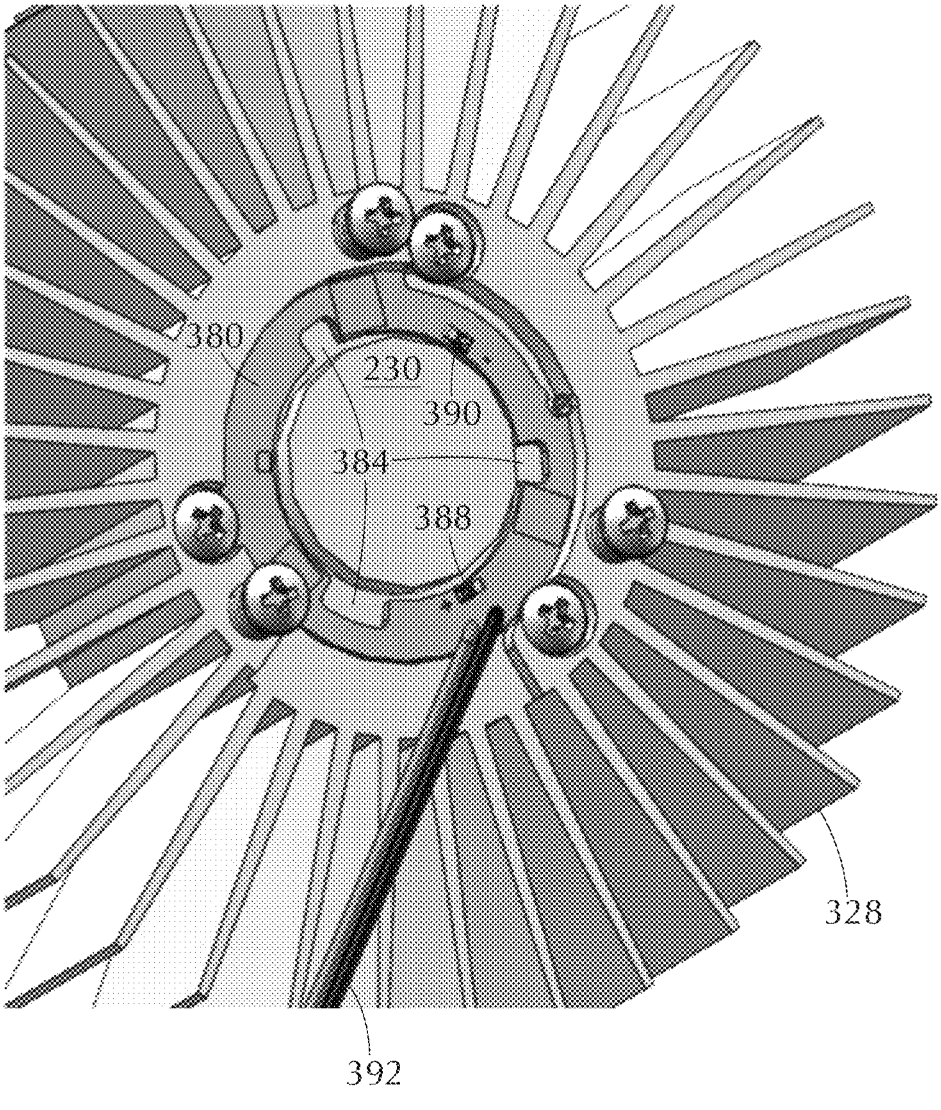
Figure 41:
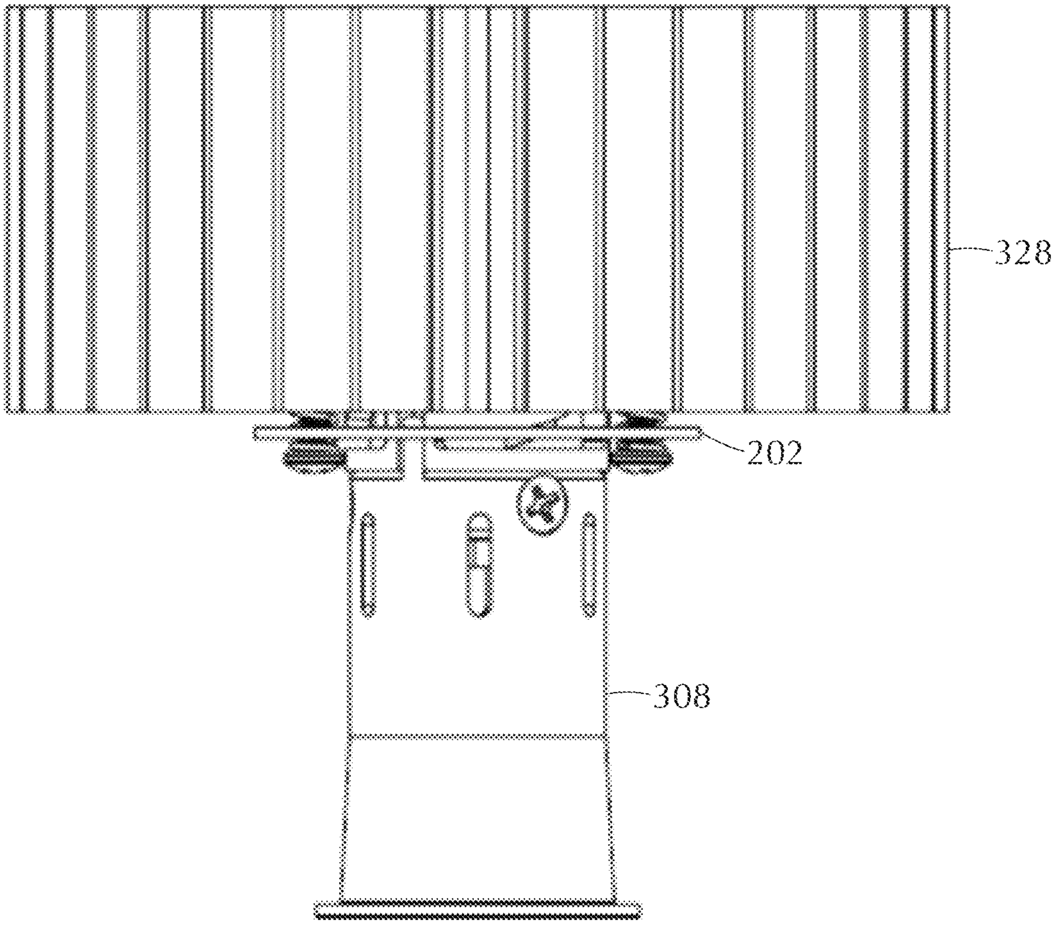
FIG. 41 is a side view of the light engine of FIG. 38 connected to the heat sink.
Figure 42:
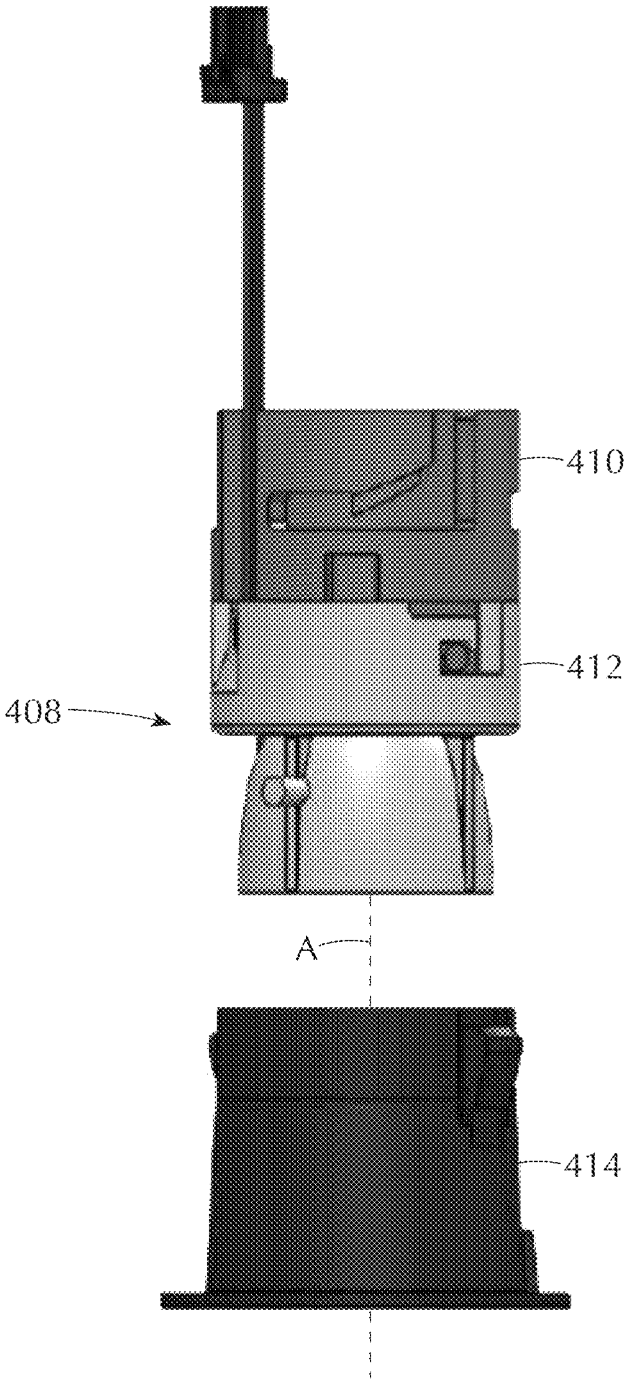
FIG. 42 is a side view of a modular light engine assembly embodiment of the light fixture.
Figure 43:
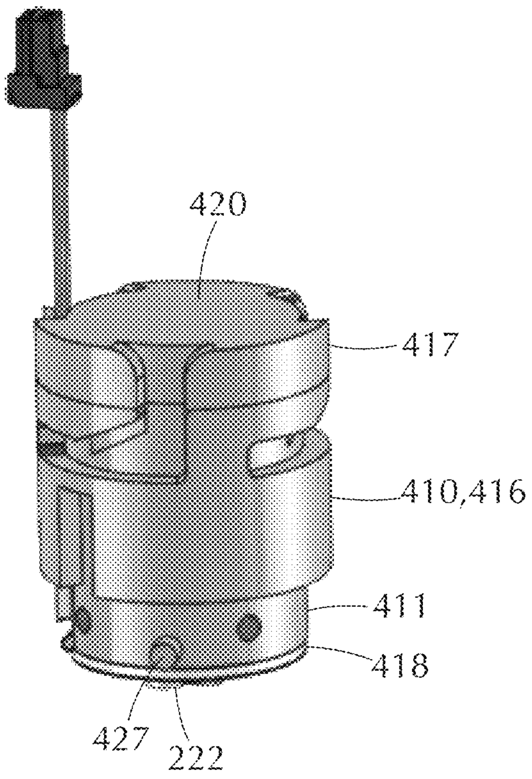
FIG. 43 is a side view of LED module of the light engine assembly of FIG. 42.
Figure 44:
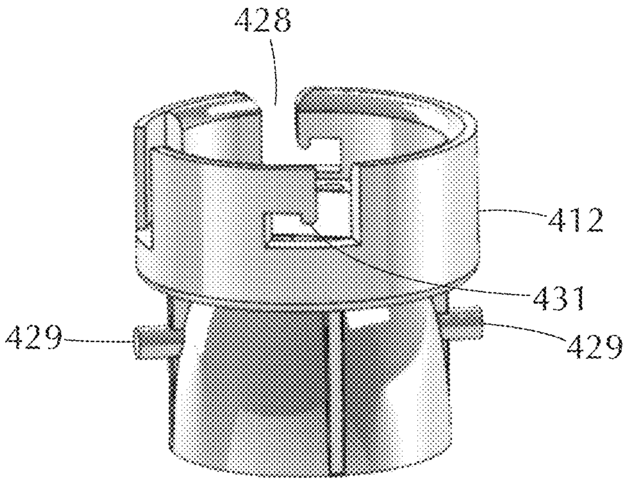
FIG. 44 is a side view of a reflector module of the light engine assembly.
Figure 45:
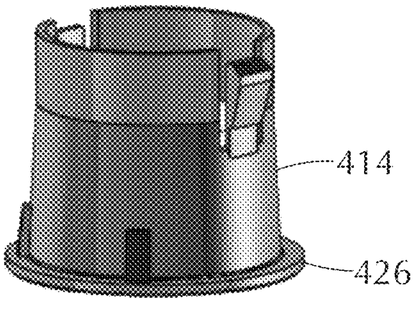
FIG. 45 is side view of a down-light trim module of the light fixture.

Referring to FIGS. 24-37 an embodiment of the light fixture 200 has an enclosure 202 with a top (not shown), side walls 205, and a bottom wall 204 with an aperture 206 therethrough (FIGS. 35 & 37), of for example a diameter of about 1 inch or more. The enclosure 202 is adapted to be fastened to support structure above a ceiling structure 272 (for example via hanger bars), and remains above the ceiling.

The light fixture 200 includes a light engine assembly 208 (FIG. 28), which can include an LED module 210, a reflector 212 (FIG. 34) and a trim element 214. The LED module 210 can have a base 216 with a lower portion 211 having a lower surface 218 (normally downwardly facing), and with an upper portion 217 having an upper surface 220 (normally upwardly facing). An electrical connector 223 can be connected to the LED 222 by wires and is operable to releasably connect to the lighting driver 274 to power the LED. The light engine assembly 208 is adapted to be removed from the enclosure 202 through the aperture 206 of the enclosure 202 and the opening 273 in the ceiling 272, from within the room, without removing the enclosure 202 and without disturbing the ceiling.

At least one LED 222 (FIG. 27) (for example a 6 mm chip-on-board (COB) LED) can be mounted to the lower surface 218 of the base 216, and is operable to emit light through the light engine assembly 208 and into the room. The trim element 214 can be connected to the base 216, such as by one or more screws 215, and preferably surrounds the lower portion 211 of the base 216 and LED 222. The reflector 212 can be disposed within the trim element, around the LED 222.

Portions of the lower and upper surfaces 218, 220 of the base 216 form lower and upper thermal interfaces 224, 226, which are preferably substantially planar; however, the thermal interfaces can be stepped with several portions which on different planes. The upper portion 217 of the base 216 can be substantially cylindrical in shape, with a substantially circular cross section and with the upper surface 220 (and thermal interface 226 thereof) being substantially circular. For a light fixture configured for about a 1 inch diameter ceiling opening, for example, a maximal outside diameter of the upper portion 217 of the base 216 can be about 0.96 inches and the surface area of the upper thermal interface 226 can be about 0.72 square inches (π*(diameter squared)/4). For such an application, the base 216 can have a height of about 0.9 inches between the upper and lower surfaces thereof.

The base 216 of the LED module 210 is preferably adapted and operable to effectively conduct heat generated by the LED 222 from the lower thermal interface 224 to the upper interface 226. The base 216 can be solid (or at least substantially solid) and can include (or consist or consist essentially of) one or more materials having high thermally conductivity, such aluminum or copper, or another suitable metal or alloy, or non-metallic material.

The light fixture 200 can also include a heat sink 228 which has a preferably planar thermal interface 230 (FIG. 26) which is configured for thermal connection with the upper thermal interface 226 of the base 216 of the LED module 210, and which is aligned with and disposed over the aperture 206 of the enclosure 202. The heat sink 228 has a plurality of fins 231 which are integrally form with and/or thermally connected to the thermal interface 230, such that the heat sink 228 is adapted and operable to receive heat generated by the LED 222 through the thermal interface 230 and to dissipate such heat to ambient air through the fins 231. As depicted, the fins 231 can project laterally (horizontally) radially outwardly from a main body of the heat sink. The heat sink 228 is preferably larger than the aperture 206 of the enclosure 202 and is not removable through the aperture 206. Therefor, the heat sink 228 preferably remains within the enclosure 202 (and above the ceiling 272) during servicing of the light engine assembly 208 as described herein.

The heat sink 228 is a component of a heat sink assembly 232 which includes a frame 234 having a base 236, a top 238 and a plurality of legs 240 (for example three legs) interconnecting the base and top 236, 238. The base 236 of the frame 234 includes an aperture 242 through which the light engine assembly 208 is received, as discussed below.

Figure 25A:
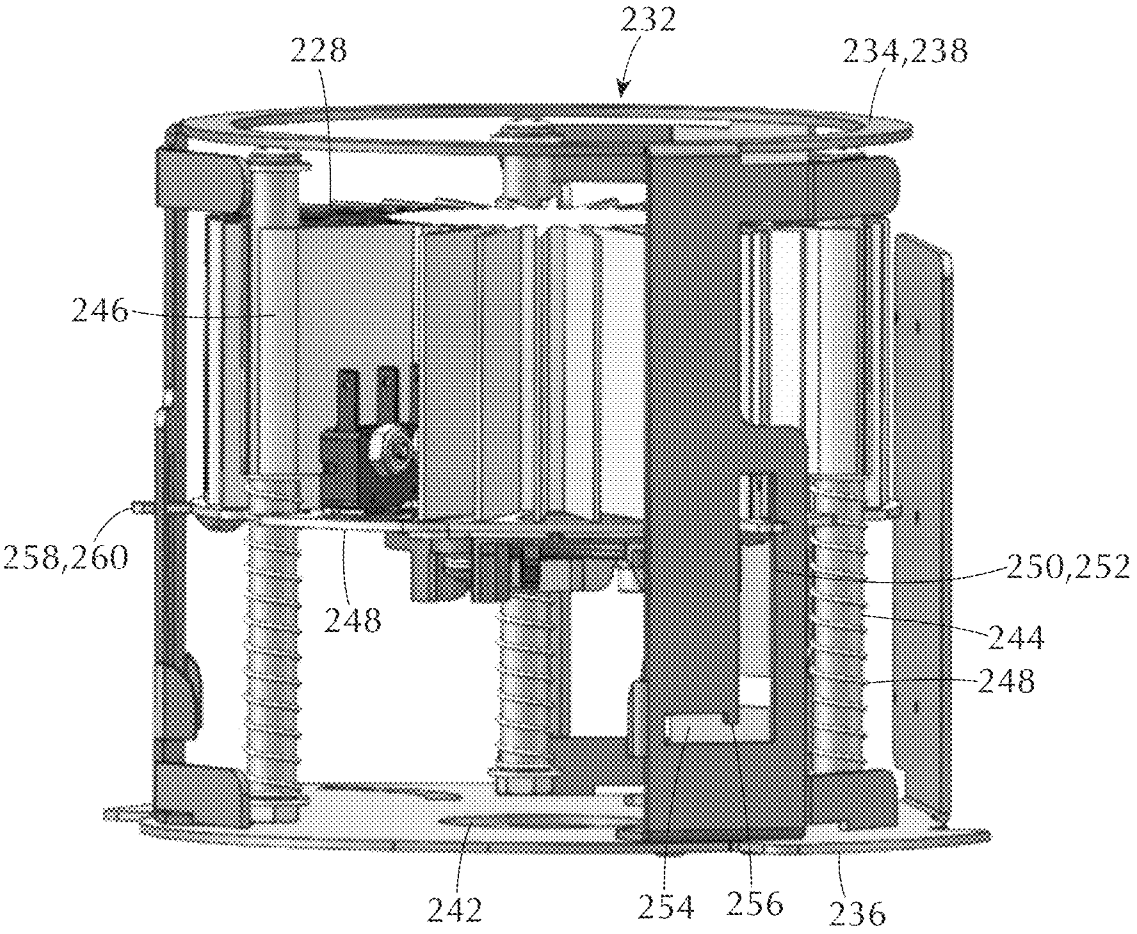
FIG. 25A is a side elevation view of the heat sink assembly, of the light fixture of FIG. 24, with the heat sink shown in the elevated position.
Figure 25B:
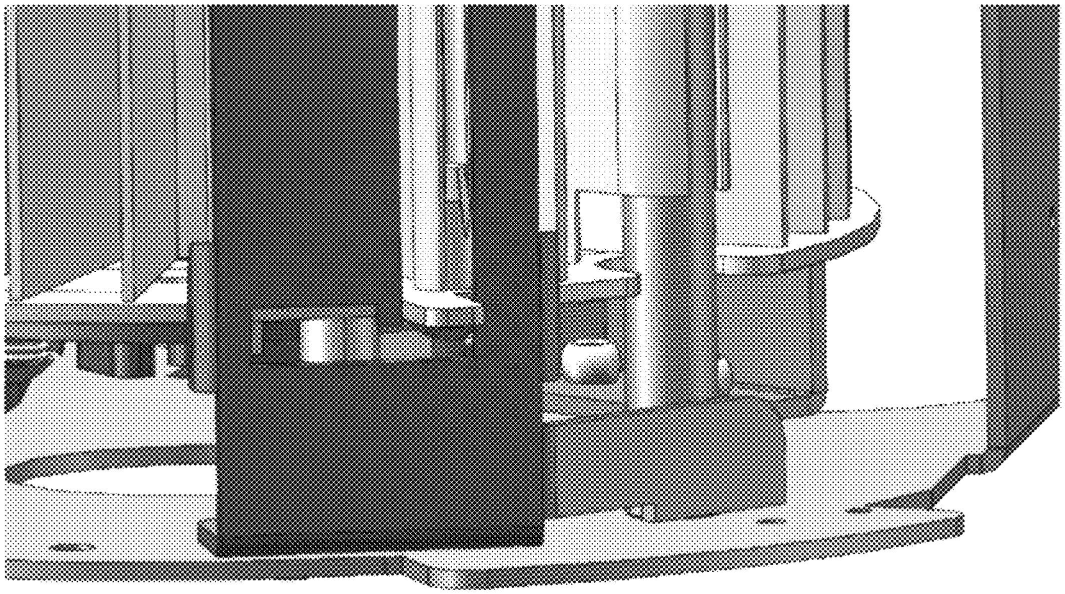
FIG. 25B is a side elevation view of the heat sink assembly of the light fixture of FIG. 24, with the heat sink shown in the lowered, unlocked position.

Referring to FIGS. 25A and 25B, the heat sink 228 is preferably movably mounted within the frame 234 such that the heat sink 228 can move, for example, vertically (parallel to a Z axis) relative to the frame, between an elevated limit position (FIG. 25A) and a lowered limit position (FIG. 25B). The heat sink 228 can be slidably mounted on a plurality of (e.g., three) guide posts 244 disposed within the frame 234 which are vertically oriented and are located around the periphery of the heat sink 228. The periphery of the heat sink 228 can include a plurality of channels 246, each vertically oriented and sized and shaped to slidably receive and confine one of the guide posts 244. As depicted, the guide posts 224 can be cylindrical in shape and the channels 246 can have a complementary tubular (or partially tubular) shape, sized to closely (but slidably) confine the guide posts.

Preferably, the heat sink 228 is biased in the elevated limit position, which can be effected by, for example, compression springs 248, disposed around the guide posts 244 between the base 236 of the frame 234 and the heat sink 228, and preferably contacting the associated channel 246 of the heat sink 228. Preferably, the springs 248 are in compression (or at rest) when the heat sink 228 is in the elevated position (FIG. 25A) such that the heat sink 228 is biased toward the elevated position.

Figure 25C:
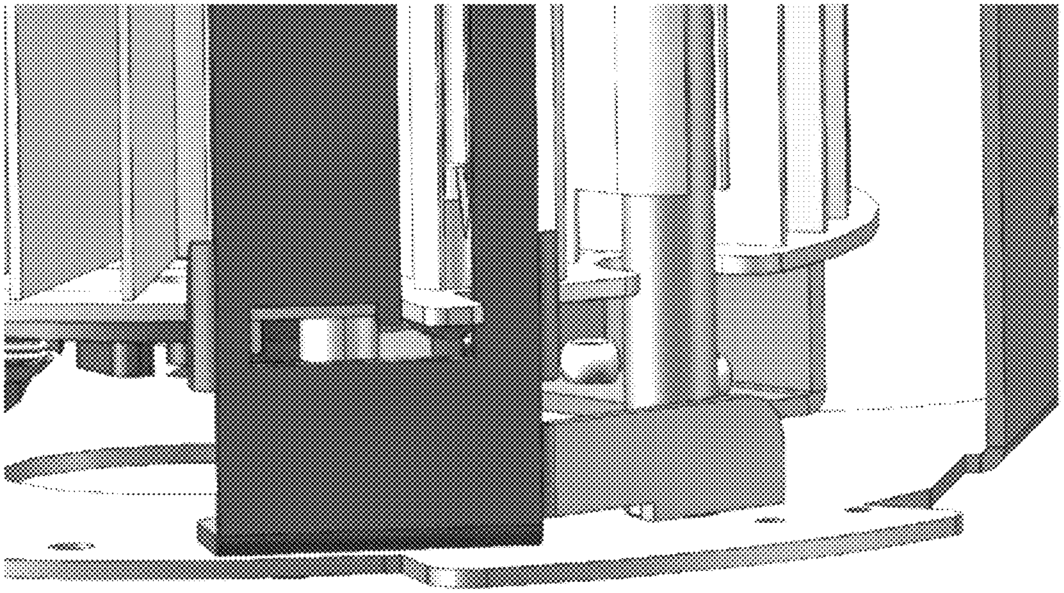
FIG. 25C is a side elevation view of the heat sink assembly of the light fixture of FIG. 24, with the heat sink shown in the lowered, locked position.

As described further below, the heat sink 228 can preferably rotate relative to the frame 234 about the vertical axis (Z axis) between a lowered unlocked position (FIG. 25B) and a lowered locked position (FIG. 25C). Preferably, the guide posts 244 are confined between, but are not connected to, the base 236 and top 238 of the frame 234, and the legs 240 thereof, such that the sub-assembly of the heat sink 228 and guide posts 244 can rotate within and relative to the frame 234 about the vertical axis (Z axis) a predetermined amount.

Each leg 240 of the frame 234 preferably includes a guide slot 250 having vertical portion 252 connected, at a bottom thereof, to a horizontal portion 254. The horizontal portion 254 of at least one guide slot 250 includes a locking projection 256 extending vertically downwardly at or adjacent the junction of the horizontal and vertical portions.

The heat sink assembly 232 can include a plurality of radially outwardly projecting guide tabs 260 each of which extend through an associated one of the guide slots 250 in the legs 240 of the frame 234 to guide the vertical and rotational movement of the heat sink 228 relative to the frame 234. The projecting guide tabs 260 can be part of a bottom plate 258 which is integral or connected to a bottom of the heat sink 228. The bottom plate 258 of the heat sink can include an aperture 259 which is aligned with the aperture 242 of the base 236 of the heat sink assembly 232, and through which the light engine assembly 208 is received.

During vertical movement of the heat sink 228, between the elevated position and the lowered position, each guide tab 260 moves within and is guided by the vertical portion 252 of the associated guide slot 250 of a guide post 240. During rotational movement of the heat sink 228 between the lowered unlocked position (FIG. 25B) the lowered locked position (FIG. 25C), each guide tab 260 moves within and is guided and limited by the horizontal portion 254 of the associated guide slot 250. A vertical height of each horizontal portion 254 is less than a corresponding vertical height of the associated guide tab 260 such that, when the guide tab is in the lowered locked position, guide tab 260 is urged upward by the aforementioned upward bias of the heat sink 228 due to compression springs 248, such that the heat sink 228 is prevented from moving into the lowered unlocked position, by the locking projection 256. To move the heat sink 228 into the lowered, unlocked position, the heat sink is urged downwardly against the upward bias until the guide tab 260 is below the locking projection 256, and then the heat sink 228 can be rotated such that the guide tab 260 moves past the locking projection 256 and into the vertical portion 252 of the guide slot 250. At this point the upward bias will urge the heat sink 228 into the elevated position.

Figure 26:
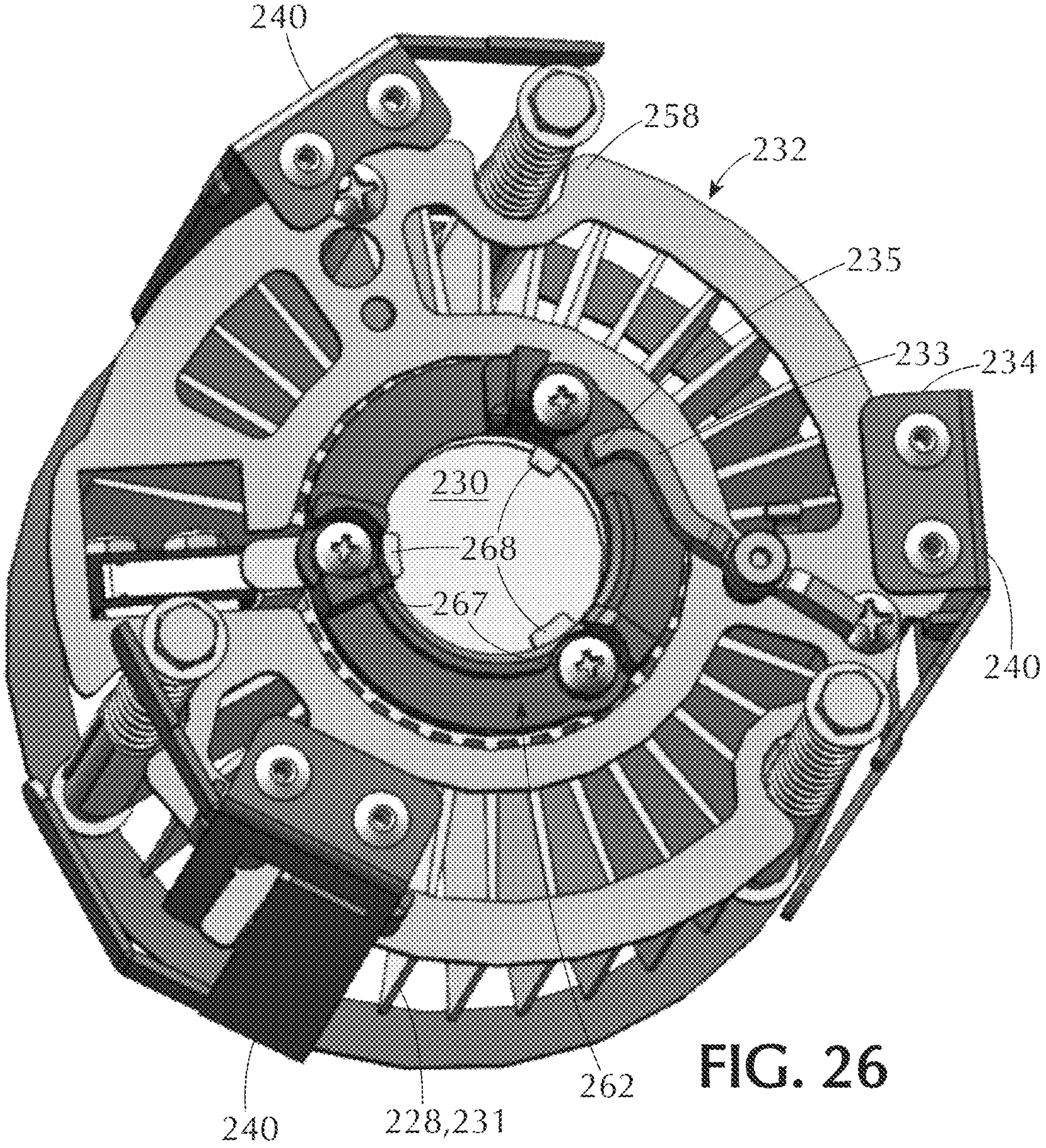
FIG. 26 is a bottom view of the heat sink assembly.

Referring to FIGS. 26-32, the heat sink 228 includes a bayonet connector 262 which is disposed within the enclosure 202 and is operable for releasably mounting the light engine assembly 208 to the heat sink with a twisting motion about an insertion axis A, from within the room. FIG. 26 shows a locking ring 264 of the bayonet connector 262, which is ring-shaped and is disposed around the thermal interface 230 of the heat sink 228. The locking ring 264 can move vertically (Z axis) relative to the main body of the heat sink 228. The vertical movement of the locking ring 264 is guided and limited by guide screws 267 which are directed through the locking ring and into the body of the heat sink 228 and which prevent rotational movement of the locking ring 264 relative to the heat sink 228. The locking ring 264 is biased toward the main body of the heat sink 228, by a plurality of compression springs 266 disposed around the guide screws 267 below the locking ring 264.

The locking ring 264 has a plurality of (for example, three) locking tabs 268 which project horizontally radially inwardly from an inner circumference of the locking ring, and which are configured to engage with an associated one of an equal number of bayonet slots 270 (FIG. 28) in the upper portion 217 of the base 216 of the light engine assembly 208. Each bayonet slot 270 of the base 216 has an opening on the upper surface 220 of the base 216 which is configured to receive an associated locking tab 268 of the locking ring 264 and has a channel which extends partially around a periphery of the upper portion 217 of the base below the upper surface 220 thereof, and which communicates with the opening of the slot.

Figure 29:
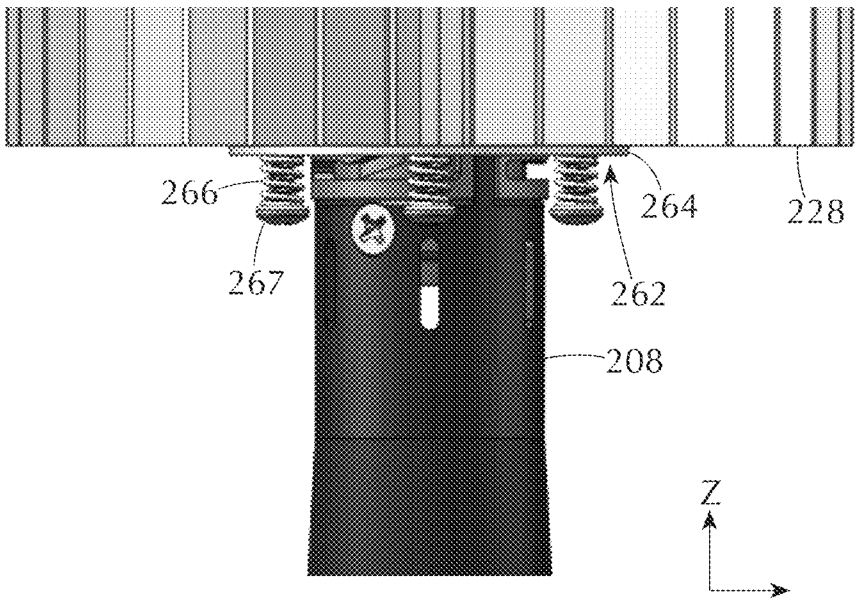
FIG. 29 is a side view of the light engine assembly in the disconnected state, and ready to be connected to or removed from the heat sink.
Figure 30:
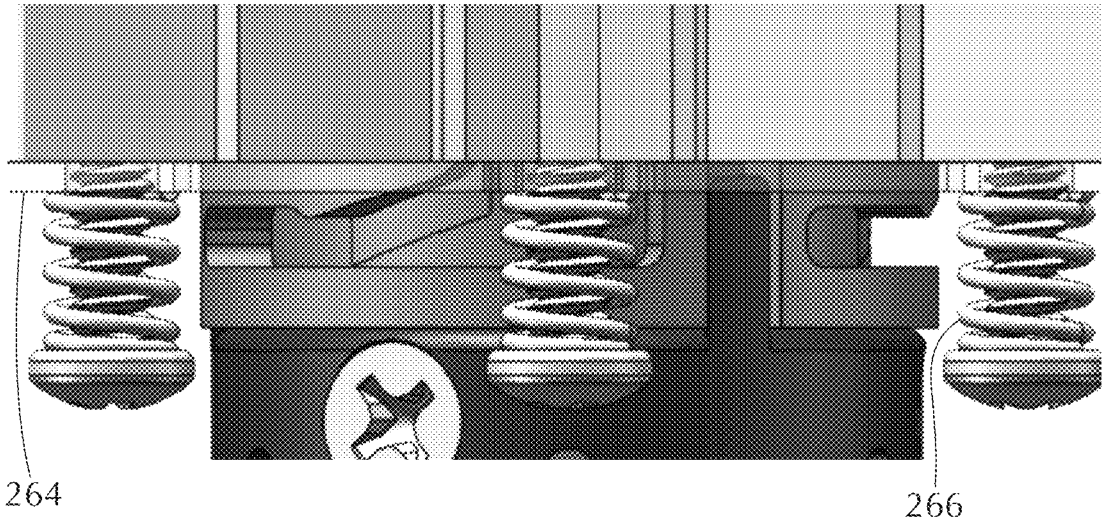
FIG. 30 is a close up view of the disconnected state of FIG. 29, showing the locking ring shown as translucent.
Figure 31:
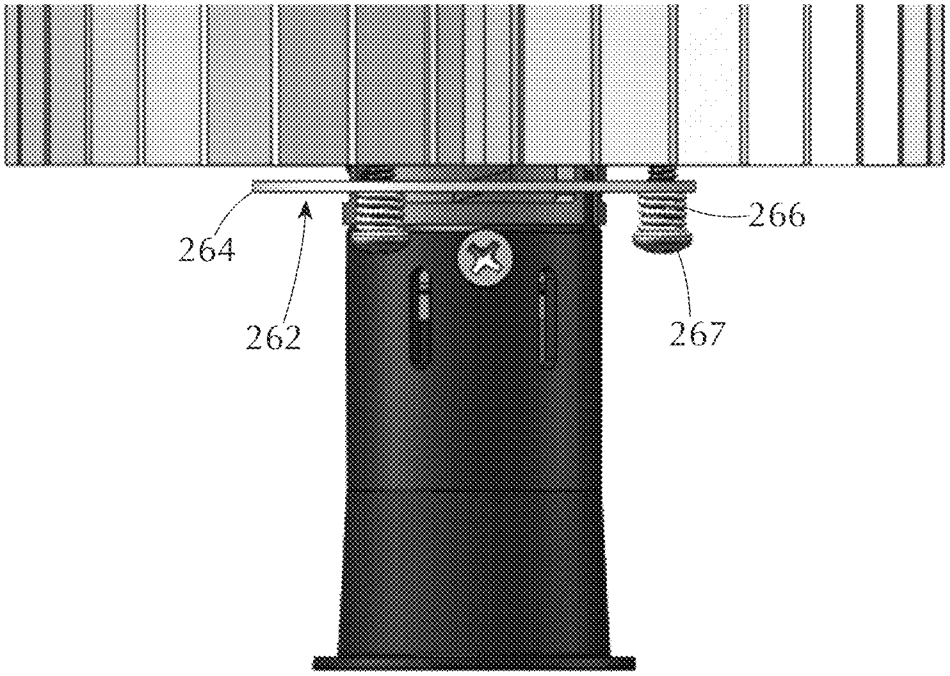
FIG. 31 is a side view of the light engine assembly in the connected state with the heat sink.
Figure 32:
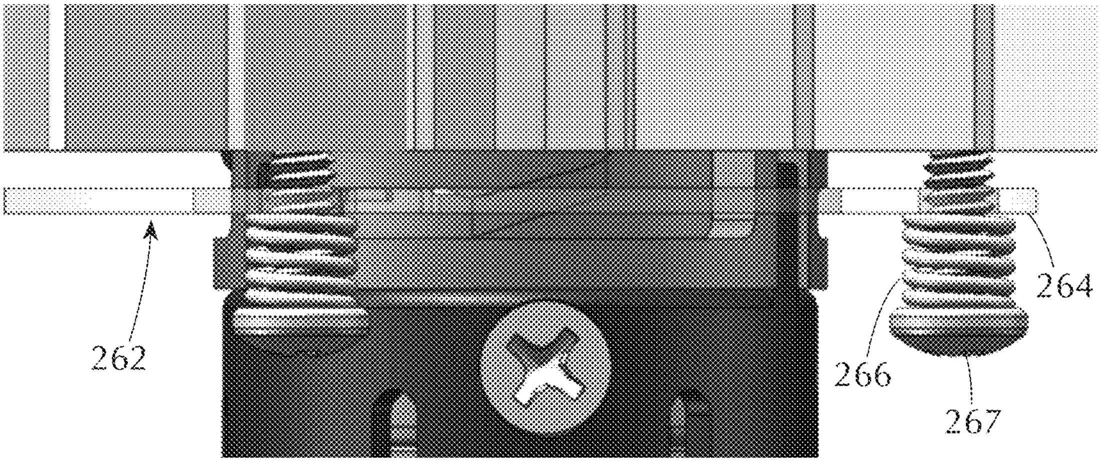
FIG. 32 is a close up view of the connected state of FIG. 31, showing the locking ring shown as translucent.

FIGS. 29 and 30 are side views of the light engine assembly 208 in a disconnected state, ready to be connected to, or removed from, the heat sink 228. FIG. 30 is a close up view of the disconnected state of FIG. 29, showing a locking ring 264 of the bayonet connector 262 as translucent. FIGS. 31 and 32 are side views of the light engine assembly 210 in a connected state with the heat sink 228. FIG. 32 is a close up view of the connected state of FIG. 30, showing a locking ring 264 of the bayonet connector 262 as translucent.

Figure 33:
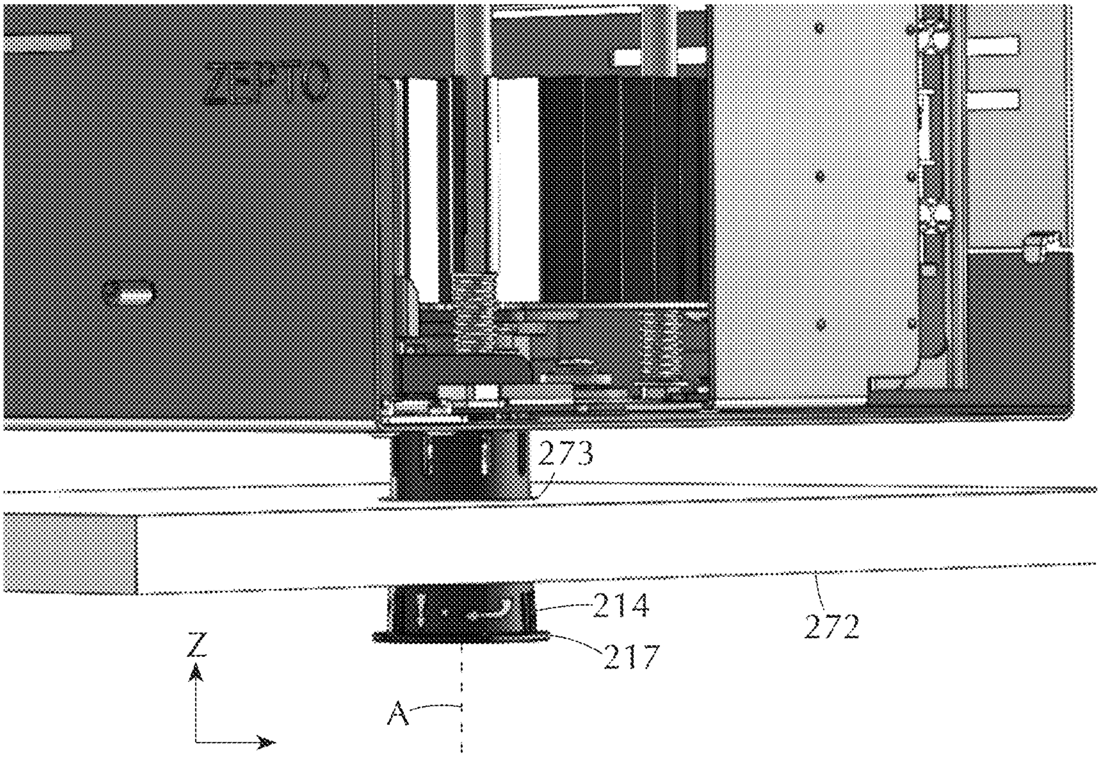
FIG. 33 is a side elevation view of light fixture, showing the heat sink in the lower position and the light engine assembly connected thereto.
Figure 47:
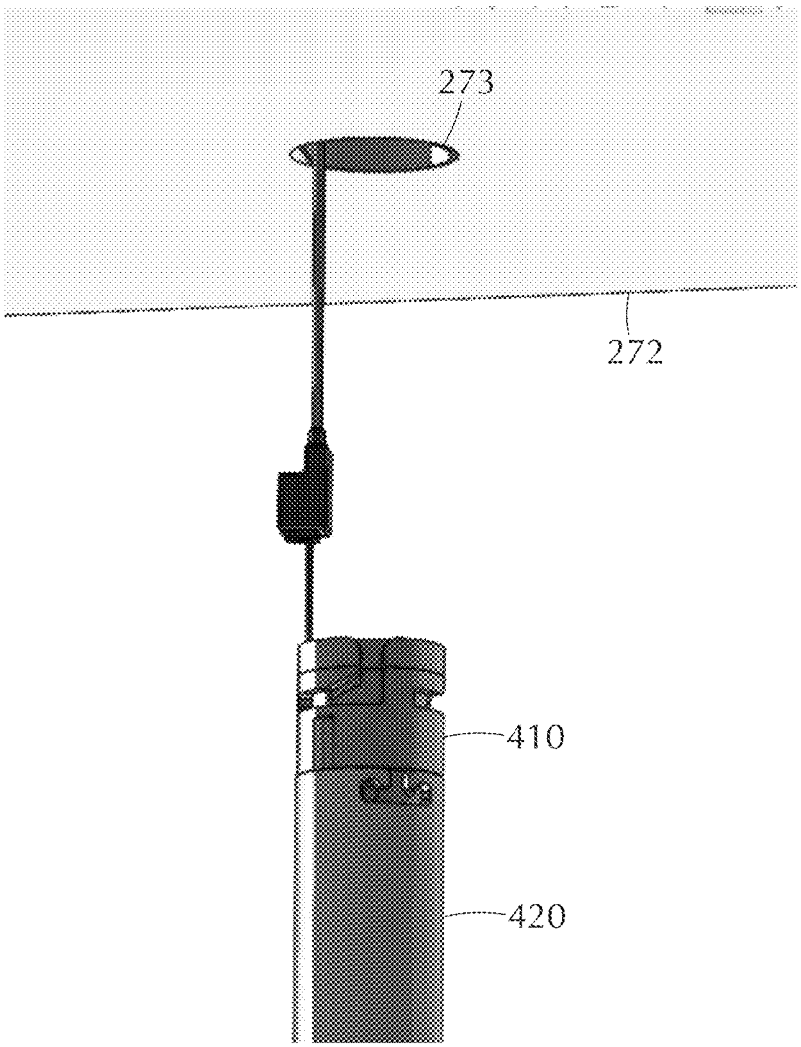
FIG. 47 is side view of the service tool connected to the LED module.

Referring to FIGS. 33, when the heat sink 228 is in the lowered, locked position (FIGS. 33 and 25C), the trim element 214 extends below the ceiling 272 and can be grasped by hand. In this position, the light engine assembly 208 can be connected and disconnected to the heat sink 228. To connect the light engine assembly 208 to the heat sink, the electrical connector 223 of the light engine assembly 208 can be connected to a complementary electrical connector connected to the lighting driver 274 and extending through the opening 273 of the ceiling 272 (e.g., as shown in FIG. 47), then the light engine assembly 208 can be inserted axially vertically upwardly along the insertion axis A through the opening 273 in the ceiling 272 and through the aperture 206 of the enclosure until the upper thermal interface 226 of the base 216 contacts the thermal interface 230 of the heat sink 228. At this point, the light engine assembly 208 is in the disconnected state (FIGS. 29 & 30). Then, the light engine assembly 208 can be urged into the connected state (FIGS. 31 & 32) by manually rotating the light engine assembly 208 by the trim element 214, for example by about 30-40 degrees in a first rotational direction, about the vertical insertion axis A, which is preferably in a clockwise direction as viewed from within the room. The insertion axis A can be an optical axis of the LED 222 and/or of the light engine assembly, which can be parallel to a vertical (Z) axis. When the light engine assembly 208 is in the connected state (and when transitioning between the connected and disconnected states) the insertion axis A preferably passes through centers of, and is perpendicular to, the thermal interfaces 216, 230.

When the light engine assembly 208 is in the connected state (FIGS. 31 & 32), it can be urged into the disconnected state (FIGS. 29 & 30) by rotating the light engine assembly 208 by the same amount, but in an opposite rotational direction about the insertion axis A, for example in a counter-clockwise as viewed from the room. When in the disconnected state, the light engine assembly 208 can be removed axially vertically downwardly along the insertion axis A through the aperture 206 of the enclosure and the opening 237 of the ceiling 272. In this manner, the light engine assembly 208 can be readily serviced from within the room, without disturbing the ceiling and without the use of large radius trims.

Figure 34:
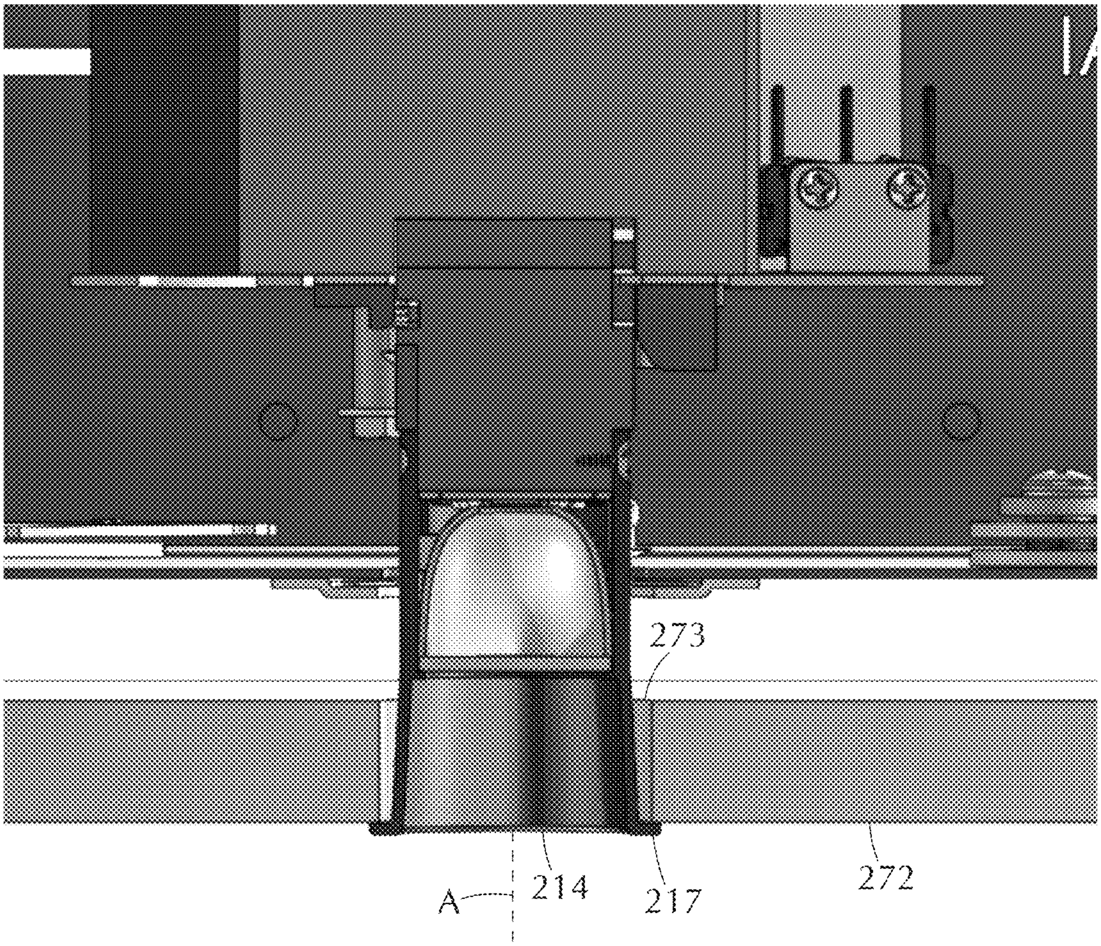
FIG. 34 is a side cross section view of light fixture, showing the heat sink in the elevated position and the light engine assembly connected thereto.
Figure 35:
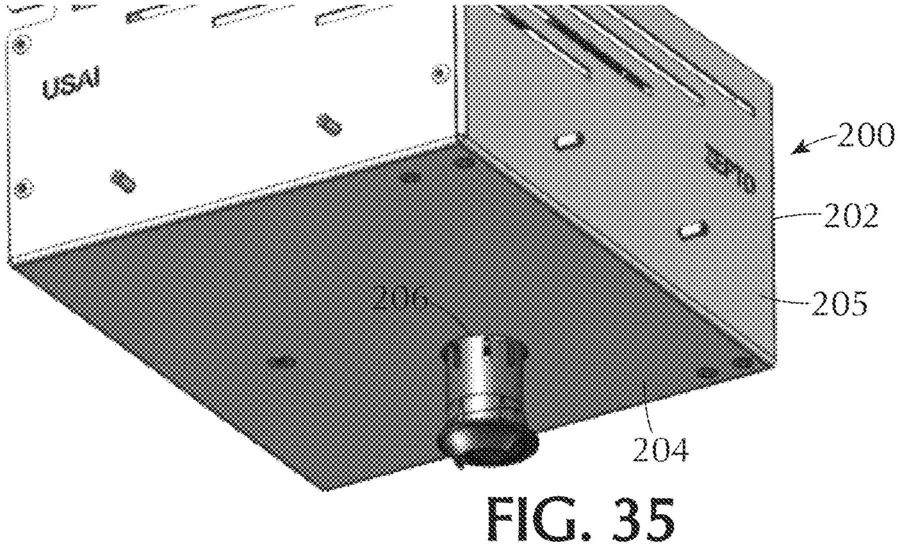
FIG. 35 is a bottom view of the light fixture, showing the light engine assembly being removed through the aperture.
Figure 36:
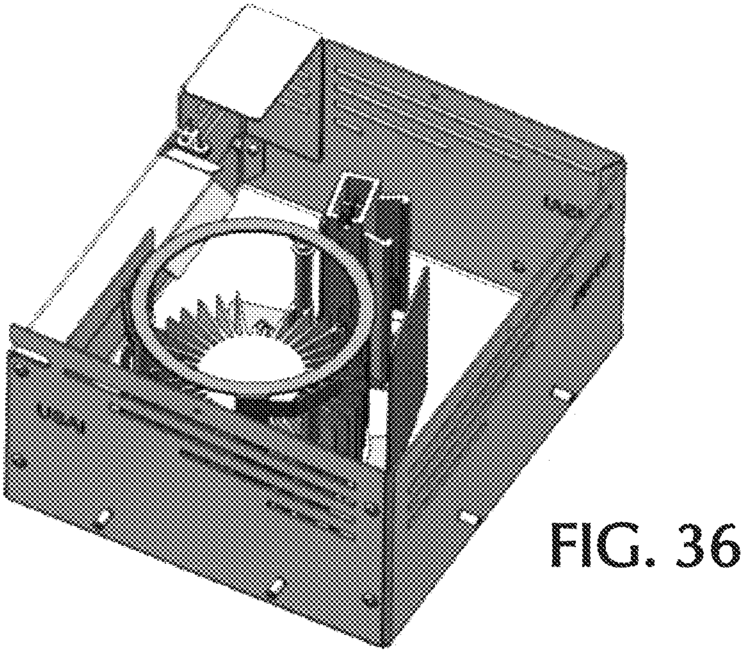
FIG. 36 is a top view of the light fixture, with the top cover removed, and showing the heat sink assembly in the wire access position.

Referring to FIG. 34, when the light engine assembly 208 is in the connected state with the heat sink 228, the heat sink 228 can be moved into the lowered unlocked position and then into the elevated position. The upward bias urges the light engine assembly 208 upward until a radial flange 217 of the trim 214 contacts the room-side of the ceiling structure 272, around the opening 273. As can be appreciated, the variable upward bias of the heat sink 228 allows the light fixture 200 to adapt to ceiling materials of various thickness and various fixture installation heights relative to the ceiling.

When the light engine assembly 208 is in the connected state, the locking ring 264 of the bayonet connector 226 is displaced downwardly (away from the heat sink 228) against the upward bias which mechanically secures the light engine assembly 208 to the heat sink 228, and in addition pushes the light engine assembly 208, and particularly the base 216 thereof, against the heat sink 228 which causes the upper thermal interface 226 of the base 216 to press against the thermal interface 230 of the heat sink 228 which creates an efficient and effective thermal connection between the upper thermal interface 226 of the base 216 of the LED module 210 and the thermal interface 230 of the heat sink 228. This allows the light fixture to use high-output LEDs, while effectively dissipating the heat generated thereby. For example the light fixture can use LEDs providing about 900-1000 lumens delivered into the room and at, for example about 9-15 watts, all serviceable through a small ceiling opening of, for example, a diameter of 1 inch.

The axial insertion and rotational connection process, from within the room, provided by the configuration and operation of the light engine assembly 208 and bayonet connector 262 allow the light engine 208, and in particular the LED module 210 and base 216 thereof, to be axially inserted through and removed from an extremely small opening 273 in the ceiling 272, and particularly where the opening 273 is minimally larger than, and has minimal clearance around, the outer diameter of the light engine assembly 208. For example, for a light fixture configured for about a 1 inch diameter ceiling opening, a maximal outside diameter of the upper portion 217 of the base 216 can be up to about 0.96 inches, providing a minimal clearance of about 0.04 inches (e.g., no more than about 0.05 or 0.08 inches) between the opening 273 of the ceiling 272 and the base 216 of the light engine assembly 208. Furthermore, because the opening 273 in the ceiling 272 is only minimally larger than the diameter of the light engine assembly 208, the radial flange 217 of the trim element 214 can be correspondingly small. It can be appreciated that the dimensions of the light engine assembly 208 can change; however, the minimal clearance provided between the opening 273 in the ceiling 272 and the light engine assembly 208 can remain minimal and substantially constant, while maintaining serviceability of the light fixture from within the room, without disturbing the ceiling.

Figure 27:
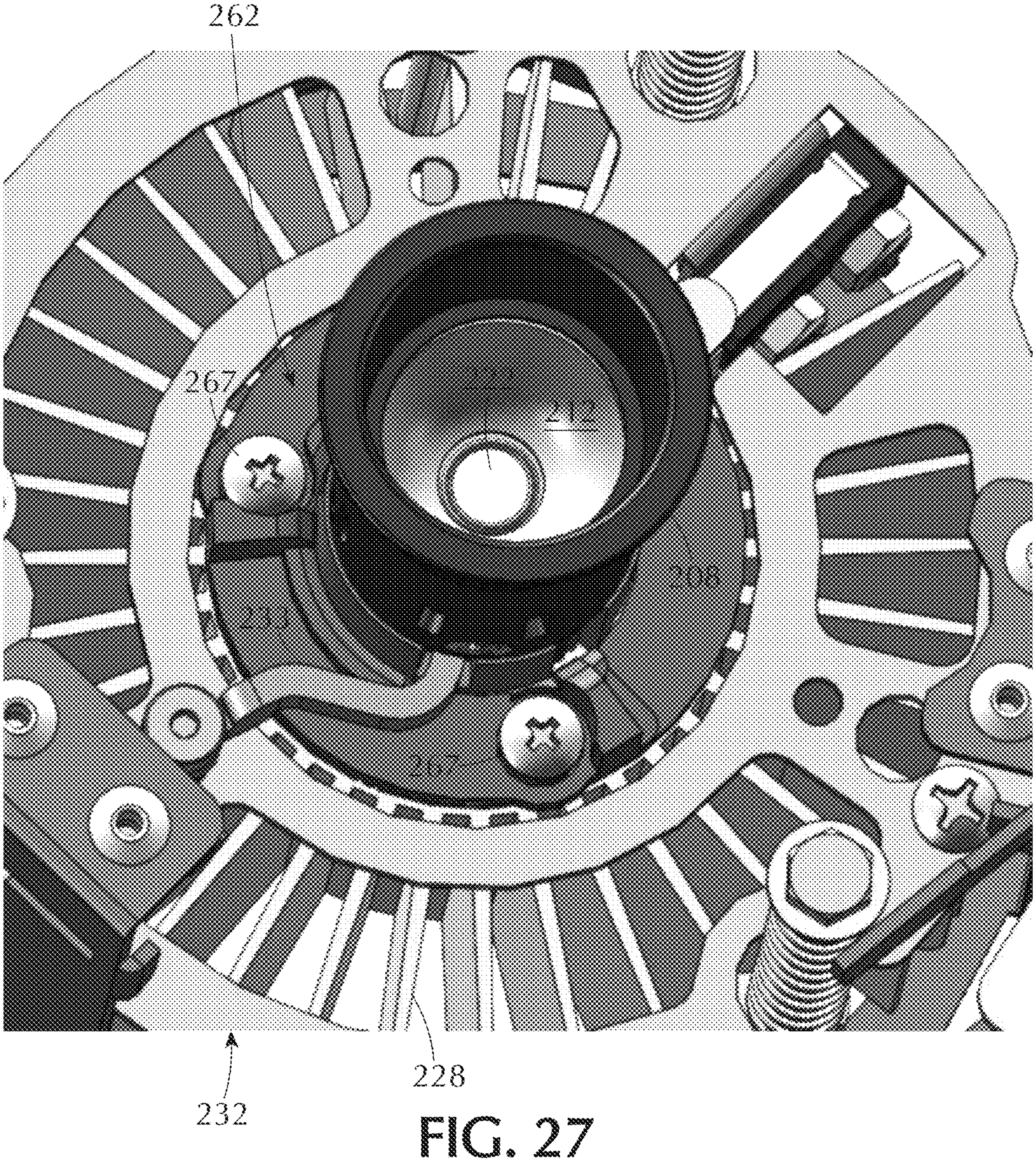
FIG. 27 is a bottom view of the heat sink assembly, showing a light engine assembly attached to the heat sink.
Figure 28:
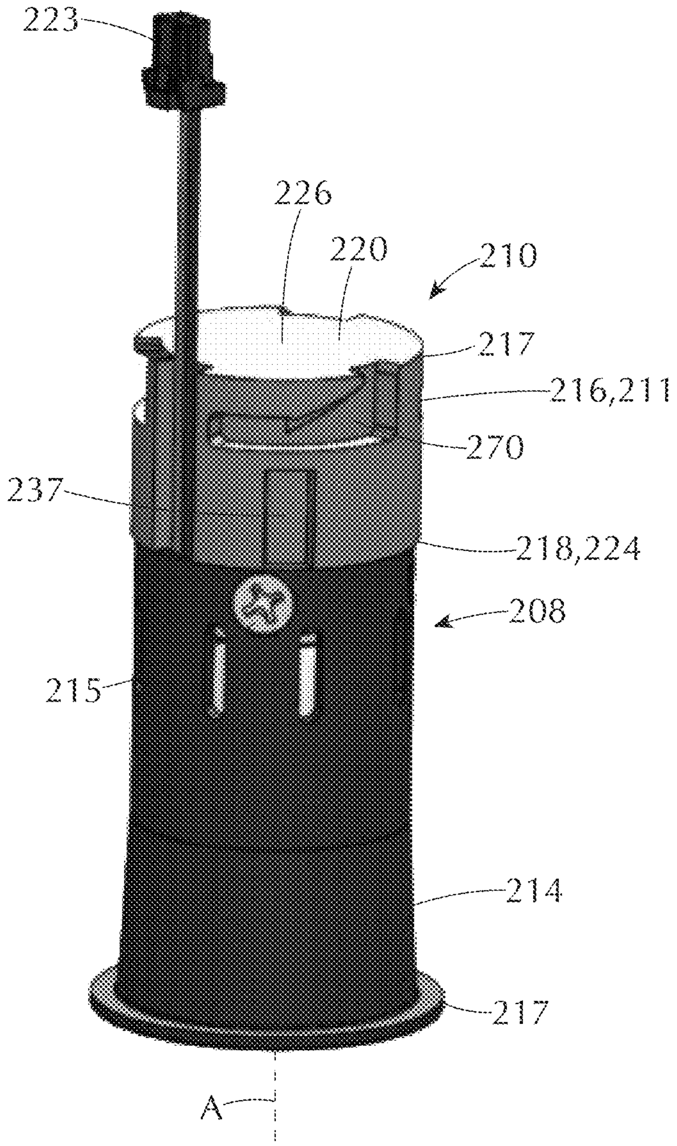
FIG. 28 is a side view of the light engine assembly.

Referring to FIGS. 26 and 27, the heat sink assembly 232 can include a light engine lock 233 adapted to only allow disconnection of the light engine assembly 208 from the heat sink 228 when the heat sink 228 is in the lowered locked position. The light engine lock 233 can be pivotally connected to the base 236 of the heat sink assembly 232 and can include a free end 235 which is received within and engages a complementary locking recess 237 in the base 216 of the LED module 210 to prevent rotational movement thereof, when the light engine lock is in a locked state. The light engine lock 233 is in a locked state (FIG. 27) when the heat sink 228 is not in the lowered, locked position. The light engine lock 233 is in an unlocked state (FIG. 26) when the heat sink 228 is in the lowered, locked position. In the unlocked state, the free end 235 of the light engine lock 233 is retracted from the locking recess 237 in the base 216 of the LED module 210, thereby allowing rotation of the LED module. The light engine lock 233 can be spring biased in the locked position and can be urged into the unlocked position by contacting a portion of the base 236 of the frame 234 of the heat sink assembly 232 during rotation of the heat sink 228 into the lowered, locked position.

Referring to FIGS. 24 and 35-37, the heat sink assembly 232 can preferably move along the bottom 204 of the enclosure 202 to allow selective removal of the light engine assembly 208 and the lighting driver, or the electrical connections for a remote driver 274. The base 236 of the frame 234 of the heat sink assembly 232 can be pivotally connected to the bottom 204 of the enclosure 202 by, for example a fastener 276. In a light engine access position (FIGS. 24 and 35), the thermal interface 230 of the heat sink 228, the aperture 259 of the bottom plate 258 of the heat sink 228 and the aperture 242 of the base 236 of the frame 234 are aligned with the aperture 206 of the bottom 204 of the enclosure 202 to allow insertion (connection) or removal (disconnection) of the light engine assembly 208 to/from the heat sink 228 through such aperture 206, from within the room. In a wire access position (FIGS. 36 and 37), the lighting driver 274 is aligned with the aperture 206 of the bottom 204 of the enclosure 202 to allow insertion or replacement of the lighting driver, or the electrical connections for a remote driver 274 through the aperture 206, from within the room.

Referring to FIGS. 38-41, an embodiment of the heat sink 328 can have a rotating electrical connection ring 380 which can be disposed at least partially radially inwardly from the locking ring 264 of the bayonet connector 262 and at least partially around the thermal interface 230 of heat sink 328. The ring 380 can be formed of, or can include a printed circuit board (PCB). The ring 380 can be configured to rotate relative to the main body of the heat sink 328 about the insertion axis A, during rotational connection and disconnection of the light engine assembly 308, as described above. The electrical connection ring 380 can be disposed within a ring-shaped channel 231 recessed in the main body of the heat sink 328 and surrounding the thermal interface 230 thereof, and can be substantially confined to limited rotational movement about the insertion axis A.

The light engine assembly 308 can include upwardly extending keying and rotating tabs 382 which are received within and interface with complementary keying features 384 of the ring 380 to cause complimentary rotation of the ring 380 during connection and disconnection of the light engine assembly 308.

The light engine assembly 308 can also include electrical connections 386 connected to the LED 222 which interface with electrical connections 388, 390 of the ring 380. The electrical connections 388, 390 of the ring 380 can be connected to a power source, such as lighting driver 274, by wires 392. The ability of the ring 380 to rotate with the light engine assembly 308 provides for substantially solely normal/perpendicular axial/non-sliding electrical closing and opening operations (as opposed to lateral/sliding movements) which reduces the area required for the electrical connections 388, 390 and avoids problems associated with sliding electrical connections. In addition, this configuration avoids a separate electrical connection step for the light engine assembly 308. The act of connecting the light engine assembly 308 to the heat sink 328 with the bayonet connector 262 completes, in one step, the electrical connection, in addition to the mechanical and thermal connections described above.

Referring to FIGS. 42-53, an embodiment of the light engine assembly 408 can be composed of modular parts which can include an LED module 410, a reflector module 412, and a trim module 414. The LED module 410 can have a base 416 with an upper portion 417 having a configuration and functionality similar to the corresponding structure described above, including that of base 216. The LED module 410 can have an LED 422 connected thereto, as described above. The LED module 410 can be removably connected to, and removable from, the heat sink 228, with, for example, the bayonet connector 226, in the manner described above.

The LED module 410 can include a pair of opposed mounting pins 427 which extend horizontally radially outwardly (perpendicular to the insertion axis A) from the lower portion 411 of the base 416 thereof. The reflector module 412 can be removably connected to the LED module 410 by, for example, a bayonet connection. The reflector module 412 can have a pair of bayonet slots 428 which engage the mounting pins 427 of the LED module 410. The bayonet slots 428 of the reflector module 412 can have an upwardly-facing vertical opening adapted to receive an associated mounting pin 427 and can have a horizontal channel connected to the opening and adapted to confine the mounting pin. The reflector module 412 is mounted to the LED module by first moving the reflector module 412 axially vertically, along the insertion axis A, to contact the LED module 410 and receive the mounting pins 427 into the openings of the bayonet slots 428, and then rotating the reflector module 412 about the insertion axis, for example clockwise as viewed from the room. The reflector module 412 can be detached from the LED module 410 with a reverse process. Each bayonet slot 428 can include a detent 431 between the opening and the horizontal channel thereof and operable to resist passage of the associated mounting pin 427 of the LED module 410, to temporarily secure the reflector module 412 to the service tool 420 during connection and disconnection of the reflector module 412. The reflector module 412 can include a pair of opposed mounting pins 429 which extend horizontally radially outwardly therefrom.

The trim module 414 can be removably connected to the enclosure 202, such as to aperture plate 418 (FIG. 52), depending downwardly from the enclosure 202. The trim module 414 can have a resilient, snap-fit or friction connector for removable connection.

Referring to FIGS. 46-53, the light fixture 200 having the modular light engine assembly 410 can include a service tool 420 for mounting and removing the modules. The service tool 420 can have a first end 422 adapted to be inserted axially vertically through the opening 273 of the ceiling 272 and into the aperture 206 of the enclosure 202 from within the room, to rotate the modules to connect and disconnect modules to the heat sink, as described above. The first end 422 of the service tool 420 can be substantially tubular and adapted to separately receive at least lower portions of the LED module 410 and reflector module 412 therein. The first end 422 can have a pair of opposed, inverted T-slots 430 having an opening communicating with an edge of first end 422. The T-slots are adapted to selectively engage the mounting pins 427, 429 of the LED module 412 and reflector module 414 for mounting and removal of the modules.

Figure 48:
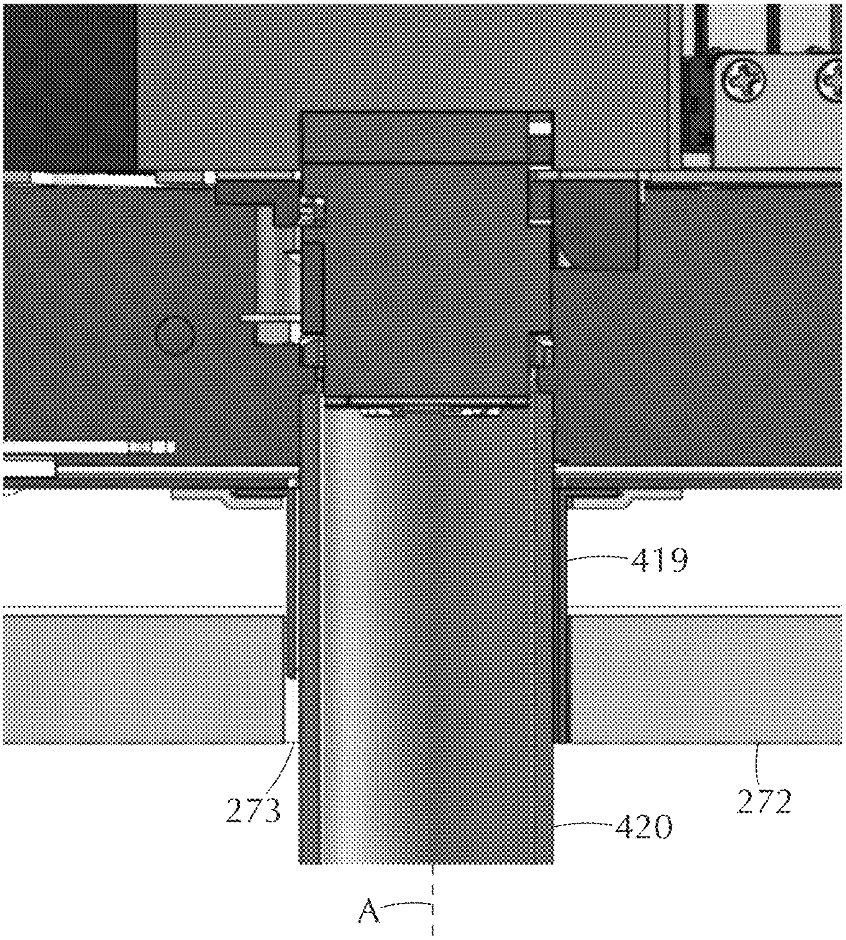
FIG. 48 is a side, cross-section view of the service tool connecting the LED module to the heat sink.
Figure 49:
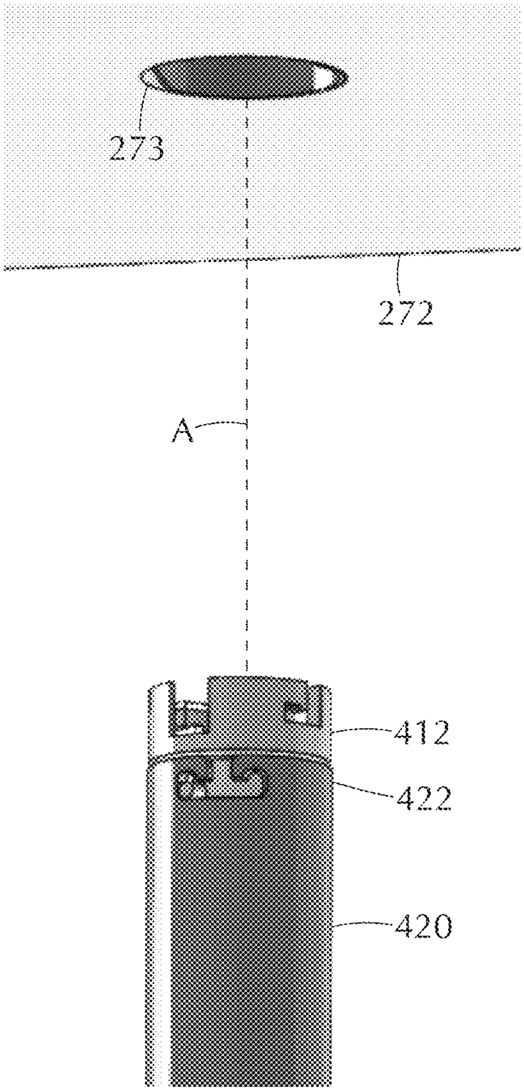
FIG. 49 is a side view of the service tool connected to the reflector module.
Figure 50:
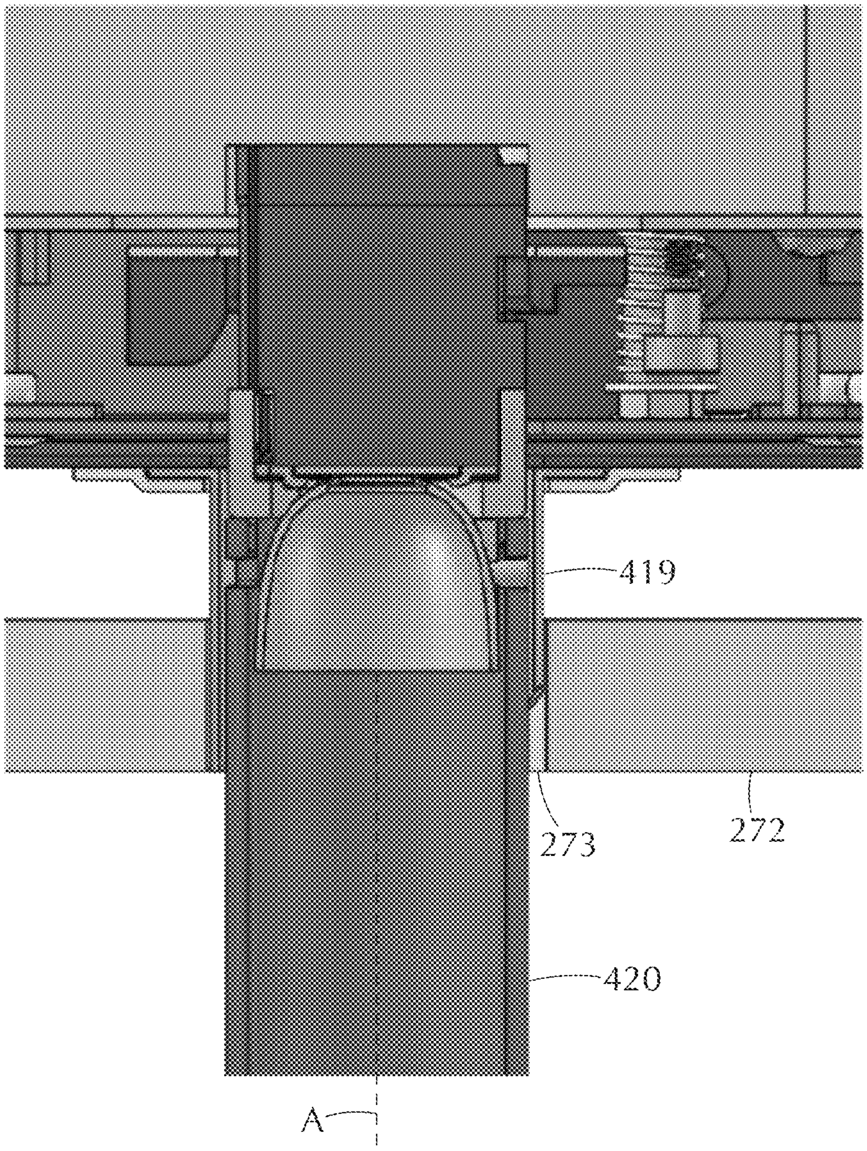
FIG. 50 is a side view of the service tool connecting the reflector module to the LED module.
Figure 51:
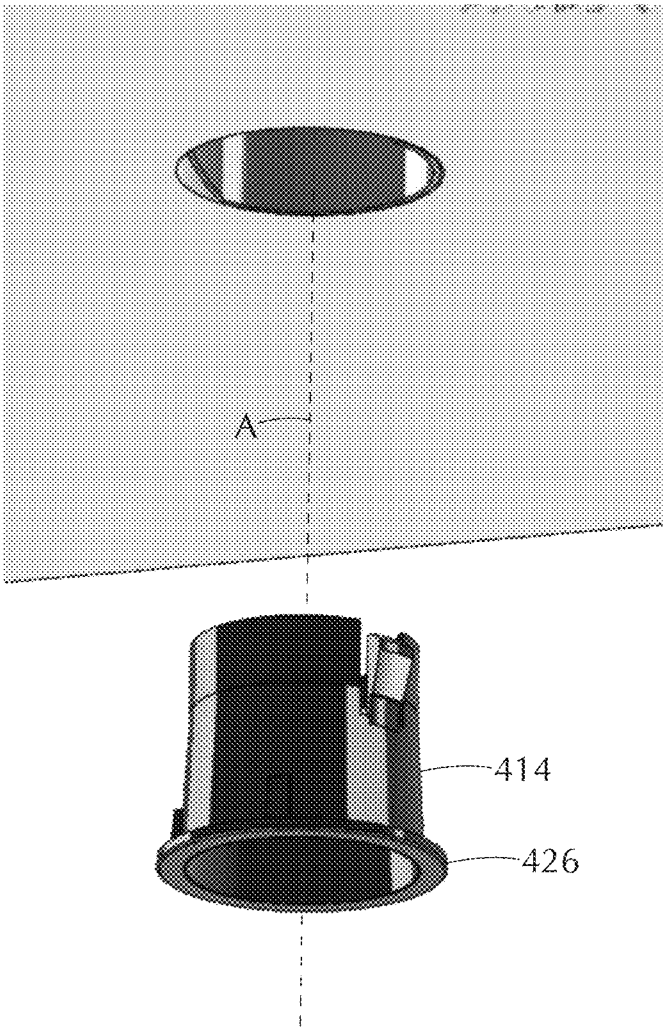
FIG. 51 is a side view of the downlight trim module positioned for connection to the light fixture.
Figure 52:
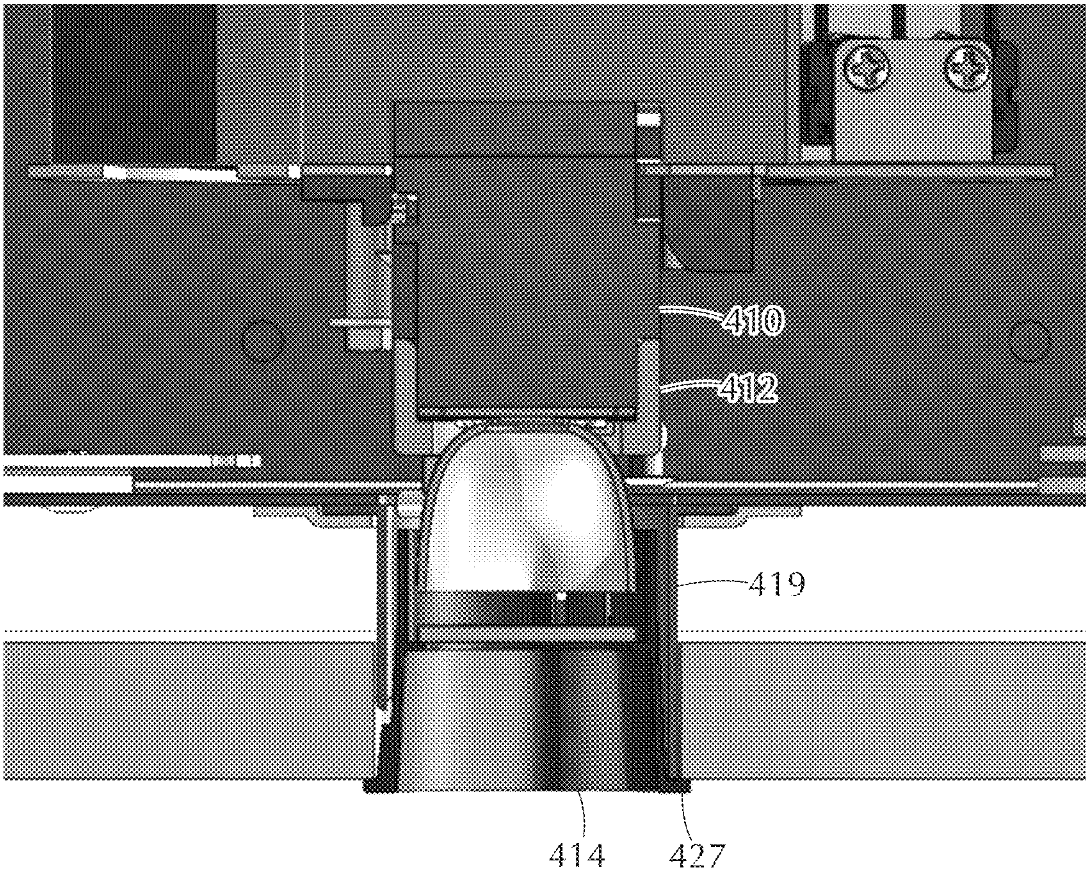
FIG. 52 is a side cross-section view of the modular light engine assembly installed in the light fixture.

FIGS. 47-51 show the sequence of installing the modular light engine assembly 408 using the service tool 420. First, FIG. 47 shows the LED module 410 connected to the service tool 420 and ready for axial insertion through the opening 273 of the ceiling 272. FIG. 48 shows the LED module 410 in position to be rotated by the service tool 410 for connection to, or disconnection from, the heat sink 228. Then, FIG. 49 shows the reflector module 412 connected to the service tool 420 and ready for axially insertion through the opening 273 of the ceiling 272. FIG. 50 shows the reflector module 412 in position to be rotated by the service tool 410 for connection to, or disconnection from, the (installed) LED module 410. Then, FIG. 51 shows the trim module 414 ready for manual connection to the light fixture. FIG. 52 shows all modules installed and connected to the light fixture. The sequence for removing the modules is the reverse process.

Figure 46:
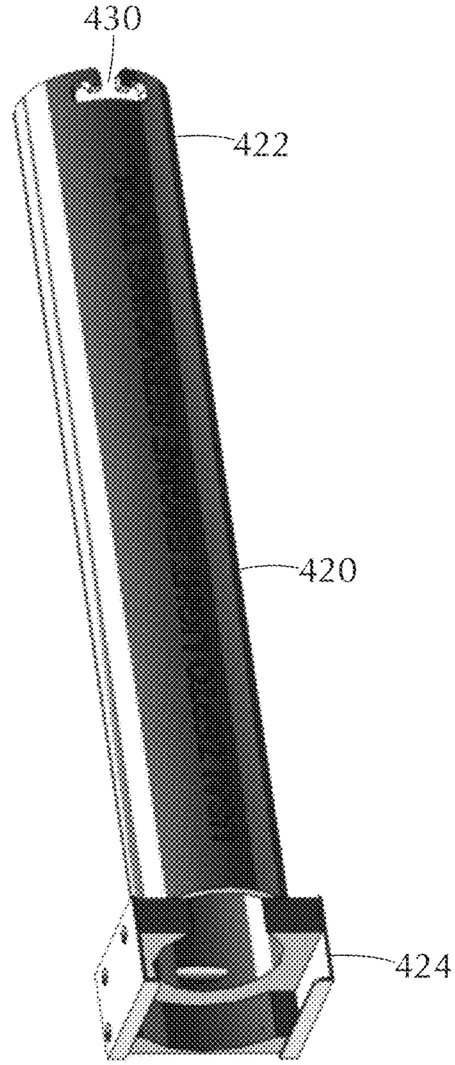
FIG. 46 is a side view of a service tool for connecting the modules of the light engine assembly.
Figure 53:
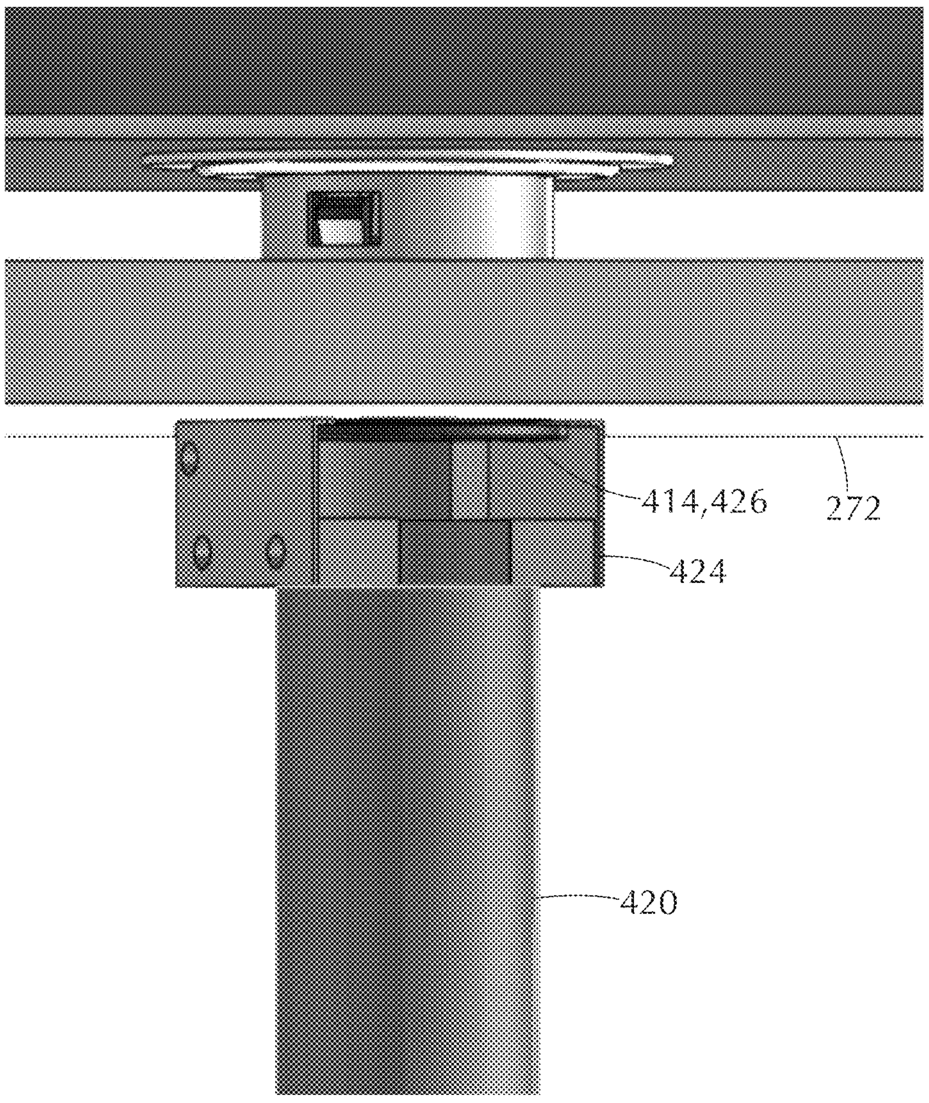
FIG. 53 is a side view of the connection tool removing the trim module.
Figure 54:
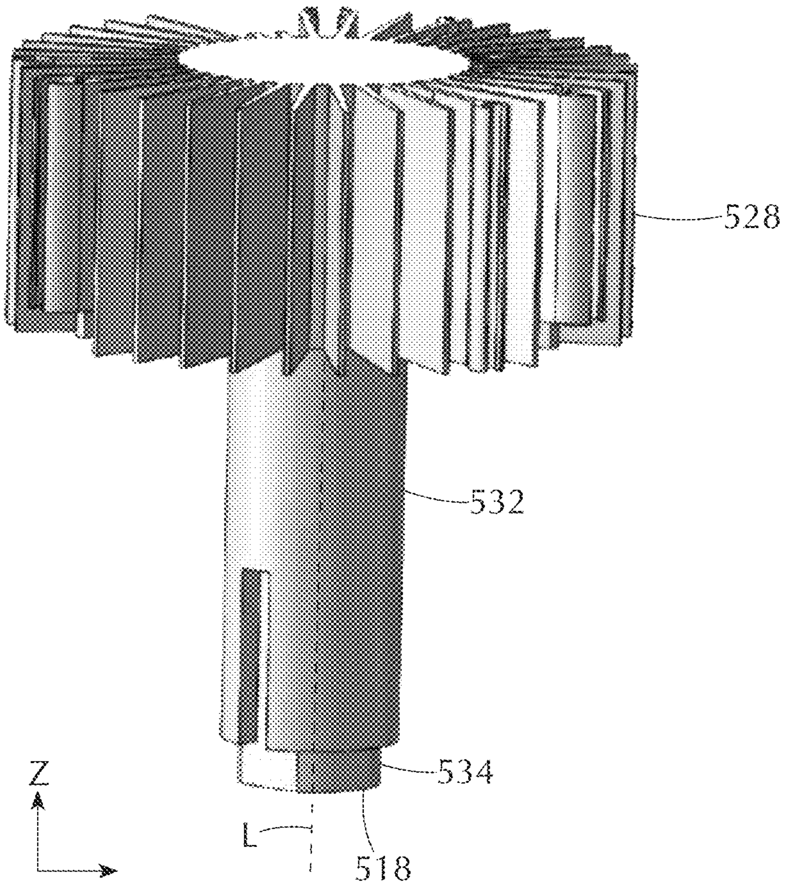
FIG. 54 is side view of an embodiment of the heat sink.

Referring to FIGS. 46 & 53, the tool 420 can have a second end 424 adapted to engage a radially-outwardly extending flange 426 of the trim module 414 to assist in removal of the trim module 414.

Referring to FIGS. 54-57, an embodiment of heat sink 528 can include an elongated arm 532, extending downwardly from, and preferably formed integrally with, the main body of the heat sink 528. The arm 532 can have a free end 534 having a similar configuration, and performing the same function as, the lower portion 211, 411 of the base 216, 416 of the LED module 210, 410 described above, including having a lower surface 518 supporting an LED 222, conducting heat from such LED to the body of the heat sink 528, and supporting the reflector element/module 212, 412 and trim element/module 214, 414.

When the heat sink 528 is in the elevated position for operation, the arm 532 is entirely retracted within the enclosure 202, preferably wherein the lower surface 518 supporting the LED 222 is in a position corresponding to the position of the lower portion 211, 411 of LED module 210, 410, and lower surface 218, 418 thereof, when in the elevated position.

Figure 55:
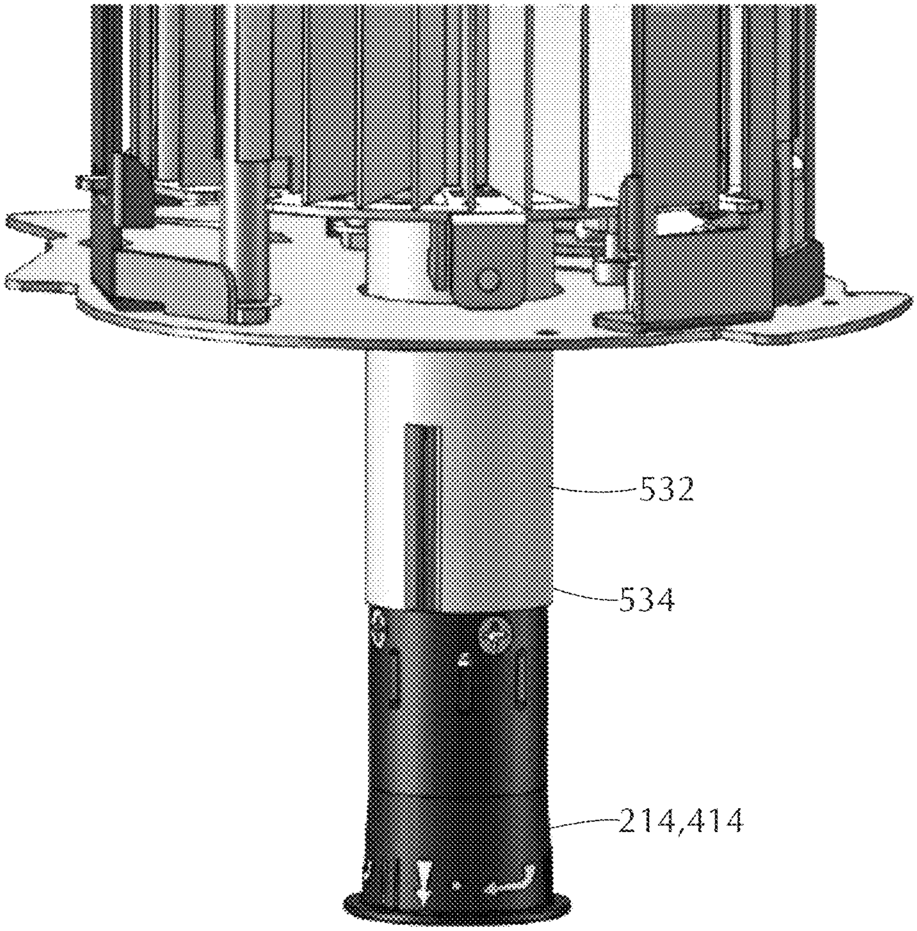
FIG. 55 is a side view of the heat sink of FIG. 54, in the lowered position, and with a light engine assembly connected thereto.
Figure 56:
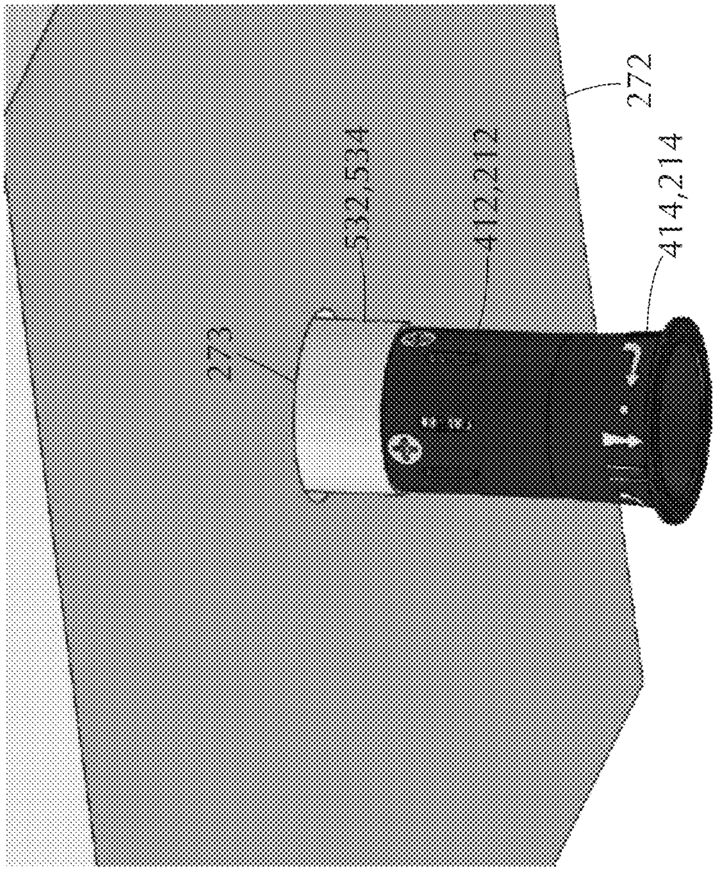
FIG. 56 is side view of the assembly of FIG. 55 in the lowered position, with the light engine assembly disposed below the ceiling.
Figure 57:
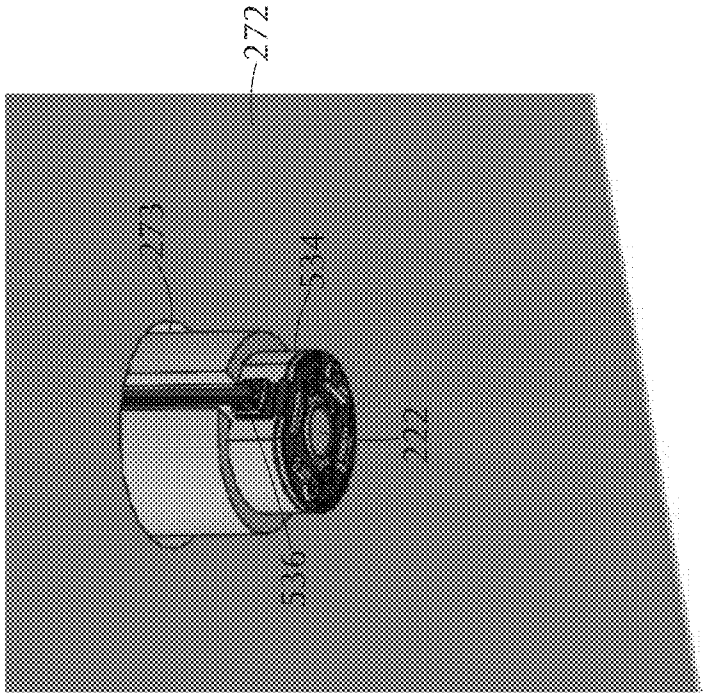
FIG. 57 is a side view as in FIG. 56, with the LED accessible for servicing.

When the heat sink 528 is in the lowered position as described above, the arm 532 extends through the various apertures described herein and through the ceiling structure 272 for servicing. A longitudinal axis L (parallel to Z axis) of the arm 532 is aligned with such apertures, and a length of the arm 532 is configured such that the free end 534 extends through the aperture 206 of the enclosure 202 and through the opening 273 of the ceiling 272, when the heat sink 528 is in the lowered position (FIGS. 55-57). Preferably an electrical connector 536 is provided on the free end 534 of the arm 532, and is accessible from the room, for connecting and disconnecting the LED 222 from the power source. In this position, free end 534 of the arm 532 and the lower surface 518 thereof (and LED 222 attached thereto) are disposed below the ceiling 227, such that the trim element 214, 414, and the LED 222 can be removed and replaced from within the room, for servicing, without disturbing the ceiling structure.

Figure 58:
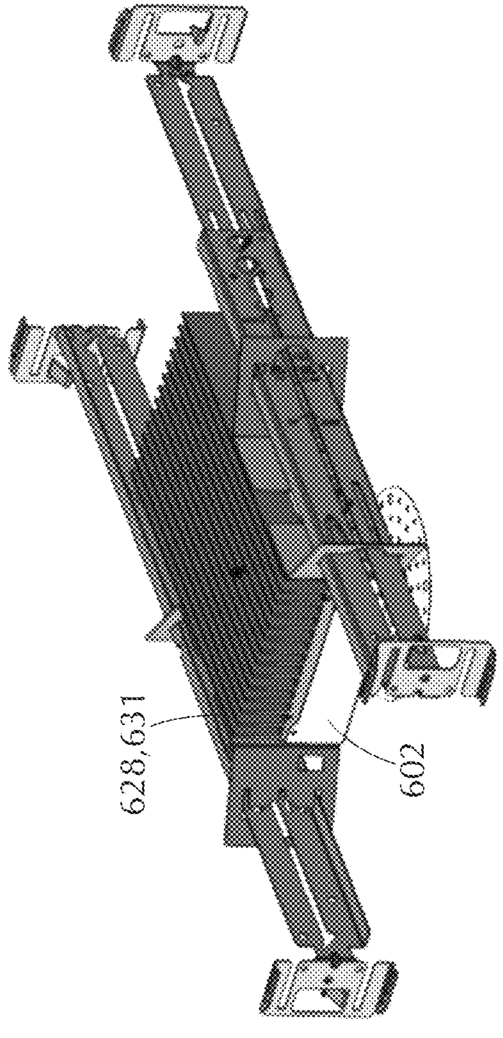
FIG. 58 is top view of a fourth preferred embodiment of the inventive light fixture.
Figure 59:
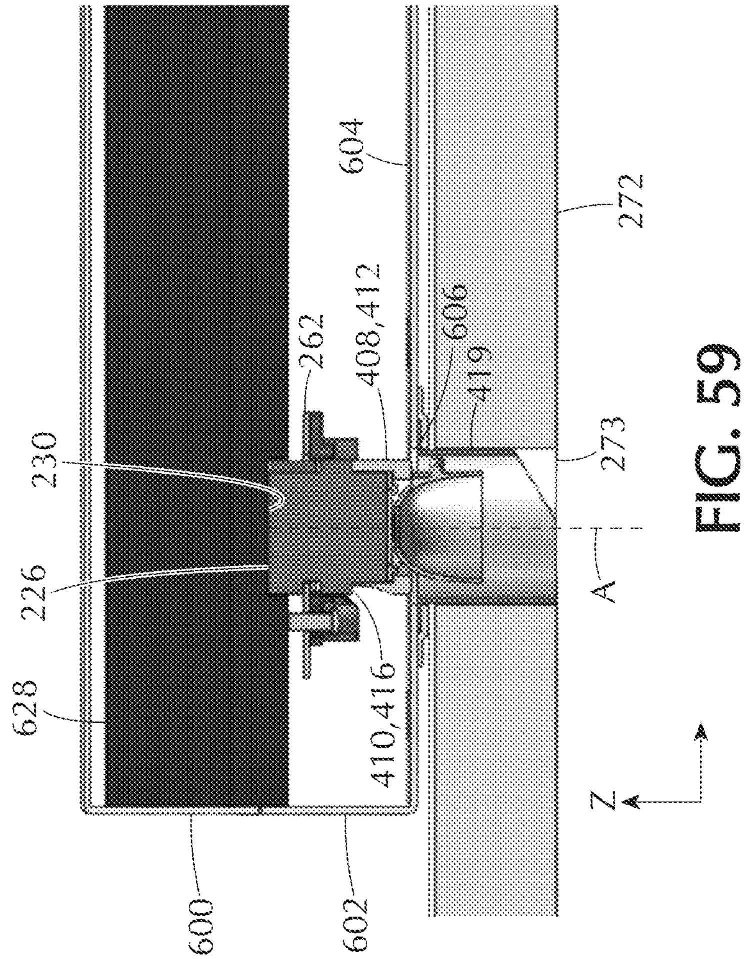
FIGS. 59 and 60 are each a side cross section view of the light fixture of FIG. 58.
Figure 60:
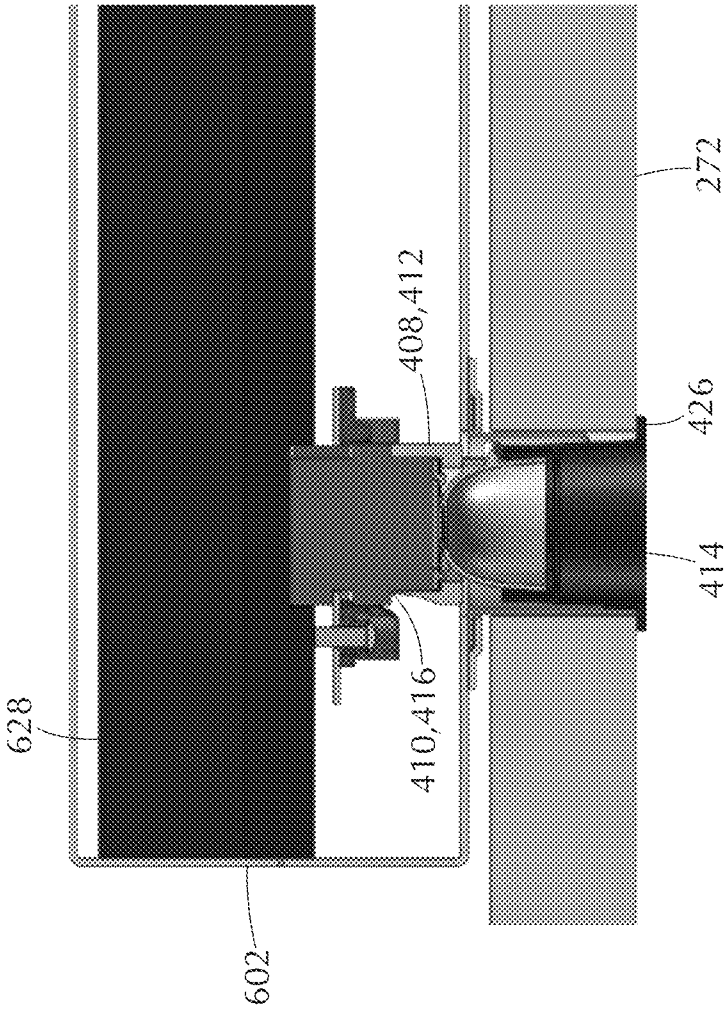
Figure 61:
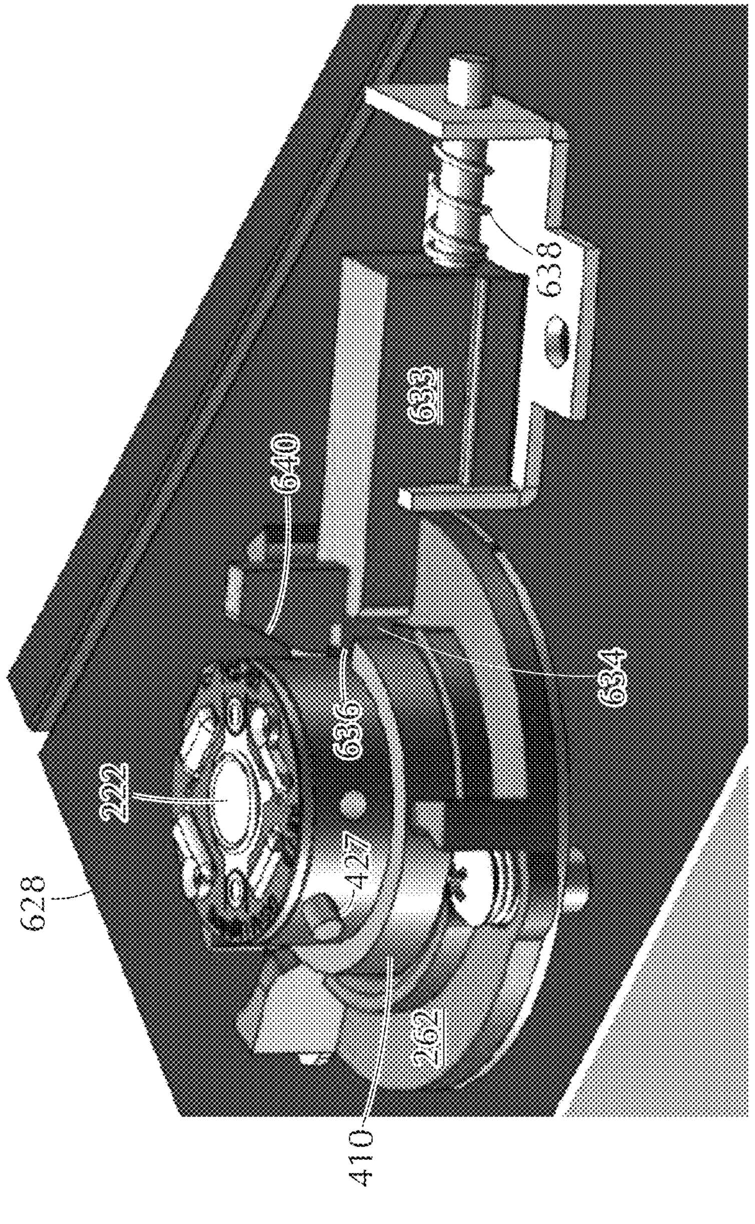
FIG. 61-64 are bottom images (inverted) of the light fixture of FIG. 58, showing an embodiment of the locking mechanism.

Referring to FIGS. 58-60, an embodiment of the light fixture 600 can have a heat sink 628 having fins 631 projecting from a top surface and having a relatively low vertical profile (i.e., low height, e.g., 1-2 inches). The heat sink 628 can be fixed relative to the enclosure 602 for example within the enclosure, or above the enclosure 602 and optionally thereby forming a top of the enclosure. A light engine assembly 408, for example having a structure as described above, can be connected to a bottom of the heat sink 628 in the manner described above, including through the opening 273 in the ceiling structure 272 and the aperture 606 of the enclosure 602, from within the room, for example by using the service tool 420 to connect the light engine assembly 408 to the bayonet connector 262 mounted to the heat sink 628, within the enclosure 602.

The aperture 606 of the enclosure 602 can be located on a bottom wall 604 of the enclosure. As described above, the thermal interface 630 of the heat sink 628 can be aligned with the aperture 606, and can be recessed upwardly from the bottom of the heat sink 628 to assist in the proper location, and to guide the rotation, of the base 416 of the LED module 410 during mounting and dismounting of the LED module 10.

Figure 62:
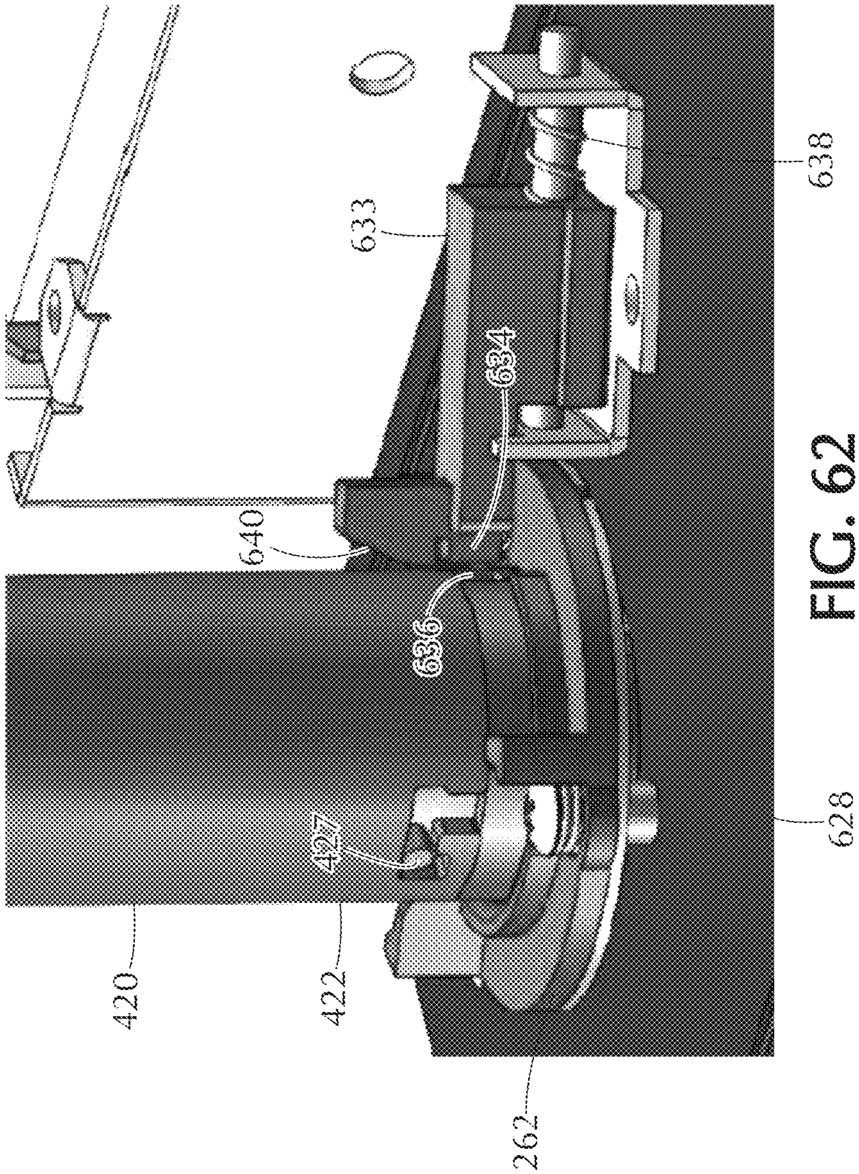
Figure 63:
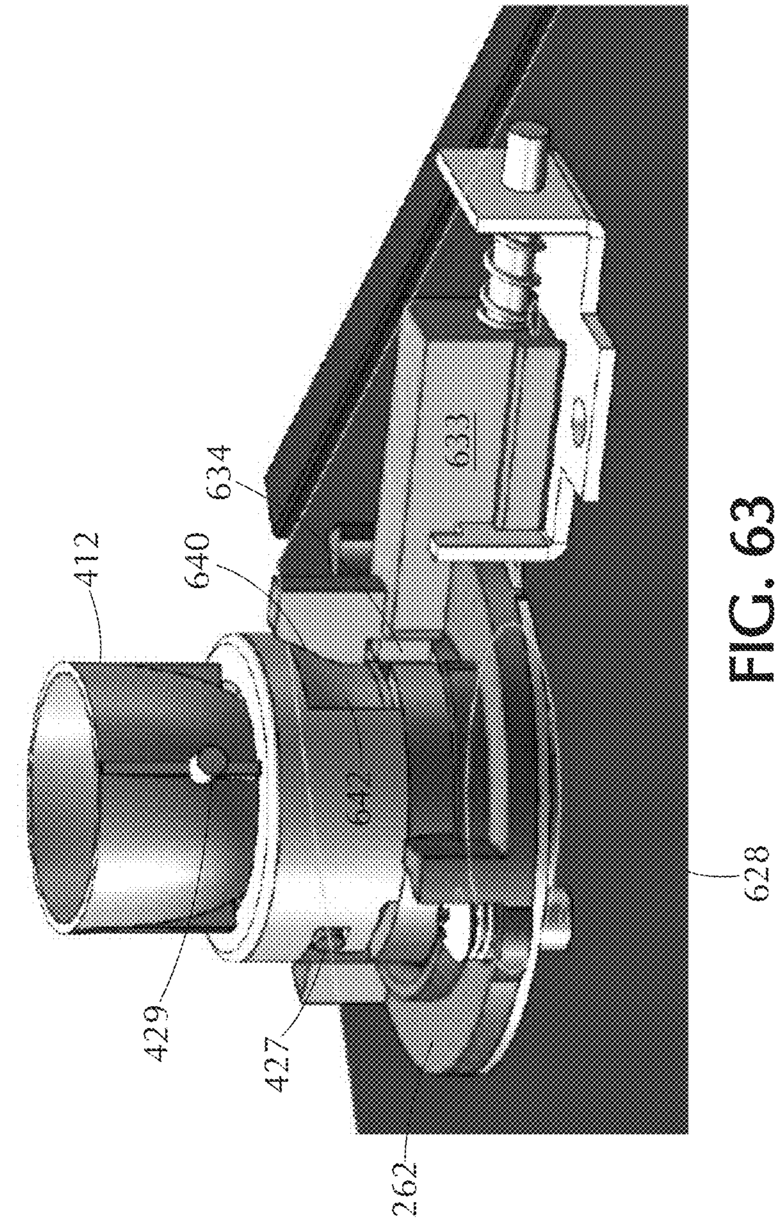
Figure 64:
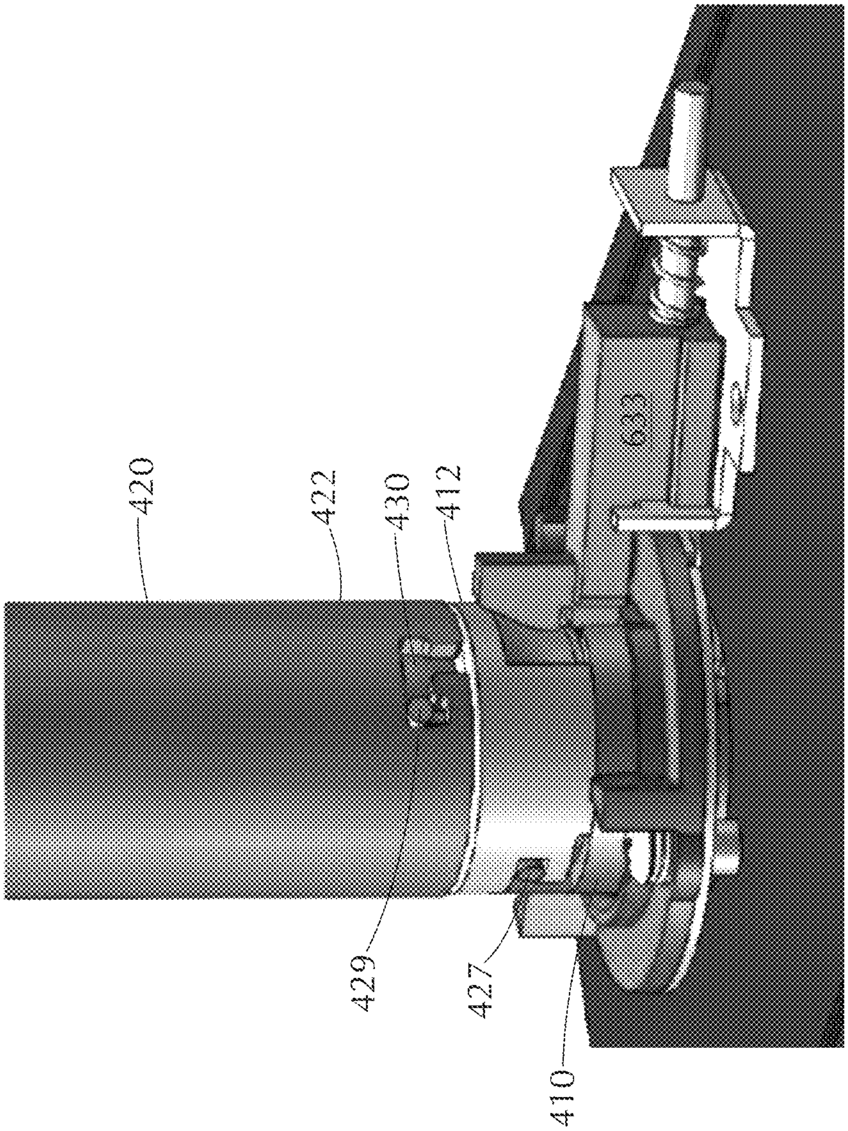
Figure 65:
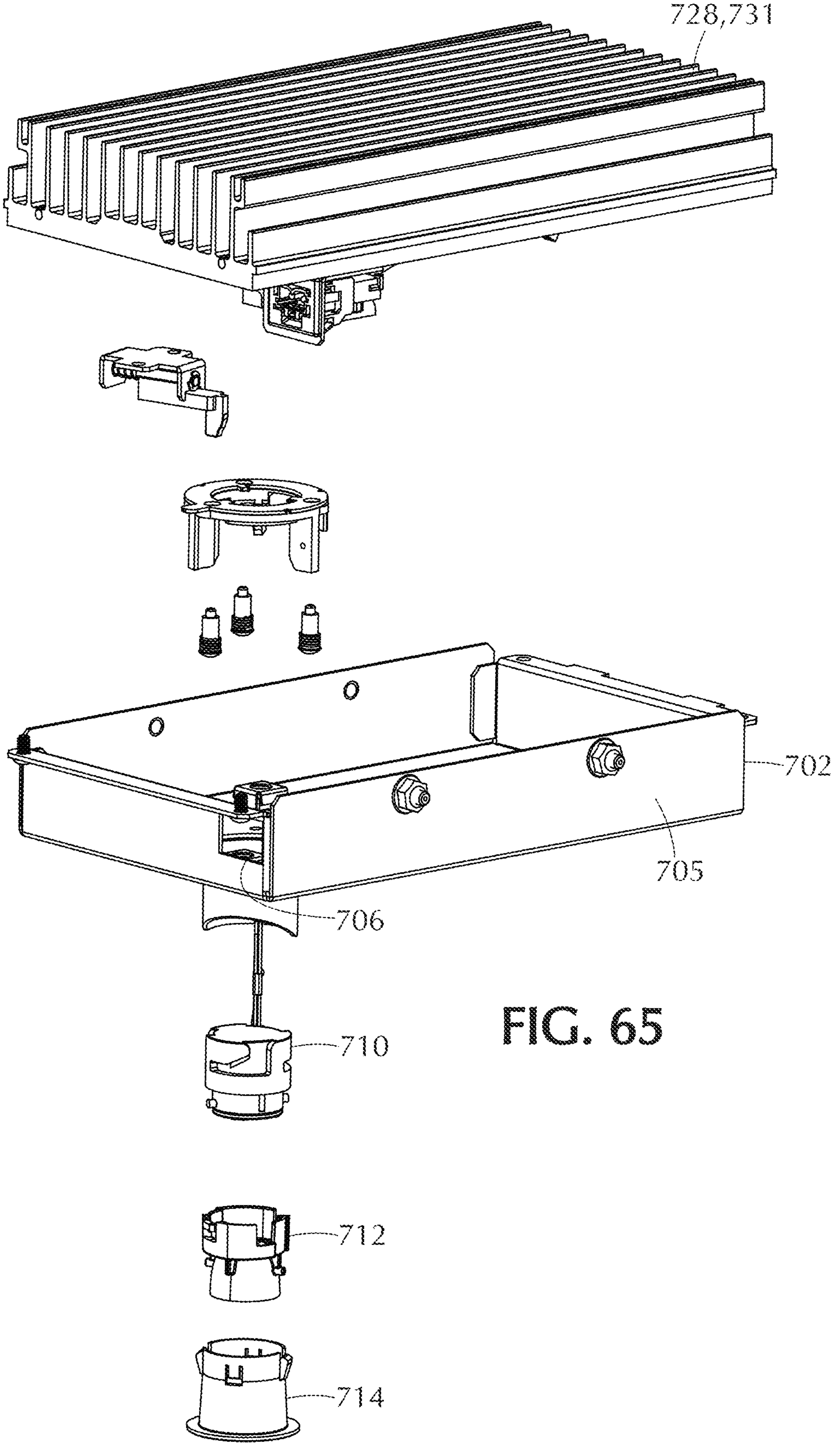
FIG. 65 is an exploded view of a fifth preferred embodiment of the inventive light fixture.
Figure 66A:
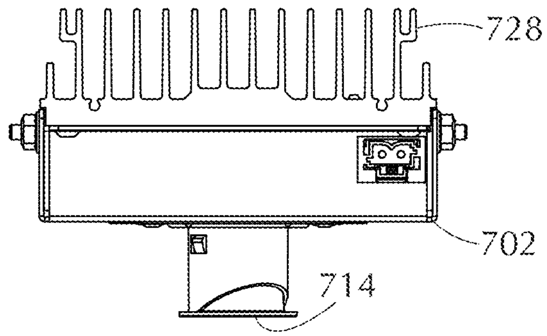
FIG. 66A is a front elevation view of the light fixture of FIG. 65.
Figure 66B:
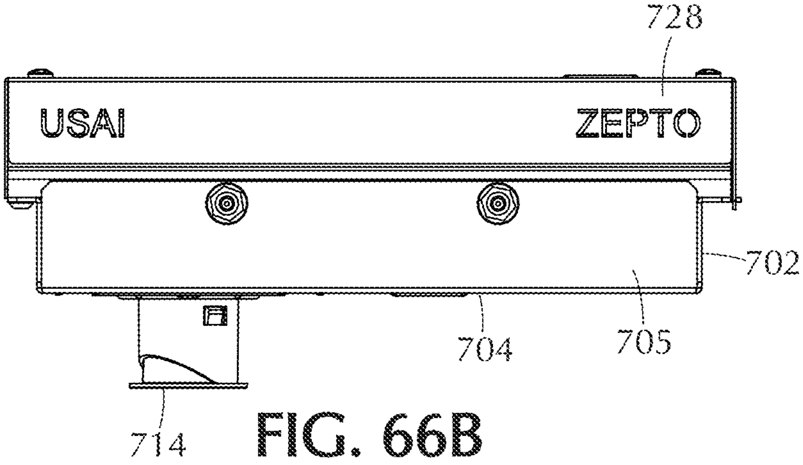
FIG. 66B is a side elevation view of the light fixture of FIG. 65.
Figure 66C:
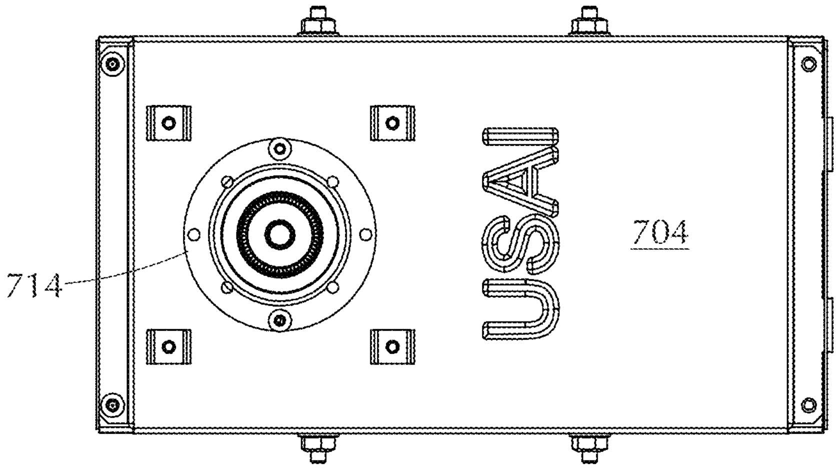
FIG. 66C is a bottom view of the light fixture of FIG. 65.
Figure 67:
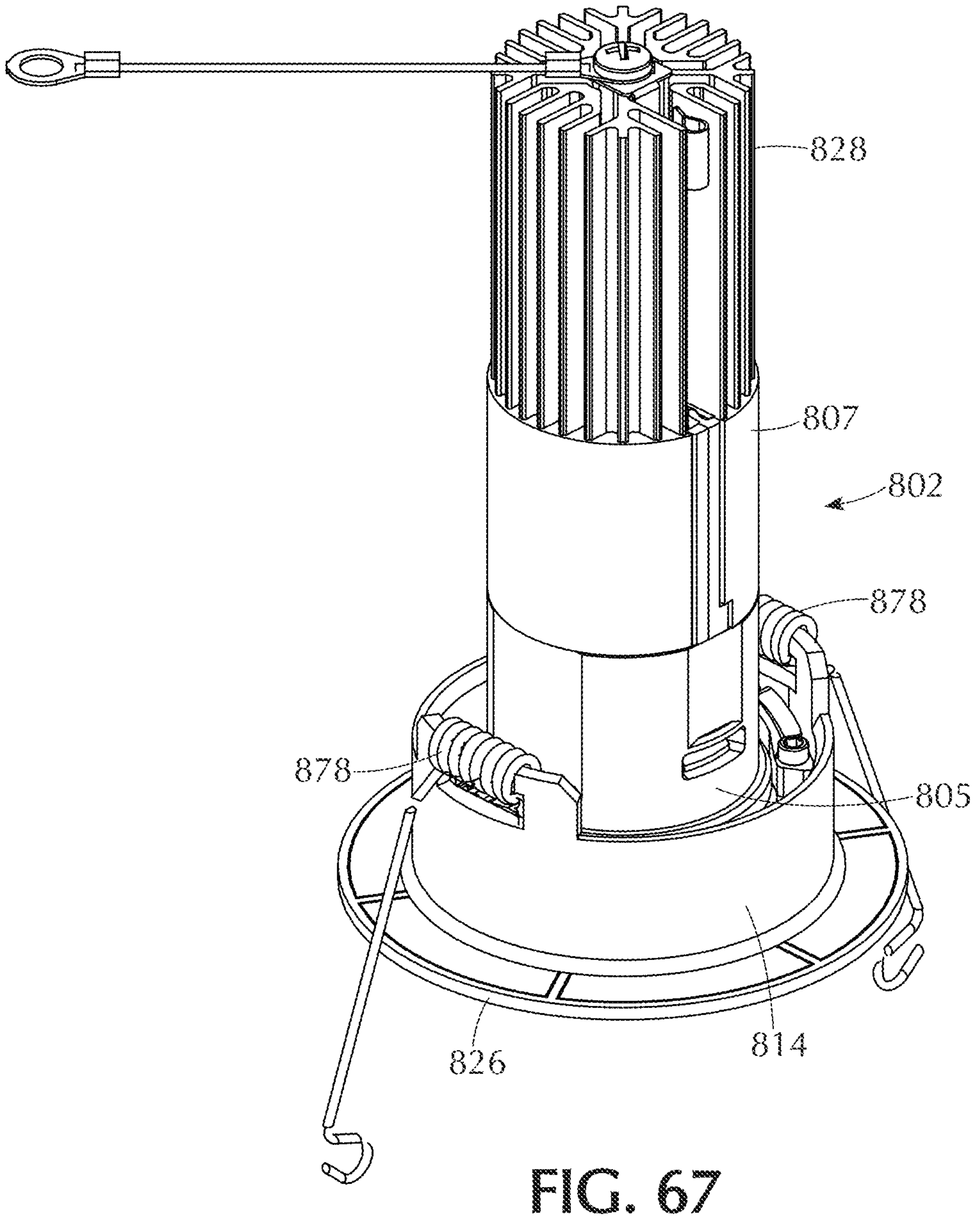
FIG. 67 is a perspective view of a sixth preferred embodiment of the inventive light fixture.
Figure 68:
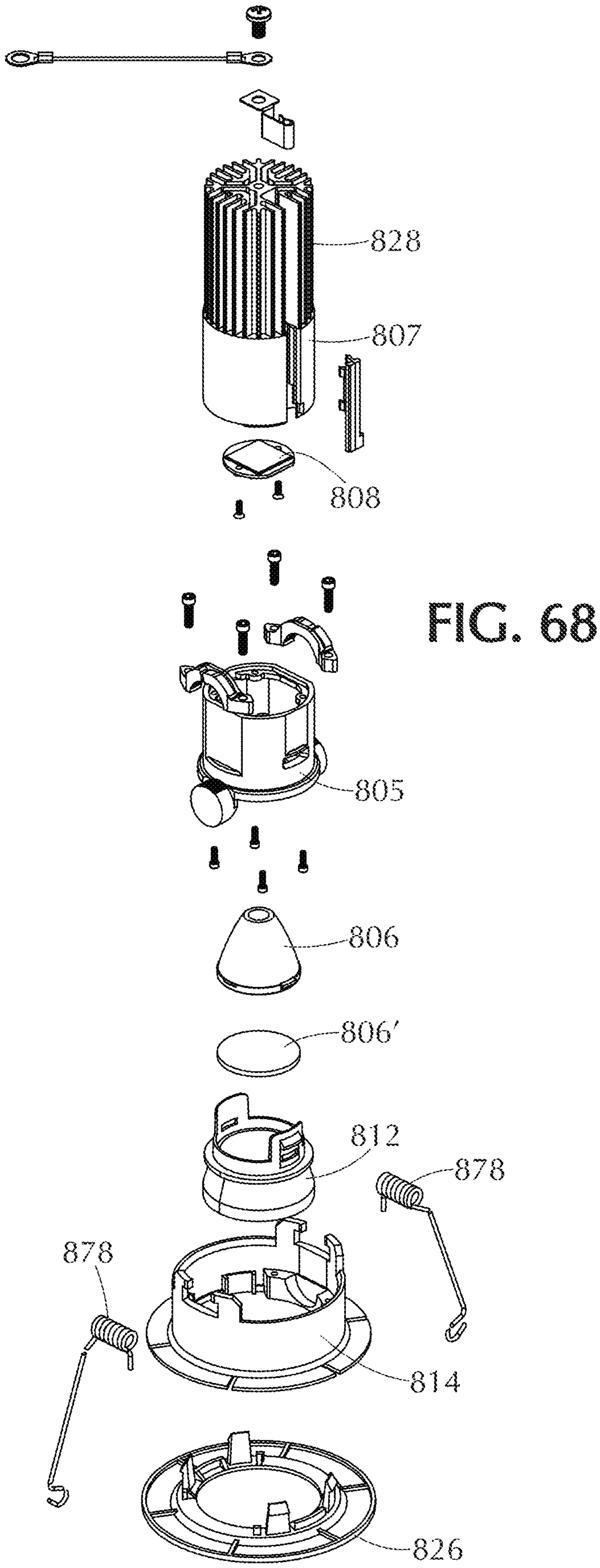
FIG. 68 is an exploded view of the light fixture of FIG. 67.
Figure 69:
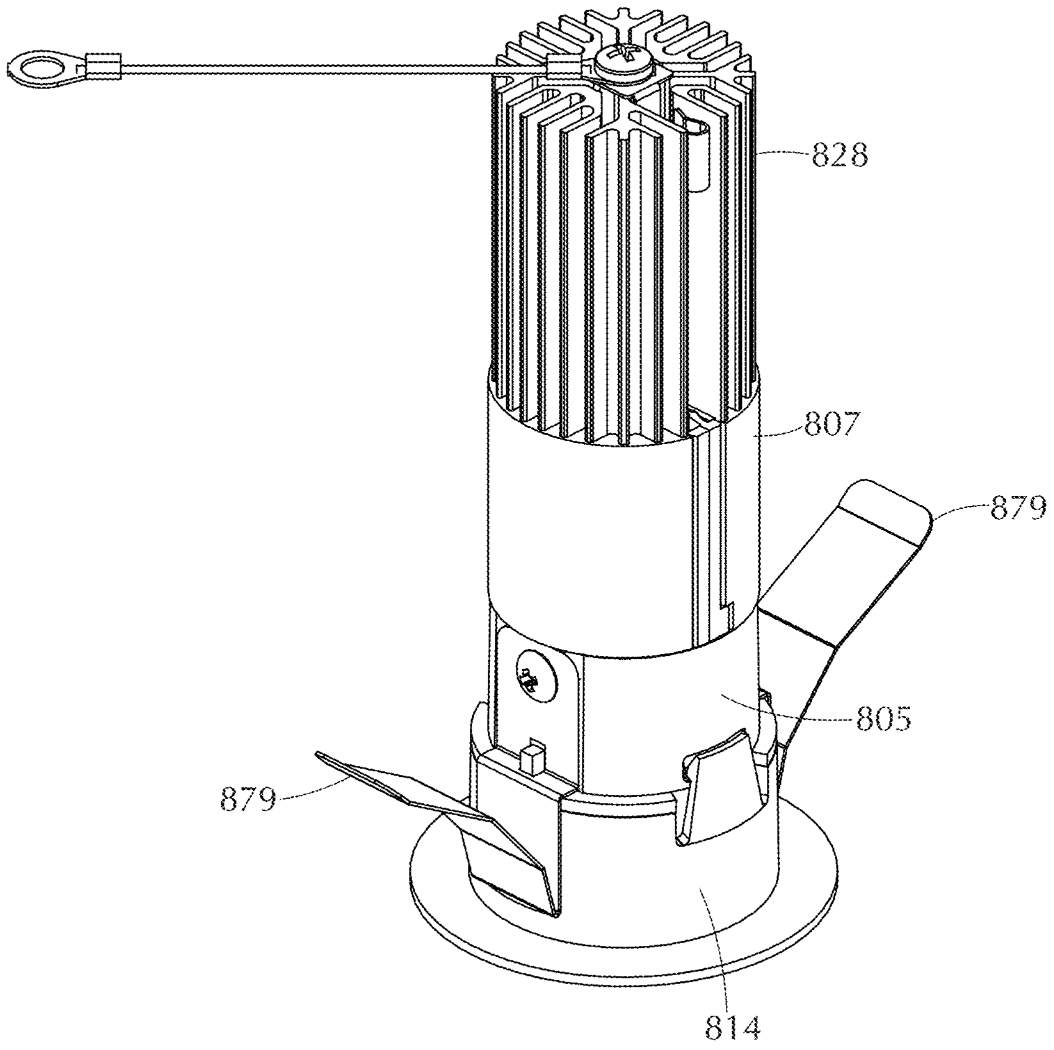
FIG. 69 is a perspective view of a seventh preferred embodiment of the inventive light fixture.
Figure 70:
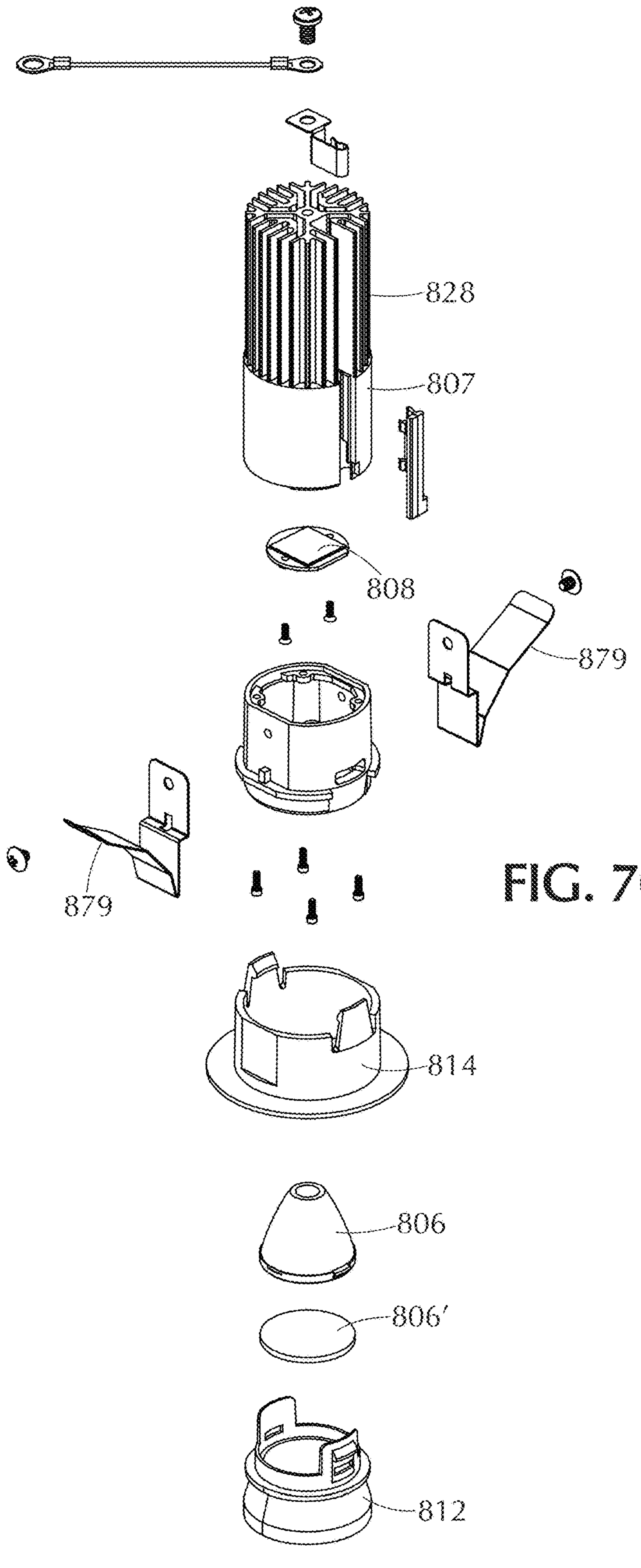
FIG. 70 is an exploded view of the light fixture of FIG. 69.
Figure 71:
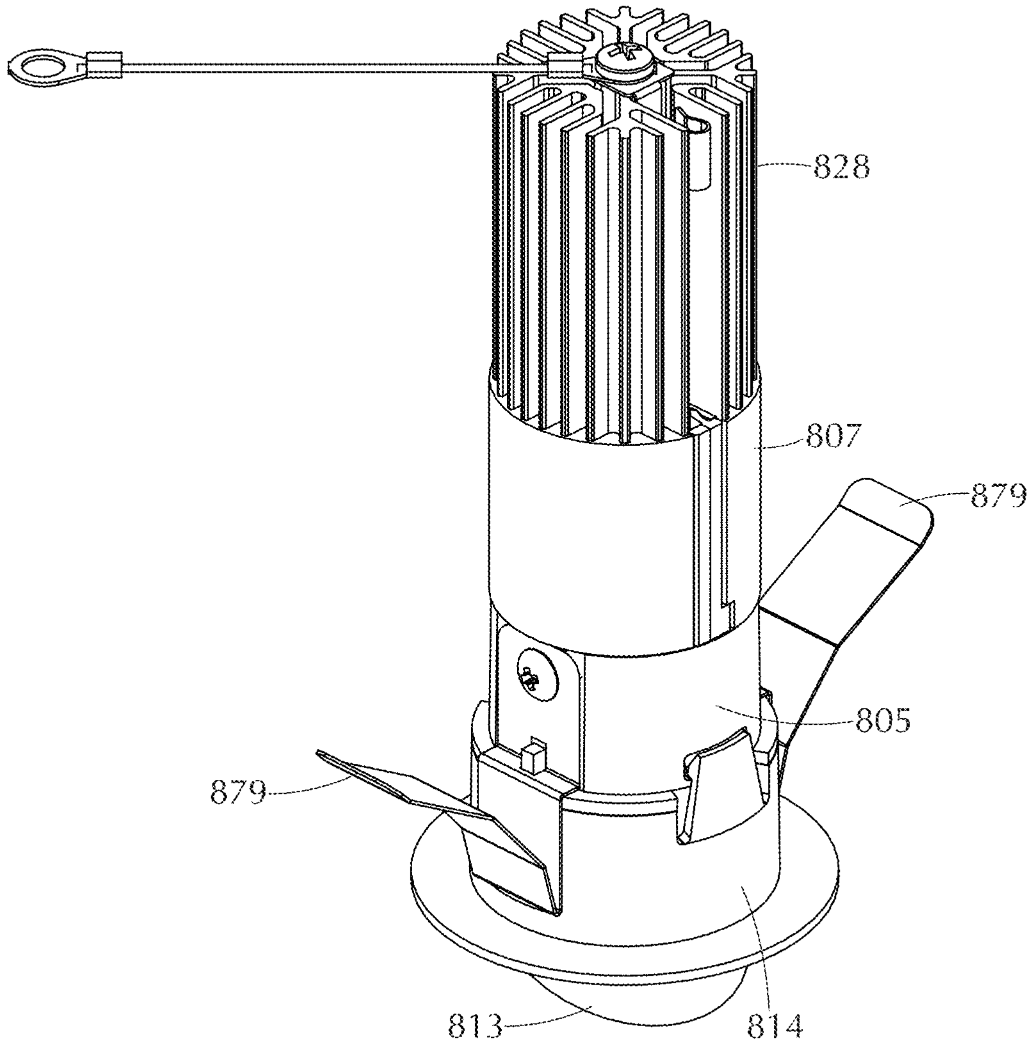
FIG. 71 is a perspective view of a eighth preferred embodiment of the inventive light fixture.
Figure 72:
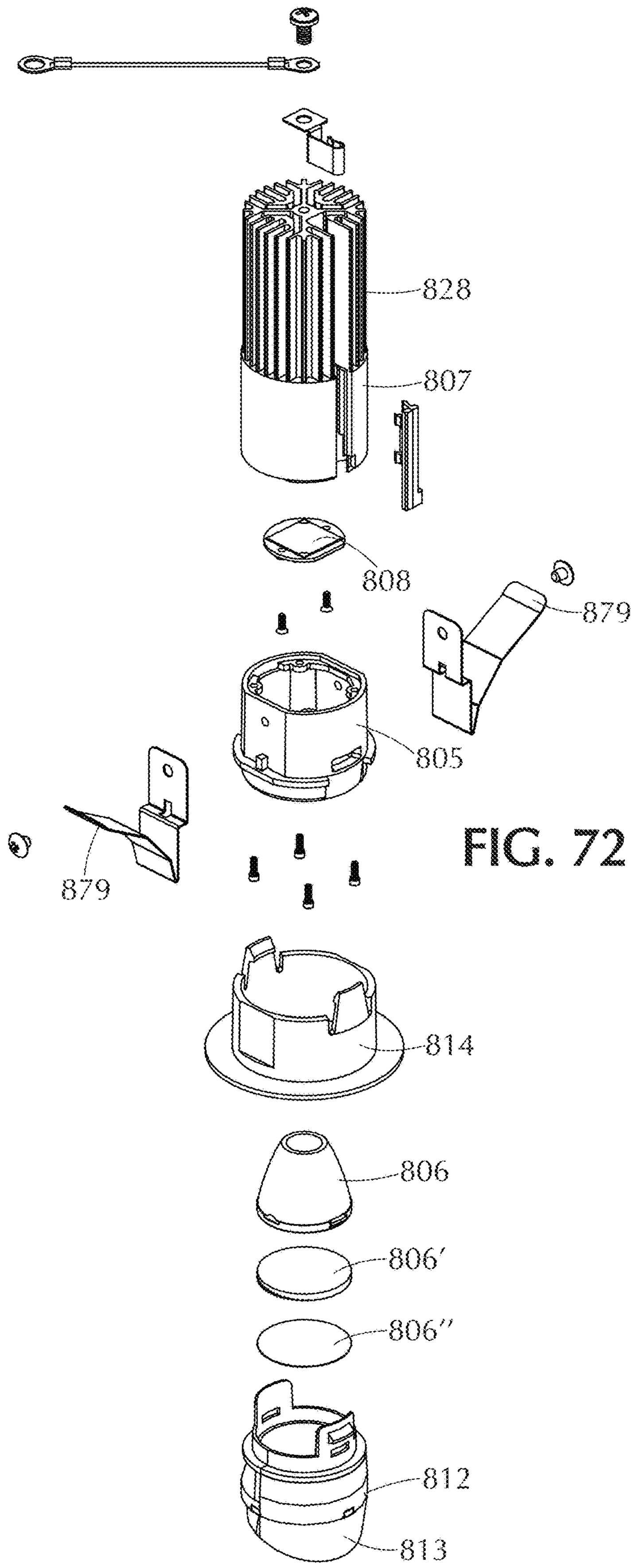
FIG. 72 is an exploded view of the light fixture of FIG. 71.

Referring to FIGS. 61-64, an embodiment of the light engine lock 633 is operable to lock the LED module 410 in the bayonet connector 262 when in the LED module 410 is in the connected state, and is adapted to be actuated by the service tool 420. The light engine lock 633 can be connected to a bottom of the heat sink 628 adjacent and radially outwardly from the bayonet connector 262. The light engine lock 633 can have a locking projection 634 which extends radially inwardly toward and is received within and engages a locking recess 636 on a periphery of the LED module 410 to prevent rotation thereof, when the LED module 410 is in the connected state and when the lock 633 is in a locked position. The lock 633 can be biased in the locked position (FIGS. 61, 63, 64), for example by a spring 638. The light engine lock 633 can have an inclined cam surface 640 extending away from the heat sink 628 and radially outwardly from the LED module 410. As shown in FIG. 62, when the service tool 420 is connected to the LED module 410 attached to the bayonet connector 262, the first end 422 of the service tool 420 contacts the cam surface 640 of the lock 633 and urges the lock 633 radially outward against the bias, and into an unlocked position, wherein the locking projection 634 of the lock 633 is displaced from the locking recess 636 of LED module 410 such that the LED module 410 can be rotated and removed from the bayonet connector 262, using the service tool 420. Preferably, the light engine lock 633 does not engage or limit rotation of the reflector module 412 relative to the LED module 410, when the lock 633 is in the locked or unlocked positions. The reflector module 412 can include a recess 642 on a periphery thereof configured to avoid contact with the locking projection 634 and cam surface 640 of the lock such that the reflector module 412 can rotate when the lock 633 is in the locked state, for connection and removal of the reflector module 312 independent of the LED module, including when using the service tool 420.

Referring to FIGS. 65 and 66A-C, in another preferred embodiment of the light fixture, the light engine assembly is composed of modular parts including an LED module 710, a reflector module 712, and a trim module 714, as described herein regarding light engine assembly 408. Heat sink 728 has a plurality of fins 731. The light fixture has an enclosure 702 (without a top), side walls 705, and a bottom wall 704 with an aperture 706 therethrough of, for example, a diameter of about 1 inch or more. In accordance with the present invention, the light fixture is serviceable from the room without the need to remove the ceiling material. In addition, LED module 710 includes a removable heat sink that provides for efficient thermal coupling to permanent heat sink 728 of the fixture. When installed and in operation, the combination of the removable heat sink in LED module 710 coupled with permanent heat sink 728 allows for optimal thermal management, providing high quality light over the lifetime of the fixture. For example, a preferred embodiment of the fixture provides 475-1500 Lumens of delivered light through a 1-inch ceiling aperture (with a ¾ inch lens aperture) with only 7-15 watts of power. Reflector module 712 is field-changeable, parabolic and is capable of creating a soft, symmetric beam pattern (with narrow to wide beam spreads by simply swapping out the reflector from the room below). Trim module 714 also provides glare control (e.g., UGR<1, not measurable).

Referring to FIGS. 67-72, in other preferred embodiments of the light fixture, the light fixture can include a light engine assembly 802 with a trim module 814 (which may have a radially-outwardly extending flange 826), spring connectors 878 (or spring-tab connectors 879), a light engine lower housing 805, a light engine upper housing 807, and a heat sink 828. The light fixture can further include an LED module 808, a reflector 806, a diffuser 806' (and may also include a lens 806"), and a reflector module 812 (which may have a wall wash trim 813).

Figure 73:
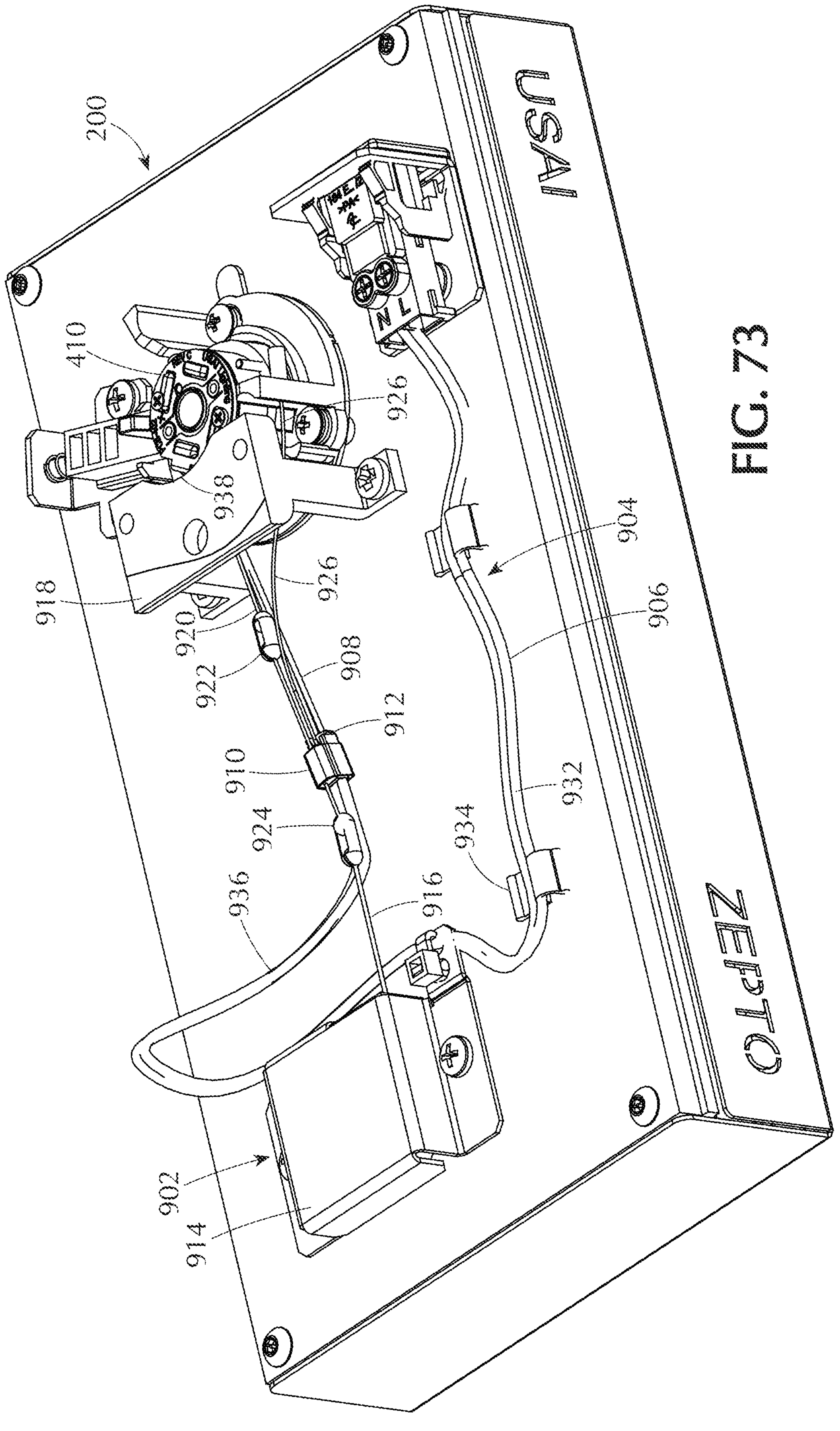
FIG. 73 is a perspective view of a ninth preferred embodiment of the inventive light fixture, from the bottom, showing the cable retractor in the retracted position.
Figure 74:
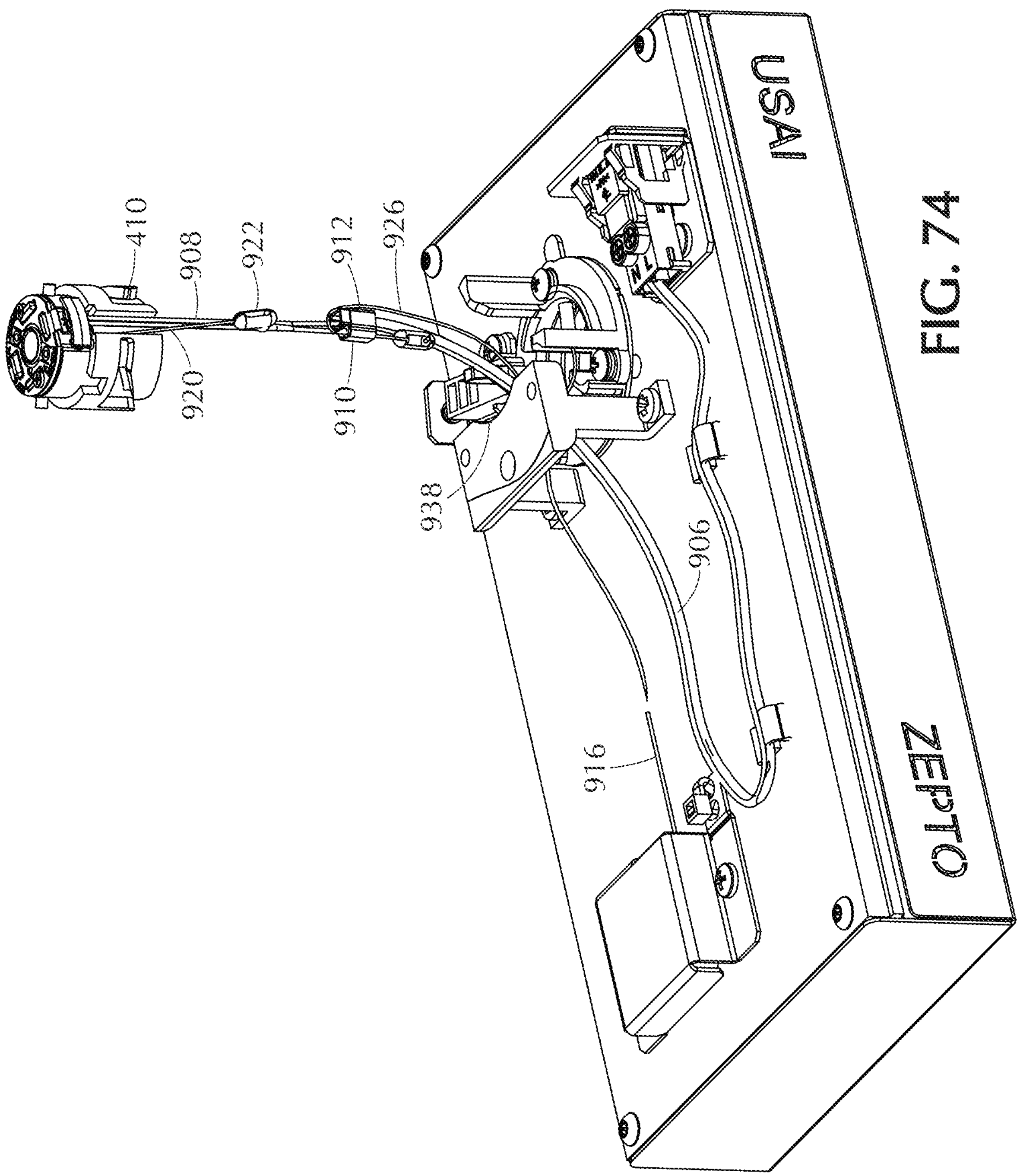
FIG. 74 is a perspective view of light fixture of FIG. 73, from the bottom, showing the cable retractor in the extended position.

Referring to FIGS. 73-74, in another preferred embodiment, the light fixture 600 can include a cable retractor 902 which is operable to retract a power line 904 for the LED module 410 during installation to prevent the power line 904 from interfering with the installation.

The power line 904 preferably includes a main power line 906 (or wiring harness), which can be connected to a power source or lighting driver. The power line 904 also includes an LED power cable 908 which is connected to the LED. The main power cable 906 and the LED power cable 908 are releasably connectable together such that the LED module 410 can be replaced if required, through the aperture, as described herein. Preferably the main power line 906 and the LED power cable 908 include modular connectors 910, 912 adapted to releasably electrically and mechanically interconnect.

The main lower line 906 can include a fixed section 932 which is fixed relative to the enclosure for example by one or more clamps 934 or the like, and can include a free section 936 which is connected to the LED power cable 908.

The cable retractor 902 can include a biasing element 914, such as a coil spring (not shown), and a retractor cable 916 connected to the biasing element. The biasing element 914 is preferably substantially laterally (e.g., horizontally) offset from the LED module 410 when mounted such that it is operable to bias (pull) the retractor cable 916 into a retracted position laterally offset from the LED module 410 during mounting. The LED Module 410 can include a leash 920 which is preferably fixedly connected to the LED Module and releasably connectable to the retractor cable 916.

The light fixture 600 also preferably includes a retractor cable guide 918 connected to the light fixture and disposed between the biasing element 914 and the LED module 410 when mounted, and more preferably disposed adjacent the LED module. The retractor cable 916 (and preferably the power line 904) pass through an opening or passage of, and/or are guided by, the retractor cable guide 918, which is operable to limit downward movement of portions of the retractor cable 916 and leash 920 that are located between the biasing element 914 and the cable guide 918 during installation and removal. As shown, the retractor cable guide 918 can be in the form of a bridge connected to the light fixture 200 through which the retractor cable 916 and power cable 904 pass.

Preferably, the cable guide 918 is located and operable to prevent the retractor cable 916 (under tension from the biasing element 914 of the cable retractor 902) from substantially contacting or binding against an outer edge of the opening 273 in the ceiling and/or aperture 206 in the enclosure 202 during installation and removal of the LED module 410. The cable guide 918 is preferably configured to guide the retractor cable 916 and the leash 920 connected thereto, substantially parallel to the insertion axis during installation and removal of the LED module 410. For example, the cable guide 918 can include a bearing portion 938 against which the retractor cable 916 bears (e.g., slides) during installation and removal of the LED module 410, and the bearing portion 938 can be substantially aligned with (e.g., substantially vertically above or slightly radially outwardly from) an outer edge of the opening 273 in the ceiling and/or aperture 606 of the enclosure 602. The cable guide 918 is preferably configured to guide the power line 904 in a similar manner, although the power line 904 is preferably not under tension.

The retractor cable 916 is preferably connected to the modular connector 910 of the main power line 906, and the retractor cable 916 can include a releasable connector 924 between the biasing element 914 and the module connector 910 of the main power line 906. The leash 920 of the LED Module 410 is preferably releasably connectable to the retractor cable 916 by a releasable connector 922, such as a pull chain type connector, or other suitable releasable connector.

Preferably, the retractor cable 916 and leash 920 are configured such that the LED power cable 908 is substantially slack (i.e., not in any substantial tension) when the leash 920 is connected to the retractor cable 916 and the LED power cable 908 is connected to the main power line 906, including when the power line 904 is in a retracted or extended state. For example, the taut length of the leash 920 plus the retractor cable 916 (between the leash and the modular connector 910) is preferably greater than the length of the LED power cable 908 such that the LED power cable remains substantially slack during installation and removal, while the retractor cable 916 is in tension.

The light fixture 200 can also include a retrieval line 926 which can be used to retrieve the main power line 906 in the event that the leash 920 is disconnected from the retractor cable 916 and the main power line 906 is disconnected from the LED power cable 908 and is retracted. The retrieval line 926 has a first end 928 which is connected to the light fixture adjacent to the LED module 410 and which can be accessed through the aperture, for example with a hook tool. A second end 930 of the retrieval line 926 is connected to modular connector 910 of the main power line 906 and/or the retractor cable 916. The retrieval line 926 is preferably configured to pass through the retractor cable guide 918. When needed, the retrieval line 926 can be engaged by a tool and pulled through the aperture to retrieve the main power line 906

Figure 75:
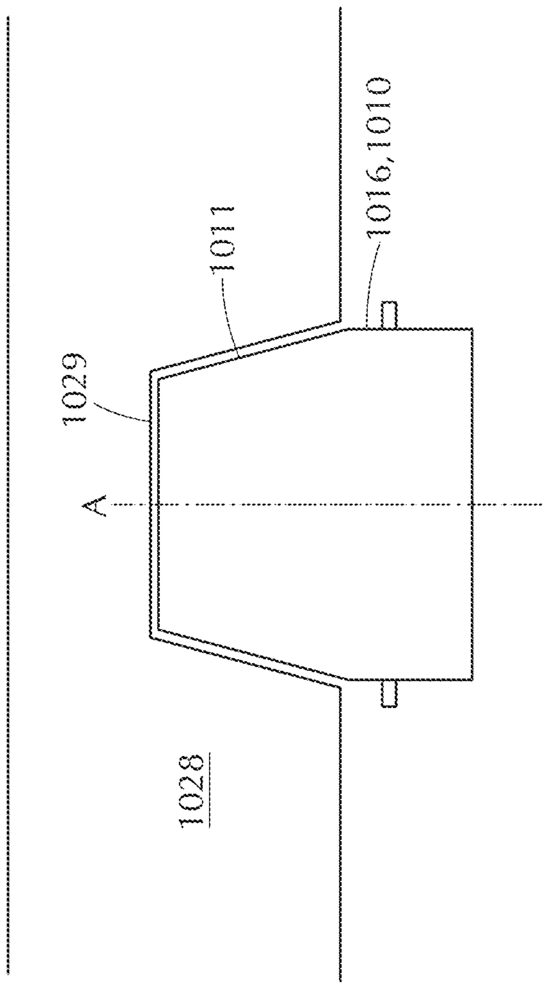
FIG. 75 is a side cross-sectional view of a tenth preferred embodiment of the inventive light fixture.

Referring to FIG. 75, in another preferred embodiment of the light fixture 600, to increase the contact area of the thermal interfaces (and thereby increase the rate and/or efficiency of heat transfer), a base 1016 of an LED module 1010 can have a convex upper portion 1011 and the heat sink 1028 can have a recess 1029 having a complementary concave shape configure to closely receive the base 1016 of the LED module 1010 such that the base makes an effective mechanical and thermal connection with the heat sink 1028. Alternatively, the convex/concave configuration of the base and heat sink can be reversed such that the upper portion 1011 of the base can have a concave recess which is configured to couple with a convex portion of the heat sink 1028.

Preferably, in each configuration, the thermal interfaces of the base and heat sink are configured to press together and thermally couple when in the connected state and are operable to relatively rotate under such pressure such that the light engine assembly can be urged between and into the connected and disconnected states as described herein. As an example, the convex upper portion 1011 of the base 1010 (or in the alternative configuration, the convex portion of the heat sink 1028) can have a contiguous or non-contiguous surface of revolution about the insertion axis A such as a shape which is substantially conical, frustoconical, semi-spherical, or semi-ellipsoidal (along a major axis of the ellipsoid), or another suitable shape, and the recess 1029 of the heat sink 1028 (or base 1010 in the alternative) can have a complementary contiguous or non-contiguous shape that together are suitable to permit such relatively rotation under such pressure.

Figure 76:
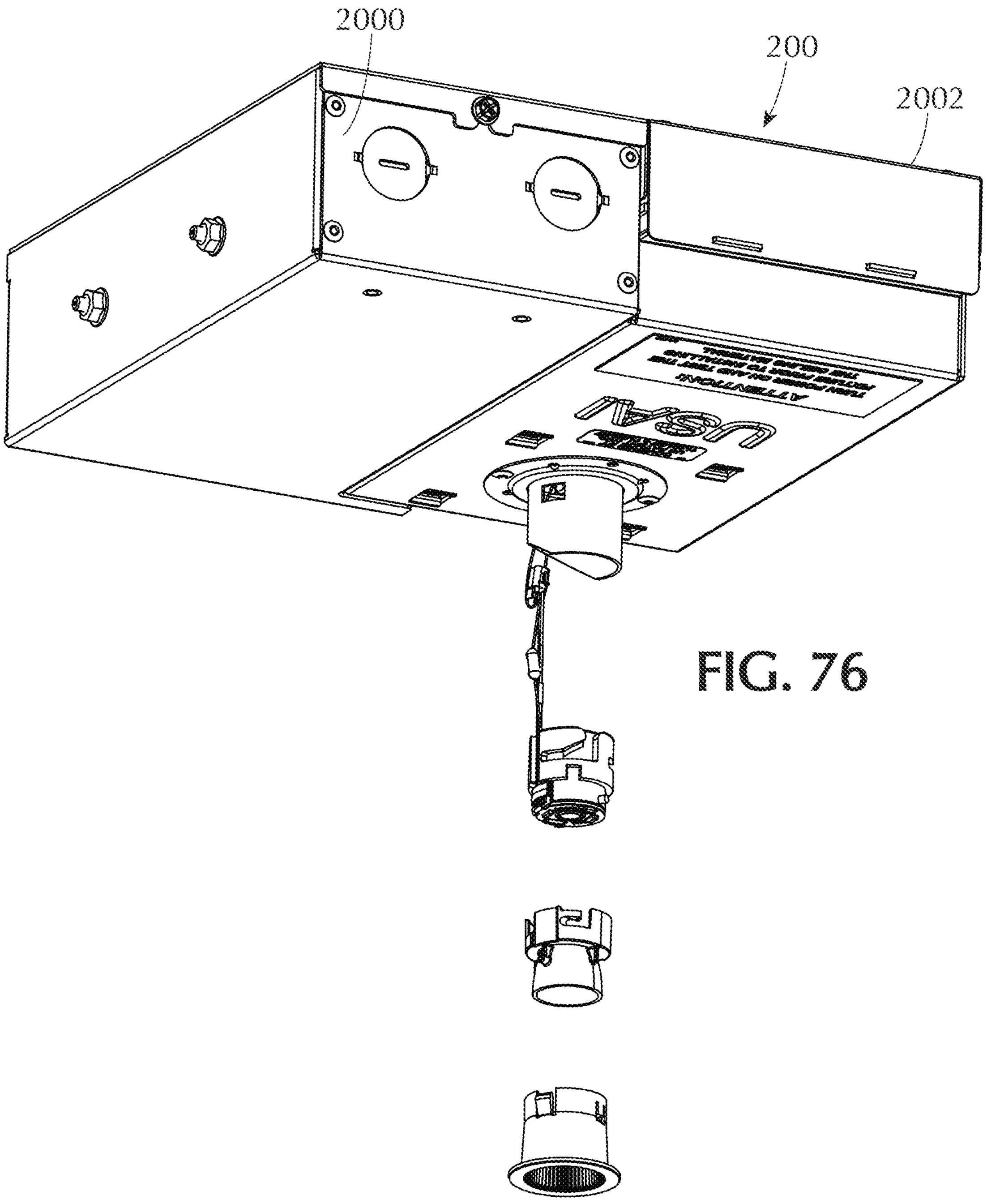
FIG. 76 is a side cross-sectional view of an eleventh preferred embodiment of the inventive light fixture.

Referring to FIG. 76, in another preferred embodiment, the light fixture 200 can include a driver enclosure 2000 connected to the (main) enclosure 2002 for housing an integrated driver.

What is claimed:

1. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink; and the LED module being insertable and removable through the aperture aligned with the opening in the ceiling and operable to be selectively urged into the connected and disconnected states from within the room;

whereby the LED module can be replaced or serviced from within the room without disturbing the ceiling; and the LED module being operable to be urged from the disconnected state into the connected state by a partial rotation of the LED module in a first direction about the insertion axis, and being operable to urged from the connected state into the disconnected state by a partial rotation of the LED module in a second direction opposite the first direction about the insertion axis.

2. The light fixture of claim 1, wherein:

the heat sink has a recess configured to closely receive the base of the LED module;

the thermal interface of the heat sink is disposed in the recess; and the recess is operable to position the base during mounting of the LED module to the heat sink.

3. The light fixture of claim 1, wherein:

the heat sink has a recess configured for insertion of the base of the LED module therein;

the thermal interface of the heat sink is disposed in the recess; and the recess is operable to position the base during mounting of the LED module to the heat sink.

4. The light fixture of claim 1, further comprising:

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing; and the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing.

5. The light fixture of claim 4, wherein:

the LED module has a plurality of mounting projections;

the first end of the service tool has a plurality of slots adapted to engage the mounting projections of the LED module to releasably connect the LED module to the service tool.

6. The light fixture of claim 5, wherein:

the service tool is operable to rotate the LED module relative to the heat sink in the connected state.

7. The light fixture of claim 4, wherein:

the first end of the service tool has a plurality of slots adapted to releasably connect the service tool to the LED module.

8. The light fixture of claim 7, wherein:

the first end of the service tool is substantially tubular and is adapted to receive at least a portion of the LED module.

9. The light fixture of claim 4, wherein:

the first end of the service tool is substantially tubular and is adapted to receive at least a portion of the LED module.

10. The recessed light fixture of claim 1, further comprising:

a mechanical connector disposed within the housing, and operable to removably mount the LED module to the heat sink; and in the connected state, the mechanical connector mechanically fixing the LED module relative to the heat sink, and thermally coupling the thermal interface of the base of the LED module with the thermal interface of the heat sink.

11. The recessed light fixture of claim 10, wherein:

the mechanical connector comprises a bayonet connector; and the bayonet connector engages the LED module in the connected state.

12. The recessed light fixture of claim 1, further comprising:

a plurality of mounting pins extending radially outwardly from the LED module; and a service tool adapted to releasably connect to the LED module for insertion and removal of the LED module through the opening in the ceiling, the service tool having a first end with a plurality of slots adapted to engage the mounting pins of the LED module, and adapted to rotate the base to urge the base between the connected and disconnected states.

13. The recessed light fixture of claim 12, further comprising:

a light engine lock disposed within the housing and having locked and unlocked states;

in the locked state, the light engine lock being operable to prevent rotation of the LED module in the connected state;

in the unlock state, the light engine lock being operable to allow rotation of the LED module in the connected state;

the light engine lock being biased in the locked state;

the light engine lock having a cam surface; and during connection and disconnection of the LED module, the service tool is adapted to engage the cam surface of the light engine lock and to urge the light engine lock into the unlocked state.

14. The recessed light fixture of claim 13, further comprising:

in the locked state, the light engine lock being operable to prevent rotation of the LED module in the connected state, relative to the heat sink; and in the unlock state, the light engine lock being operable to allow rotation of the LED module in the connected state, relative to the heat sink.

15. The recessed light fixture of claim 1, further comprising:

a reflector module with a reflector;

the reflector module having a mounted state wherein the reflector module is mounted to the LED module, and having a dismounted state wherein the reflector module is disconnected from the LED module;

the reflector module being adapted to be urged from the dismounted state to the mounted state by a partial rotation of the reflector module relative to the LED module about the insertion axis in a mounting direction; and the reflector module being adapted to be urged from the mounted state to the dismounted state by a partial rotation of the reflector module relative to the LED module about the insertion axis in a dismounting direction opposite the mounting direction.

16. The recessed light fixture of claim 15, wherein:

the LED module has a plurality of mounting pins extending radially outwardly; and in the mounted state, the reflector module is mounted by the mounting pins of the LED module.

17. The recessed light fixture of claim 16, further comprising:

the reflector module having a plurality of mounting pins extending radially outwardly; and a service tool being adapted to releasably connect to the LED module and to insert and remove the LED module from the housing through the opening in the ceiling; and a first end of the tool being adapted to engage the mounting pins of the LED module, and adapted to rotate the LED module relative to the housing, to urge the LED module between the connected and disconnected states;

the service tool being adapted to releasably connect to the reflector module and to insert and remove the reflector module from the housing through the opening in the ceiling; and the first end of the tool being adapted to engage the mounting pins of the reflector module, and adapted to rotate the reflector module relative to the LED module, to urge the reflector module between the mounted and dismounted states.

18. The recessed light fixture of claim 1, wherein:

the thermal interface of the base is operable to be urged into contact with the thermal interface of the heat sink in an axial motion along the insertion axis and, when in such contact and under pressure, is operable to rotate relative to the thermal interface of the heat sink about the insertion axis.

19. The recessed light fixture of claim 18, wherein:

at least a portion of the thermal interfaces of the base and the heat sink are planar and are perpendicular to the insertion axis.

20. The recessed light fixture of claim 18, wherein:

at least a portion of one of the thermal interface of the base and the thermal interface of the heat sink has a substantially convex shape and at least a portion of the other of the thermal interface of the base and the thermal interface of the heat sink has a substantially concave shape configured to couple with the at least a portion of one of the thermal interface.

21. The recessed light fixture of claim 20, wherein:

the at least a portion of the one thermal interface having the substantially concave shape is at least a portion of the thermal interface of the heat sink and the at least a portion of the other of the thermal interface having the substantially convex shape is at least a portion of the thermal interface of the base.

22. The recessed light fixture of claim 1, further comprising:

an LED power cable connected to and operable to deliver electric power to the LED;

a main power line operable to releasably connect to the LED power cable;

a cable retractor having a retractor cable connected to the main power line and having a biasing element operable to retract the retractor cable;

a leash connected to the LED module and operable to releasably connect to the retractor cable;

the cable retractor being operable to permit extension of the main power line through the opening in the ceiling during removal of the LED module and to retract the main power line during installation of the LED module.

23. The recessed light fixture of claim 22, further comprising:

the biasing element being operable to bias the retractor cable into a retracted position laterally offset from the base in the connected state; and a retractor cable guide operable to prevent the retractor cable from substantially contacting or binding against an outer edge of the opening in the ceiling during installation and removal of the base.

24. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room where a maximal clearance between the LED module and the opening in the ceiling is not substantially greater than required for the LED module to fit through the opening;

whereby the LED module can be replaced or serviced from within the room without disturbing the ceiling; and the LED module being operable to be urged from the disconnected state into the connected state by a partial rotation of the LED module in a first direction about the insertion axis, and being operable to urged from the connected state into the disconnected state by a partial rotation of the LED module in a second direction opposite the first direction about the section axis.

25. The light fixture of claim 24, further comprising:

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing; and the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing.

26. The light fixture of claim 25, wherein:

the LED module has a plurality of mounting projections; and the first end of the service tool has a plurality of slots adapted to engage the mounting projections of the LED module to releasably connect the LED module to the service tool.

27. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

the heat sink has a recess configured for insertion of the base of the LED module therein;

the thermal interface of the heat sink is disposed in the recess; and the recess is operable to position the base during mounting of the LED module to the heat sink.

28. The light fixture of claim 27, wherein:

the recess is configured to closely receive the base of the LED module.

29. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing;

the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing;

the LED module has a plurality of mounting projections; and the first end of the service tool has a plurality of slots adapted to engage the mounting projections of the LED module to releasably connect the LED module to the service tool.

30. The light fixture of claim 29, wherein:

the service tool is operable to rotate the LED module relative to the heat sink in the connected state.

31. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

the LED module is operable to be urged from the disconnected state into the connected state by rotation of the LED module relative to the housing in a first direction about the insertion axis, and is operable to urged from the connected state into the disconnected state by rotation of the LED module relative to the housing in a second direction opposite the first direction about the insertion axis;

a mechanical connector disposed within the housing, and operable to removably mount the LED module to the heat sink;

in the connected state, the mechanical connector mechanically fixing the LED module relative to the heat sink, and thermally coupling the thermal interface of the base of the LED module with the thermal interface of the heat sink;

the mechanical connector comprises a bayonet connector; and the bayonet connector engages the LED module in the connected state.

32. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

the LED module is operable to be urged from the disconnected state into the connected state by rotation of the LED module relative to the housing in a first direction about the insertion axis, and is operable to urged from the connected state into the disconnected state by rotation of the LED module relative to the housing in a second direction opposite the first direction about the insertion axis;

a plurality of mounting pins extending radially outwardly from the LED module; and a service tool adapted to releasably connect to the LED module for insertion and removal of the LED module through the opening in the ceiling, the service tool having a first end with a plurality of slots adapted to engage the mounting pins of the LED module, and adapted to rotate the base to urge the base between the connected and disconnected states.

33. The recessed light fixture of claim 32, further comprising:

a light engine lock disposed within the housing and having locked and unlocked states;

in the locked state, the light engine lock being operable to prevent rotation of the LED module in the connected state;

in the unlock state, the light engine lock being operable to allow rotation of the LED module in the connected state;

the light engine lock being biased in the locked state;

the light engine lock having a cam surface; and during connection and disconnection of the LED module, the service tool is adapted to engage the cam surface of the light engine lock and to urge the light engine lock into the unlocked state.

34. The recessed light fixture of claim 33, further comprising:

in the locked state, the light engine lock being operable to prevent rotation of the LED module in the connected state, relative to the heat sink; and in the unlock state, the light engine lock being operable to allow rotation of the LED module in the connected state, relative to the heat sink.

35. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing;

the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing; and the first end of the service tool has a plurality of slots adapted to releasably connect the service tool to the LED module.

36. The light fixture of claim 35, wherein:

the first end of the service tool is substantially tubular and is adapted to receive at least a portion of the LED module.

37. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture, along an insertion axis;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room;

whereby the LED module can be replaced or serviced from within the room without disturbing the ceiling;

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing;

the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing; and the first end of the service tool is substantially tubular and is adapted to receive at least a portion of the LED module.

38. A recessed light fixture for illuminating a room through an opening in a ceiling, the light fixture comprising:

a housing having an aperture;

a heat sink disposed within the housing, and the heat sink having a thermal interface;

a LED module being insertable into and removable from the housing through the aperture;

the LED module having a base with a first end and an LED mounted to the first end of the base, and the base having a second end with a thermal interface adapted for thermal coupling to the thermal interface of the heat sink;

the base comprising material having high thermal conductivity, and the base being operable for effective conduction of heat from the first end of the base to the second end thereof, to effectively conduct heat from the LED to the heat sink;

the LED module being operable to removably mount to the heat sink;

in a connected state, the LED module being mounted to the heat sink, and the thermal interface of the base being thermally coupled with the thermal interface of the heat sink, wherein the thermal interfaces of the base and heat sink are pressed together;

in a disconnected state, the LED module being dismounted from the heat sink, and the thermal interface of the base being thermally de-coupled from the thermal interface of the heat sink;

the LED module being insertable and removable through the aperture aligned with the opening in the ceiling and operable to be selectively urged into the connected and disconnected states from within the room where a maximal clearance between the LED module and the opening in the ceiling is not substantially greater than required for the LED module to fit through the opening;

whereby the LED module can be replaced or serviced from within the room without disturbing the ceiling;

a service tool adapted to insert and remove the LED module from the housing through the opening in the ceiling and the aperture;

the service tool having a first end configured to releasably connect to the LED module;

the first end of the service tool being operable to be inserted into the housing through the opening in the ceiling and the aperture, from within the room, with the LED module connected thereto, and thereafter being operable to mount the LED module to the heat sink into the connected state, disconnect from the LED module and exit the housing;

the service tool being operable to be inserted into the housing through the opening in the ceiling and the aperture, from within the room, without the LED module connected thereto, and thereafter being operable to connect to the LED module, dismount the LED module from the heat sink into the disconnected state and remove the LED module from the housing;

the LED module has a plurality of mounting projections; and the first end of the service tool has a plurality of slots adapted to engage the mounting projections of the LED module to releasably connect the LED module to the service tool.

* * * * *